United States Patent [19]

Osborne

[11] 3,825,736

[45] July 23, 1974

[54] CALCULATOR WITH PROVISION FOR EFFICIENTLY MANIPULATING FACTORS AND TERMS

[75] Inventor: Thomas E. Osborne, San Francisco, Calif.

[73] Assignee: Hewlett-Packard Company, Palo Alto, Calif.

[22] Filed: Apr. 17, 1972

[21] Appl. No.: 244,994

Related U.S. Application Data

[60] Continuation of Ser. No. 826,306, May 21, 1969, abandoned, which is a division of Ser. No. 559,887, June 23, 1966, Pat. No. 3,566,160.

[52] U.S. Cl. .................................. 235/168, 235/156
[51] Int. Cl. ............................ G06f 7/50, G06f 7/52
[58] Field of Search ........... 235/168, 173, 174, 175, 235/176, 156

[56] References Cited

UNITED STATES PATENTS

| | | | |
|---|---|---|---|
| 3,308,280 | 3/1967 | Crowther et al. | 235/160 |
| 2,467,419 | 4/1949 | Avery | 235/162 |
| 3,330,946 | 7/1967 | Scuitto | 235/160 |

*Primary Examiner*—Malcolm A. Morrison
*Assistant Examiner*—David H. Malzahn
*Attorney, Agent, or Firm*—Roland I. Griffin

[57] ABSTRACT

A keyboard input language is employed that enables the operator to combine numerical factors into algebraic terms in which multiply and divide operators appear in their normal algebraic context and to form algebraic sums of these terms by postfixing add and subtract operators. The algebraic sum of an algebraic number (representing an algebraic term) contained in a first register and of another algebraic number (representing another algebraic term) contained in a second register is formed by employing an adder for adding the number portions of the algebraic numbers contained in the first and second registers when the sign portions of these algebraic numbers are alike and by employing a circuit for complementing the sign and number portions of the algebraic number contained in the first register when the sign portions of the algebraic numbers contained in the first and second registers are different, employing an adder for thereafter adding the number portions of the algebraic numbers contained in the first and second registers, and employing a circuit for treating the sign and the sum of the number portions of these algebraic numbers without the most significant digit of the sum as the algebraic sum when the algebraic number contained in the first register has been complemented and the most significant digit of the sum is an overflow and for complementing the sign and the sum of the number portions of these algebraic numbers to get the algebraic sum when the algebraic number contained in the first register has been complemented and the most significant digit of the sum is not an overflow.

12 Claims, 42 Drawing Figures

PROCESSING OF OPERANDS

INVENTOR
THOMAS E. OSBORNE

PROCESSING CONTROL OPERATORS

INVENTOR.
THOMAS E. OSBORNE

PROCESSING ARITHMETIC OPERATORS

INVENTOR.
THOMAS E. OSBORNE

MULTIPLICATION

INVENTOR.
THOMAS E. OSBORNE

INVENTOR.
THOMAS E. OSBORNE

NORMALIZATION

INVENTOR.
THOMAS E. OSBORNE

ACCUMULATION

INVENTOR.
THOMAS E. OSBORNE

INVENTOR.
THOMAS E. OSBORNE

INVENTOR.
THOMAS E. OSBORNE

KARNAUGH MAP OF CHARACTER ENCODING

KARNAUGH MAP OF WORD ENCODING

INVENTOR.
THOMAS E. OSBORNE

CONTROL LOGIC

INVENTOR.
THOMAS E. OSBORNE

SUBROUTINE ACCUMULATE
S 0000

INVENTOR.
THOMAS E. OSBORNE

SUBROUTINE MULTIPLY
S0001

INVENTOR.
THOMAS E OSBORNE

INVENTOR.
THOMAS E. OSBORNE

EXIT: (F51) = 1 IF CARRY

SUBROUTINE ADD
S 0011

INVENTOR.
THOMAS E. OSBORNE

SUBROUTINE NORMALIZE S0100

| CONDITION | | (WE) | (KE) |
|---|---|---|---|
| OVERFLOW & DIV | | UN-CHANGED | +00 |
| QUOTIENT ≠ 0 UNDERFLOW & DIV | | " | -01 |
| OVERFLOW & MPY OR ACC | | " | +01 |
| PRODUCT ≠ 0 UNDERFLOW · MPY | | " | +00 |
| UNDERFLOW · ACC | | | |
| | NO SHIFTS RQ'D | | +00 |
| | n SHIFTS RQ'D | | -0n |
| | 10 SHIFTS RQ'D | +00 | +00 |
| PRODUCT OR QUOTIENT=0 | | +00 | +00 |

Ⓝ 0100
ISTO [$KE_0$], IC41
Ⓟ 1100
ISTO [KE1], IKBF, ICCF, J01, K02
TO S1111 (SUM)

INVENTOR
THOMAS E. OSBORNE

INVENTOR.
THOMAS E. OSBORNE

SUBROUTINE SHIFT S0101

SUBROUTINE COMPLEMENT
S0110

SUBROUTINE EXPONENT UPDATE
S0110

INVENTOR.
THOMAS E. OSBORNE

SUBROUTINE DIVIDE
S 0111

INVENTOR.
THOMAS E. OSBORNE

INVENTOR.
THOMAS E. OSBORNE

SUBROUTINE ENTER DIGIT
S1001

SUBROUTINE DISPLAY S1011

INVENTOR.
THOMAS E. OSBORNE

SUBROUTINE DETERMINE ARITHMETIC OPERATOR S 1100

INVENTOR
THOMAS E. OSBORNE

SUBROUTINE STATE OF MACHINE
51101

INVENTOR
THOMAS E. OSBORNE

SUBROUTINE MBB
S1110

INVENTOR.
THOMAS E. OSBORNE

| DEC FIXED (F50) | ($KD_9$) = 0 BFZ | INC. EXP IF (F50) = 0 |
|---|---|---|
| 0 | 0 | 0 |
| 0 | 1 | 1 |
| 1 | 0 | 1 |
| 1 | 1 | 0 |

SUBROUTINE DIGIT ENTRY POSITION

INVENTOR.
THOMAS E. OSBORNE

SUBROUTINE EXPONENT UPDATE
DIVIDE INITIALIZATION
S 1111

INVENTOR.
THOMAS E. OSBORNE

FLIP FLOP

"E" TRACE

NUMERICS GENERATED WITH CASCADED "E" TRACES

INVENTOR.
THOMAS E. OSBORNE

LEFT DEFLECTION CIRCUIT

DOWN DEFLECTION CIRCUIT

RIGHT DEFLECTION CIRCUIT

INVENTOR.
THOMAS E. OSBORNE

BIASING CIRCUITS - 3RP1

INVENTOR
THOMAS E. OSBORNE

KEYBOARD CIRCUITS AND ENCODING

INVENTOR.
THOMAS E. OSBORNE

INVENTOR.
THOMAS E. OSBORNE

INVENTOR.
THOMAS E. OSBORNE

INVENTOR
THOMAS E. OSBORNE

CALCULATOR WITH PROVISION FOR EFFICIENTLY MANIPULATING FACTORS AND TERMS

TABLE OF CONTENTS

SECTION
- BACKGROUND AND SUMMARY OF THE INVENTION
- DESCRIPTION OF THE DRAWINGS
- GENERAL OPERATION
- GENERAL SYSTEM
  - PROCESSING OPERANDS (FIG. 1)
  - PROCESSING CONTROL OPERATORS (FIG. 2)
  - PROCESSING ARITHMETIC OPERATORS (FIG. 3)
  - ADDITION
    - COMPLEMENTING
  - ALGEBRAIC SUMS
    - SHIFTING
  - MULTIPLICATION (FIG. 4)
  - DIVISION (FIG. 5)
  - NORMALIZE (FIG. 6)
  - ACCUMULATE (FIG. 7)
- STRUCTURAL ARRANGEMENT (FIG. 8)
  - FLIP FLOP ASSIGNMENTS AND PRIMARY USES
  - INSTRUCTIONS
  - QUALIFIER GATES
  - SPECIAL QUALIFIERS
  - LOGICAL EQUATIONS (descriptive)
  - SUBROUTINE LINES (FIG. 9)
  - MEMORY ORGANIZATION (FIGS. 10–11)
  - CONTROL LOGIC (FIG. 12)
  - LOGICAL EQUATIONS - INSTRUCTIONS (FIGS. 13–28)
  - FLIP FLOP AND DRIVER GATING (FIG. 29)
  - INSTRUCTION LINES AND INSTRUCTION DRIVERS (FIG. 9)
  - TRANSFER VECTORS
  - DISPLAY (FIGS. 30–35)
  - CLOCK CIRCUIT (FIGS. 36–37)
  - KEYBOARD ENCODING MATRIX (FIG. 38)
  - TESTER (FIG. 39)

CROSS REFERENCE TO RELATED APPLICATION

This is a continuation of U.S. Pat. application Ser. No. 826,306 filed May 21, 1969, and now abandoned, which was in turn a divisional application of U.S. Pat. application Ser. No. 559,887 filed on June 23, 1966, by Thomas E. Osborne and issued on Feb. 23, 1971, as U.S. Pat. No. 3,566,160 entitled *SIMPLIFIED RACE-PREVENTING FLIP-FLOP HAVING A SELECTABLE NOISE IMMUNITY THRESHOLD.*

BACKGROUND AND SUMMARY OF THE INVENTION

This invention relates to an electronic desk top calculator and to certain subcombinations therein which are useful in eletronic desk top calculators and larger calculators of the data processing computer type.

Conventional electronic calculators typically employ either algebraic notation in which numerical operands and the arithmetic operators add, subtract, multiply, and divide are entered into the calculator in their normal algebraic sequence or Polish notation in which each of these arithmetic operators is entered into the calculator immediately after two numerical operands to be combined in accordance therewith, i.e., in which each of these arithmetic operators is postfixed. Calculators employing either of these notations typically require intermediate transfers or extra arithmetic operators to form the answer to arithmetic expressions made of terms in the form $N_1 x N_2 x \ldots x N_i/D_1 x D_2 x \ldots x D_i$. Furthermore, persons operating the calculator are typically accustomed, unlike algebraic notation, to postfixing the arithmetic operators add and subtract because this is the way conventional adding machines are operated and, unlike Polish notation, to placing the arithmetic operators multiply and divide in their normal algebraic context.

Accordingly, one of the objects of this invention is to provide an improved electronic calculator including a keyboard language for more efficiently forming the answer to arithmetic expressions made of terms in the form $N_1 x N_2 x \ldots x N_i/D_1 x D_2 x \ldots x D_i$.

Another of the objects of this invention is to provide an improved electronic calculator in which factors joined by a multiple or a divide operator may be combined and the result stored in or algebraically added to the contents of an output register in response to actuation of a single key. provide an improved electronic calculator including provision for more efficiently forming algebraic sums.

One form of electronic desk top calculator for accomplishing these objects is illustrated and described in detail herein. This calculator is provided with subroutines for performing the standard arithmetic operations of addition, subtraction, multiplication, division, exponential functions, and cumulative operations involving these specific operations and is readily adapted for performing additional operations.

It includes a keyboard for entering data, a random access memory for storing data, an output display for indicating the results of calculations performed by the calculator, apparatus including a plurality of flip-flops for controlling the operation of the calculator, and a multiterminal connector for electrically connecting the outputs of a majority of these flip-flops to a tester also illustrated and described in detail herein. A keyboard language is employed that enables persons operating the calculator to combine numerical factors into algebraic terms in which the multiply and divide operators appear in their normal algebraic context and to form algebraic sums of these terms by postfixing the add and subtract operators so that every factor or term is followed by one and only one arithmetic operator. The keyboard includes a key that may be actuated to clear an output register, to combine factors joined by a multiply or a divide operator, and to store the result directly in the cleared output register. It also includes a key that may be actuated to combine factors joined by a multiply or a divide operator and to algebraically add the result to the contents of an output register. Similarly, it includes another key that may be actuated to combine a plurality of factors joined by multiply and divide operators, and to change the sign of the result and algebraically add it to the contents of an output register. The algebraic sum of an algebraic number (representing an algebraic term) contained in a first register and of another algebraic number (representing another algebraic term) contained in a second register is formed by employing a circuit for complementing the sign and number portions of the algebraic number contained in the first register when the sign portions of the algebraic numbers contained in the first and second registers are different, by employing an adder for thereafter adding the number portions of the algebraic numbers contained in the first and second registers, and by employing a circuit for treating the sign and the sum of the number portions of these algebraic numbers without the most significant digit of the sum as the algebraic sum when the algebraic number contained in the first register has been complemented and the most significant digit of the sum is an overflow and for complementing the sign and the sum of the number portions of these algebraic numbers to get the algebraic sum when the algebraic number contained in the first register has been complemented and the most significant digit of the sum is not an overflow. As will be apparent hereafter, the principles of the invention may be employed in calculators other than the specific electronic desk top calculator illustrated herein.

Other objects and advantages of the invention will be apparent from the following description of an electronic desk top calculator and a tester for use therewith read in conjunction with the attached drawings.

DESCRIPTION OF THE DRAWINGS

FIG. 29' is a waveform diagram illustrating the operation of the flip-flop circuit of FIG. 29;

GENERAL OPERATION

Figure 1:
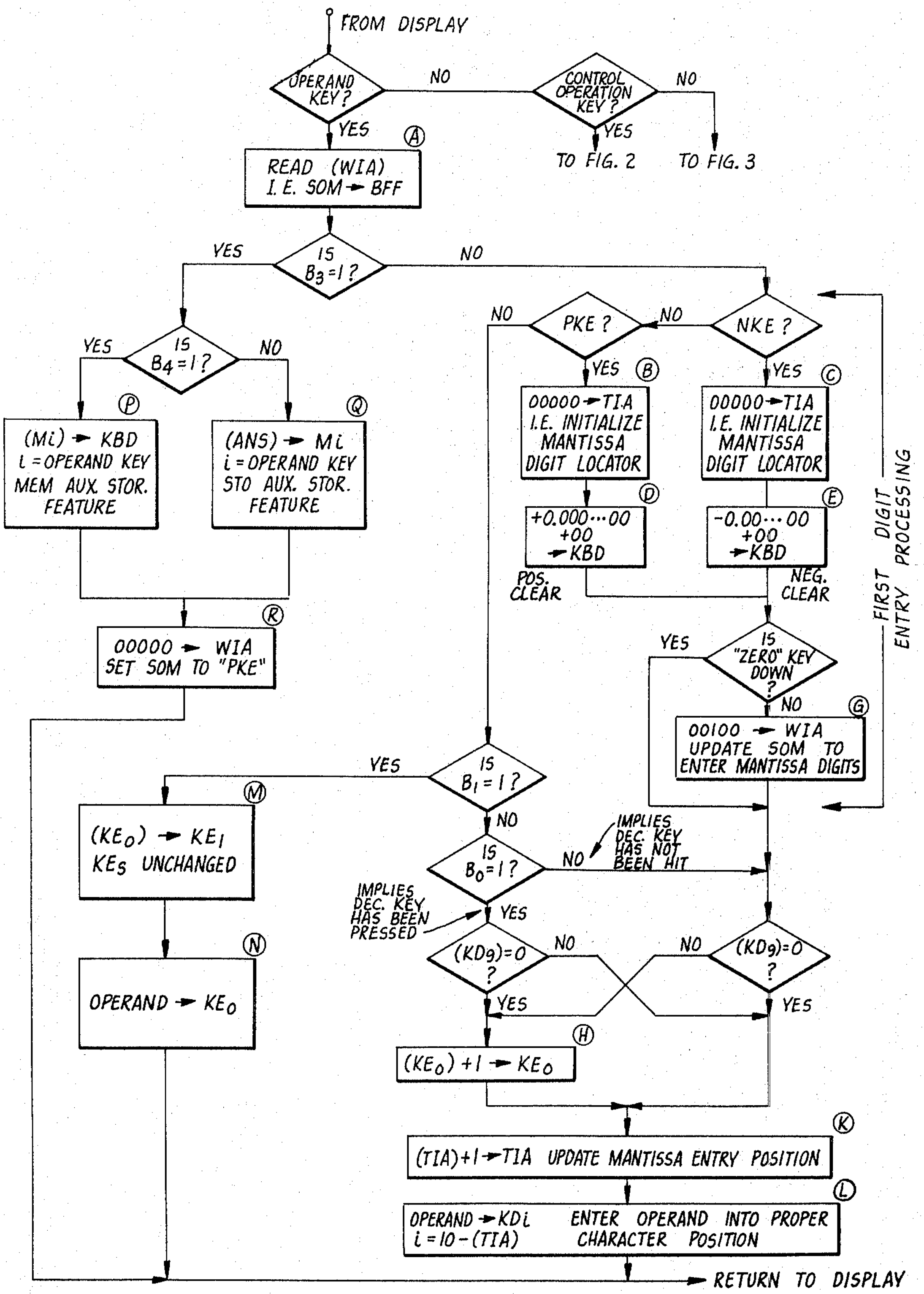
FIG. 1 is a diagram illustrating the manner in which the calculator operates in response to operand (digit entry) keys.

The machine illustrated in the attached drawings can be divided into three logical sections – an input section, an output section, and a processor.

The input section consists of a manually operated keyboard containing twenty-three data keys and a diode encoding matrix to generate a unique five bit code when each key is operated.

The output section consists of a cathode ray tube (CRT) and the associated circuitry necessary to display the contents of two registers contained within the processor. The contents of the two registers are displayed as two lines of decimal numerals with the two lines arranged in upper and lower positions. The register occupying the lower position on the CRT is the keyboard, or KBD, register. It displays the current numeric input data. The contents of KBD are not altered, except for a sign change under circumstances to be described later, when arithmetic operations are executed. The upper position of the CRT display contains the contents of the answer, or ANS, register. ANS always contains the answer to the last arithmetic term processed. Each of the ANS and KBD registers is stored in memory and displayed on the CRT as a 10 decimal digit number (hereafter called the mantissa) having a decimal point located between the most significant and second most significant digits. The mantissa is followed by two decimal digits, called the characteristic, which locate the true decimal point of the number relative to the normalized position it occupies in the mantissa. For example, the number 0.0125 is displayed as 1.250000000 −02. Thus, the smallest positive number which can be displayed is $1.000000000 \times 10^{-99}$. The largest positive and negative numbers which can be displayed are $\pm 9.999999999 \times 10^{99}$.

The processor contains logical elements common to digital computers, i.e., flip flops, gates, etc., a random access core memory, and means for receiving information from the input section and sending signals to the output display section.

With this general background, the operating characteristics, i.e., response to input data, can be described. Input data is grouped into two distinct categories, namely operands and operators. The operands consist of the decimal digit entries zero through nine. The operators are divided into two sub-groups, namely control operators and arithmetic operators. The control operators are defined as ERR (error), EXP (exponent), ANS (answer), CHS (change sign), MEM (memory), STO (store), and KBD (keyboard) and DEC (decimal point). The arithmetic operators are ACC 0(accumulate 0), ACC +(accumulate +), ACC −(accumulate −), × (multiply), and ÷ (divide).

The ERR control operator clears the keyboard to normal zero, e.g., a zero mantissa with a zero characteristic.

When an operand digit entry follows an arithmetic operator or an ERR, ANS, or KBD control operator, the processor recognizes the operand as the most significant digit of a new data entry, clears the mantissa and characteristic of KBD to zero, and enters the operand into the KBD register as the most significant digit of the mantissa. The processor will not enter a digit into the second most significant position of the mantissa until a non-zero digit operand entry is placed in the most significant position of the mantissa.

The DEC (decimal point) control operator provides sufficient information to the processor to determine the proper digits and sign of the characteristic. Thus, each digit entry operator after the first not only enters the digit in the KBD mantissa, but also increments the KBD characteristic until the decimal point control operator is operated. For instance, the number 632.14 is entered in KBD by six key operations as follows:

| KEY OPERATIONS | CRT DISPLAY OF KBD |
|---|---|
| — | 0.000000000 00 |
| 6 | 6.000000000 00 |
| 3 | 6.300000000 01 |
| 2 | 6.320000000 02 |
| decimal point | 6.320000000 02 |
| 1 | 6.321000000 02 |
| 4 | 6.321400000 02 |

When a decimal point entry follows an arithmetic operator, or an ERR, ANS, or KBD control operator, the processor recognizes the decimal point as the first entry of a forthcoming operand and clears the KBD register to zero. A decimal point control operator is not required when entering integers. When the initial key of an operand is the decimal point, successive operand keys decrement the characteristic of KBD until a non-zero number has been entered in the most significant position of the KBD mantissa.

The EXP control operator informs the processor that the characteristic of the KBD register is to be changed. The processor responds by clearing the characteristic of the KBD register to zero. When operand digit entries follow the EXP control operator, they enter (modulo 100) into the characteristic of the KBD register. The EXP feature allows the characteristic of an operand to be altered without changing the mantissa. It also allows the user to enter operands with large negative or positive exponents without inserting leading or trailing zeros. For example, Avogadro's number ($6.02 \times 10^{23}$) can be entered into the KBD register by six key operations as follows:

| KEY OPERATIONS | CRT DISPLAY OF KBD |
|---|---|
| 6 | 6.000000000 00 |
| 0 | 6.000000000 01 |
| 2 | 6.020000000 02 |
| EXP | 6.020000000 00 |
| 2 | 6.020000000 02 |
| 3 | 6.020000000 23 |

The CHS control operator changes the mantissa sign unless the preceding control operator was an EXP in which case the characteristic sign is changed. Additional CHS control operators cause repeated sign changes. When the CHS control operator follows an arithmetic operator or an ERR, ANS, or KBD control operator, the sign of the KBD register is changed as stated above. However, if an operand digit entry or a decimal point follows the CHS control operator, the processor recognizes the CHS control operator as a signal implying that a new negative mantissa is going to be entered into the KBD register. The processor responds by affixing a negative sign to the mantissa when the decimal point control operator or the first operand digit is received. In other words, the negative sign may be affixed to the mantissa of a KBD entry prior to entering the first digit of the mantissa, or at any time following the entry of the first digit of the mantissa.

An operand entry is also used to define auxiliary storage registers within the processor. When an operand entry follows a STO control operator, the contents of the ANS register are sent to the auxiliary storage register defined by the operand, e.g., STO followed by four results in the contents of ANS being sent to auxiliary storage register number 4. When a MEM control operator is followed by an operand entry, the contents of the auxiliary storage register defined by the operand digit are transferred into the KBD register. The contents of the source register remain unaltered in either process.

The ANS control operator transfers the contents of the ANS register into the KBD register. The contents of the ANS register remain unaltered by this process. This allows answers of previous arithmetic terms to be used as factors of new terms.

The KBD control operator provides a new user with continuity in performing arithmetic operations. It is used to simulate a transfer of the contents of the KBD register into the KBD register. The usefulness of this operator is discussed later in the detailed description of FIG. 2.

When the arithmetic operator preceding an ACC 0 arithmetic operator was an ACC 0, ACC +, or ACC −, the contents of the ANS register are set to normal zero, and the contents of the KBD register are algebraically added to the contents of the ANS register. In effect, the contents of the KBD register are transferred into the ANS register.

When the arithmetic operator preceding an ACC + arithmetic operator was an ACC 0, ACC +, or ACC −, the contents of the KBD register are algebraically added to the contents of the ANS register. The sum appears in the ANS register and the contents of the KBD register are unchanged.

When the arithmetic operator preceding an ACC − arithmetic operator was an ACC 0, ACC −, or ACC +, the sign of the KBD register is changed and the new contents of the KBD register are algebraically added to the contents of the ANS register. The sign of the KBD register is changed by the process. Note that if a second ACC − arithmetic operator is executed, the original contents of ANS and KBD will be re-established. Thus, it is possible to restore the contents of the ANS register by executing two consecutive ACC − arithmetic operators.

When the arithmetic operator preceding a *X* arithmetic operator is an ACC 0, ACC −, or ACC +, the processor defines the contents of the KBD register as the multiplicand of a forthcoming product. As explained below, the contents of KBD are defined as the multiplicand by transferring the contents of KBD to a third register called the working register (WRK) without changing the contents of KBD.

When the arithmetic operator preceding a *X* arithmetic operator is a *X*, the processor algebraically multiplies the previously defined multiplicand times the contents of the KBD register and identifies the product as the multiplicand of the forthcoming product.

When the arithmetic operator preceding a ÷ arithmetic operator is an ACC 0, ACC −, or ACC +, the processor defines the contents of the KBD register as a dividend of a forthcoming division.

When the arithmetic operator preceding a ÷ arithmetic operator is a *X*, the processor algebraically multiplies the contents of the KBD register times the previously defined multiplicand and defines the product as the dividend of the forthcoming division.

When the arithmetic operator preceding a ÷ arithmetic operator is a ÷, the processor algebraically divides the previously defined dividend by the contents of the KBD register and identifies the quotient as the dividend in the forthcoming division.

When the arithmetic operator preceding a *X* arithmetic operator is a ÷, the processor algebraically divides the previously defined dividend by the contents of the KBD register and identifies the quotient as the multiplicand of the forthcoming product.

When the arithmetic operator preceding an ACC 0 arithmetic operator is a *X*, the processor changes the ANS register to normal zero, then algebraically multiplies the contents of the previously defined multiplicand times the contents of the KBD register and their product is algebraically added to the contents of the ANS register. In effect, the product is placed in the answer register.

When the arithmetic operator preceding an ACC + arithmetic operator is a *X*, the contents of the KBD register and the previously defined multiplicand are algebraically multiplied and their product is algebraically added to the contents of the ANS register.

When the arithmetic operator preceding an ACC − arithmetic operator is a *X*, the processor first changes the sign of the KBD register, then forms the algebraic product of the previously defined multiplicand and the contents of the KBD register, and algebraically adds their product to the contents of the ANS register.

When the arithmetic operator preceding an ACC 0 arithmetic operator is a ÷, the processor changes the ANS to normal zero and then algebraically divides the previously defined dividend by the contents of the KBD register and their quotient is algebraically added to the ANS register. In effect, the quotient is placed in the ANS register.

When the arithmetic operator preceding an ACC + arithmetic operator is ÷, the processor algebraically divides the previously defined dividend by the contents of the KBD register and algebraically adds the quotient to the contents of the ANS register.

When the arithmetic operator preceding an ACC − arithmetic operator is ÷, the processor first changes the sign of the KBD register, then forms the algebraic quotient of the previously defined dividend and the contents of the KBD register and algebraically adds the quotient to the contents of the ANS register.

This mode of operation allows the user of the calculating machine to form the answer to any arithmetic expression made of terms containing factors of the form $(N_1 X N_2 X \ldots X N_i)/(D_1 X D_2 X \ldots X D_i)$ by following each term with either ACC − or ACC + depending upon whether the algebraic sign of that term is negative or positive respectively. Moreover, each multiplier is preceded by a *X* arithmetic operator and each divisor is preceded by a ÷ arithmetic operator. Those and only those arithmetic operators required to uniquely define the problem are used. This differs from other calculating systems which require intermediate transfers or extra arithmetic operators to accomplish the same type of problem.

It is also important to notice that the arithmetic notation differs from the Lukasiewicz (Polish) notation, often called "Parenthisis free" notation, in that the X arithmetic operator precedes the multiplier instead of follows it. Similarly the ÷ arithmetic operator precedes the divisor instead of following it. This feature assists the user because the X and ÷ arithmetic operators precede the multiplier and divisor respectively when written in standard arithmetic form.

The arithmetic notation also differs from the parenthesized notation commonly used in digital computer compilers such as FORTRAN and the electronic calculating machines marketed by Mathetronics, Inc., in that none of its arithmetic operators can be shown to be uniquely equivalent to the open or closed parenthesis.

GENERAL SYSTEM

The calculator contains a memory consisting of four working registers and 10 or less auxiliary storage registers with each register consisting of 13 characters of five bits each. The working registers are defined as WRK (working register), TMP (temporary register), KBD (keyboard register), and ANS (answer register). The auxiliary registers are defined as MEM 0, MEM 1, . . . MEM 9. Ten of the 13 characters in each register are used to store the mantissa. These mantissa characters are defined as $D_9$, $D_8$, $D_7$, . . . $D_0$ with $D_9$ being the most significant digit (MSD) and $D_0$ the least significant digit (LSD). Two of the remaining three characters, $E_1$ and $E_0$, are used to store the most significant and least significant digits of the characteristic. The remaining character, defined as IA, is used for storing intermediate results of computations and control information.

Each character consists of five bits, $B_4$, $B_3$, $B_2$, and $B_1$, and $B_0$. These characters are stored in standard 8-4-2-1-BCD code with $B_4$ and $B_0$ being the most significant bit (MSB) and least significant bit (LSB) respectively. $B_4$ of $D_9$ and $E_1$ hold the signs of the mantissa and characteristic respectively.

Figure 4:
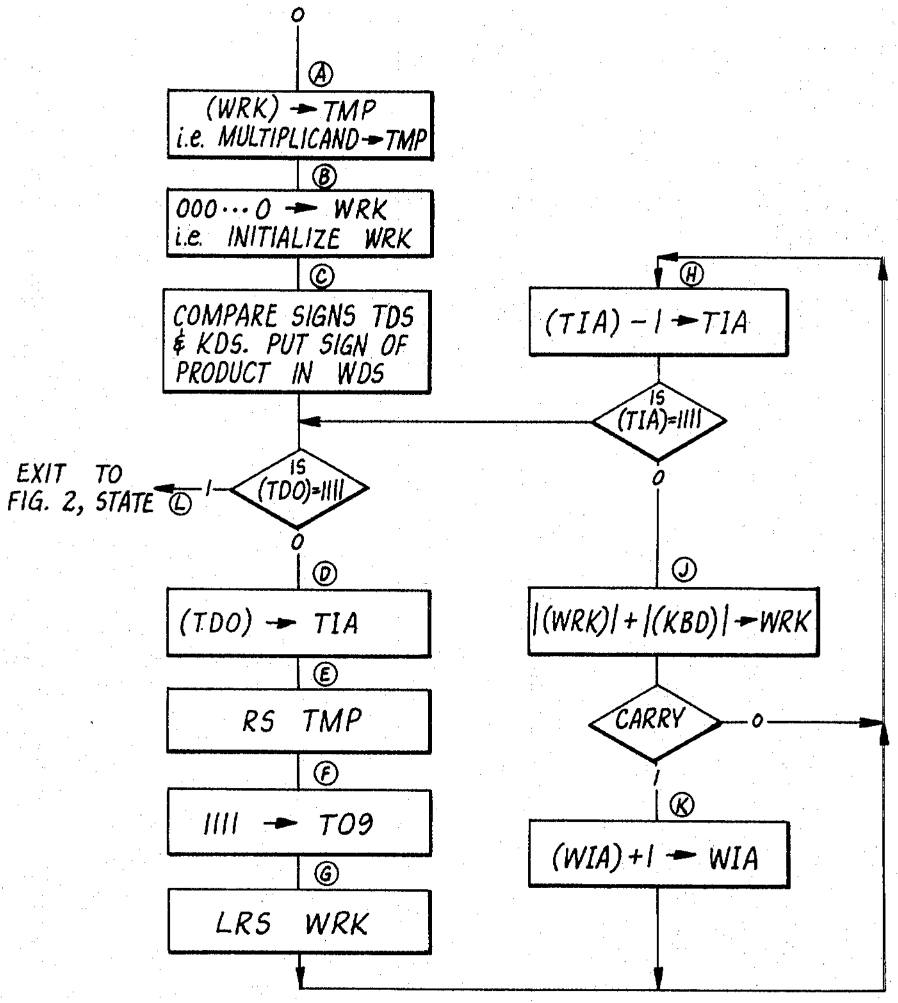
FIG. 4 is a diagram illustrating the manner in which the calculator operates in response to the multiplication key.

The core memory uses the word access storage system described by FIGS. 4.1, 4.3, 8.2*e*, and 8.15*a* of the book *Square Loop Ferrite Circuitry* by C. J. Quartly (Iliffe Books, Ltd., London). A memory cycle, similar to that in an IBM 704 digital computer, is used; thus, reading out of memory becomes a nondestructive process while writing into memory is a destructive process.

Five flip flops (the bit flip flops or BFF) are used to hold both the character read out of memory and the one to be written into memory. The bit flip flops are also connected to logical circuitry allowing them to be incremented or decremented. Incrementing occurs in the four LSB ($B_3$, $B_2$, $B_1$, $B_0$) only and is cyclic 0 through 9 in 8-4-2-1 BCD code. When the contents of BFF are incremented from 9 decimal (1001 binary or 11 octal) to 0 decimal, a signal is given to set a carry flip flop to a 1 condition. Decrementing the BFF results in the four LSB being reduced by one count in straight binary fashion. Decrementing zero causes 1111 binary (17 octal) to appear in the four LSB of the BFF.

Any character is memory can be selected by inserting its address into flip flops used to identify one of the 13 character locations and any one of the 14 registers. (Quartly IBID.)

To facilitate the detailed system description, the following conventions are used:

1. Individual characters in memory are referred to by prefixing the character identifier with the first letter of a working register or an $M_1$ for the $i^{th}$ auxiliary storage register. For example, $KD_9$, $AE_0$, and WIA refer to the MSD of the KBD mantissa, the LSD of the ANS characteristic, and the IA character of WRK respectively.
2. The sign of the mantissa and characteristic are identified by suffixing the D or E identifiers by the letter S. Thus, the KBD mantissa sign becomes KDS (which is contained in K $D_9$ $B_4$) and the ANS characteristic sign becomes AES (which is contained in A $E_1$ $B_4$).
3. The entire mantissa or characteristic is referred to by prefixing the letter D or E, respectively, with the appropriate register identifier. For example, the mantissa of ANS becomes AD and the characteristic of TMP becomes TE.
4. When parentheses enclose a register identifier, they symbolically imply "the contents of". This notation is used to differentiate between the address of a memory area and the information stored in the address. For example, the symbol (KD) means the contents of the KBD mantissa.
5. The arrow, →, replaces the words "go into."

Some rudementary operations may be described with this symbolic language and will help explain the detailed system operation.

Suppose the contents of $KD_9$ are to be incremented by one count. The logical operations would be to set the address flip flops to $KD_9$, execute a read cycle, increment the BFF, and execute a store cycle. These operations are symbolically stated as $(KD_9) + 1 \rightarrow KD_9$ which reads "the contents of the address $KD_9$, plus one, go into $KD_9$." Similarly, if the contents of $WE_0$ are to be transferred to $TE_0$, the apparatus includes control sequencing to select the address of $WE_0$, execute a read cycle, select the address of $TE_0$, and execute a write cycle. This is written symbolically as $(WE_0) \rightarrow TE_0$ which reads "the contents of the address $WE_0$ go into $TE_0$."

All of the detailed logical characteristics of the calculating machine will be described by using symbolic language, similar to the two preceding sample expressions. Proper time sequencing of the logical operations is given by placing the symbolic expressions in flow charts (IBM Form A22-6503-2, Pgs. 31, 33). The flow chart is a particularly convenient means for describing the system logic for two reasons: (1) translating information from a flow chart into logical design set-reset equations is a process well-known to logical designers, and (2) the logical equations and/or circuit diagrams are voluminous, making it difficult to understand the system operation without the aid of flow charts.

By using the random access capabilities of the memory system, the contents of ANS and KBD are displayed on a cathode ray tube employing deflection circuitry and logic described below. The resultant two line display has the contents of ANS displayed above the contents of KBD. From left to right, the characters displayed are mantissa sign, $D_9$, decimal point, $D_8$, $D_7$, $D_6$, $D_5$, $D_4$, $D_3$, $D_2$, $D_1$, $D_0$, blank, characteristic sign, $E_1$, and $E_0$. Positive signs are implied by no sign at all, while negative signs are displayed in their conventional form. The characteristic locates the decimal point relative to its displayed position. As an example, the number −112 is displayed as -1.120000000 02. The number zero is displayed by having all characters set to zero. Signs of the characteristic or mantissa can be either positive or negative when displaying zero.

All information enters the processor via 23 manually operated keys. Logically, these keys are organized into three groups: (1) operands - 0,1,2,3,4,5,6,7,8, and 9; (2) control operators - ERR, EXP, ANS, DEC, CHS, MEM, STO, and KBD; and (3) arithmetic operations −×,÷, ACC 0, ACC −, ACC +. Each of the keys is encoded into a unique five bit code by a diode encoding matrix.

The MSB, $B_4$, of the encoded signal differentiates between operators and operands. The four LSB of each operand code encode the operands in straight 8-4-2-1 BCD code.

An information line enters the processor from the keyboard indicating that a key is down. This signal commands the machine to exit from the display routine and to begin processing new data. A detailed analysis of the operand entry routine follows:

PROCESSING OPERANDS

When an operand key is depressed, the processor reads WIA to obtain the State of the Machine (SOM). This information will tell the processor whether the operand is a character of the KBD mantissa, a character of the KBD characteristic, or an auxiliary storage register address. The pertinent states of the SOM as they appear in WIA are given below. Dashes indicate don't care conditions.

SOM = 00000. This encoding identifies a "Positive Keyboard Entry" or PKE. It directs the processor to zero the KBD register and to enter the operand into $KD_9$ as a positive number.

SOM = 10000. This encoding identifies a "Negative Keyboard Entry" or NKE. It directs the processor to zero the KBD register and to enter the operand into $KD_9$ as a negative number.

SOM = 01——. This encoding informs the processor that the STO key has preceded the operand entry. The operand key depressed defines the address of an auxiliary storage register. As a result, (ANS) → Mi where $i$ is the operand key actuated. Note: on any inter-register transfers, only the characteristic and mantissa along with their signs are transferred. The IA characters do not transfer.

SOM = 11——. This encoding informs the processor that the MEM key has preceded the operand key. The operand key defines the address of an auxiliary storage location. As a result, $(M_i)$ → KBD.

SOM =–011–. This encoding directs the processor to put $(KE_0)$ → $KE_1$ and to enter the operand into $KE_0$.

SOM = –01–0. This encoding informs the processor that the position of the decimal point has not been fixed.

SOM = –01–1. This encoding informs the processor that the position of the decimal point is fixed.

SOM =–010–. This encoding directs the processor to enter the operand into the proper KBD mantissa character location. The address of the proper location is stored in TIA and is updated each time a new operand is entered.

The flow chart covering the proper response to operand keys is shown in FIG. 1. Throughout various figures in the flow charts, certain states are referred to by letter references in the figures. In this description, the letter references are prefaced by the number of the figure in which the reference appears. In state 1A, the SOM is obtained from WIA. If the SOM is a PKE or NKE, signifying a new mantissa entry, zero is stored into TIA, states 1B and 1C, thereby initializing so that the operand will be stored in $KD_9$ as directed in L. After initializing TIA, the KBD register is cleared to positive zero, 1D, if PKE or to negative zero, 1E, if NKE.

Following the PKE or NKE zeroing, the SOM is updated to 00100 if the operand key actuated was not a zero, 1G. The SOM is left at PKE or NKE if the operand key was a zero key.

The logic directing control to 1H determines that the characteristic should be incremented by 1 count. This logic allows the processor to assign the proper exponent to integers and decimal fractions.

The operand is stored into the proper mantissa character by the logic provided in 1K and 1L.

The SOM directs the processor to enter the operand into the KBD characteristic in states 1M and 1N.

When the SOM directs control to 1P or 1Q, the auxiliary storage features are put into effect. State 1R sets the SOM to PKE.

PROCESSING CONTROL OPERATORS

Figure 2:
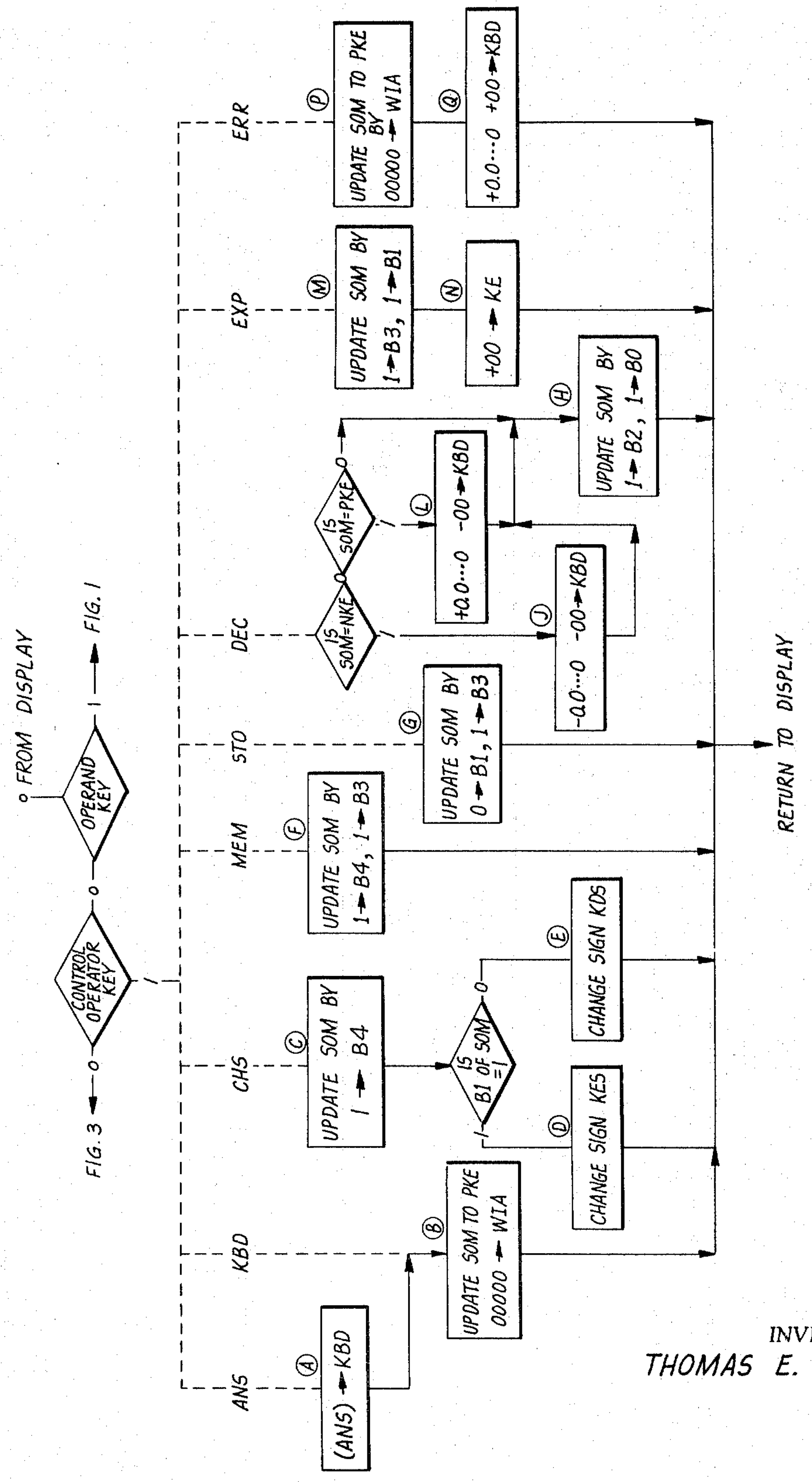
FIG. 2 is a diagram illustrating the manner in which the calculator operates in response to control operator keys.

FIG. 2 shows the processor response to control operator keys. Each of the eight unique operator codes directs control to one of the eight entrances shown.

In state 2A, (ANS) → KBD. This allows the answer of a previous term to be used as a factor in a new term. State 2B establishes a PKE condition in SOM. The KBD control operator is not required for proper machine operation. Its purpose is to give continuity to operations using the (KBD) as factors in a computation. For example, a term can be cubed by either of the following methods: (1) enter factor, followed by the X, KBD, X, KBD, and ACC 0 operation keys: (2) enter factor, followed by X, X, and ACC 0. The inexperienced operator appreciates the continuity of the first method where the structure has operands and operators alternating. The experienced operator will prefer the second method becuase it involves fewer key operations.

In states 2D and 2E, the sign of KES and KDS are changed, depending upon the SOM. If the SOM is PKE in 2C, it will be changed to an NKE. This operation in effect prepares the machine to enter a negative mantissa if the next key depression is an operand (state 2E, FIG. 1) or a decimal point (state 2J, FIG. 2).

States 2F and 2G update the SOM to recognize the next operand as an auxiliary storage address. (Refer to FIG. 1, states 1P and 1Q).

In states 2L and 2J, the processor zeros KE to minus zero and zeros KD to plus zero for PKE or minus zero for NKE. In state 2H, it then updates the SOM to a "decimal fixed" (1 → $B_0$) and "enter digit" (1 → $B_2$) state.

When an EXP control operator occurs, state 2M, the SOM is updated to enter further operands into KE (FIG. 1, states 1M and 1N) and zeros KE to positive zero in state 2N.

In state 2P, the ERR control operator directs the processor to set the SOM to PKE. The KBD register is then cleared to positive zero in 2Q.

PROCESSING ARITHMETIC OPERATORS

Figure 3:
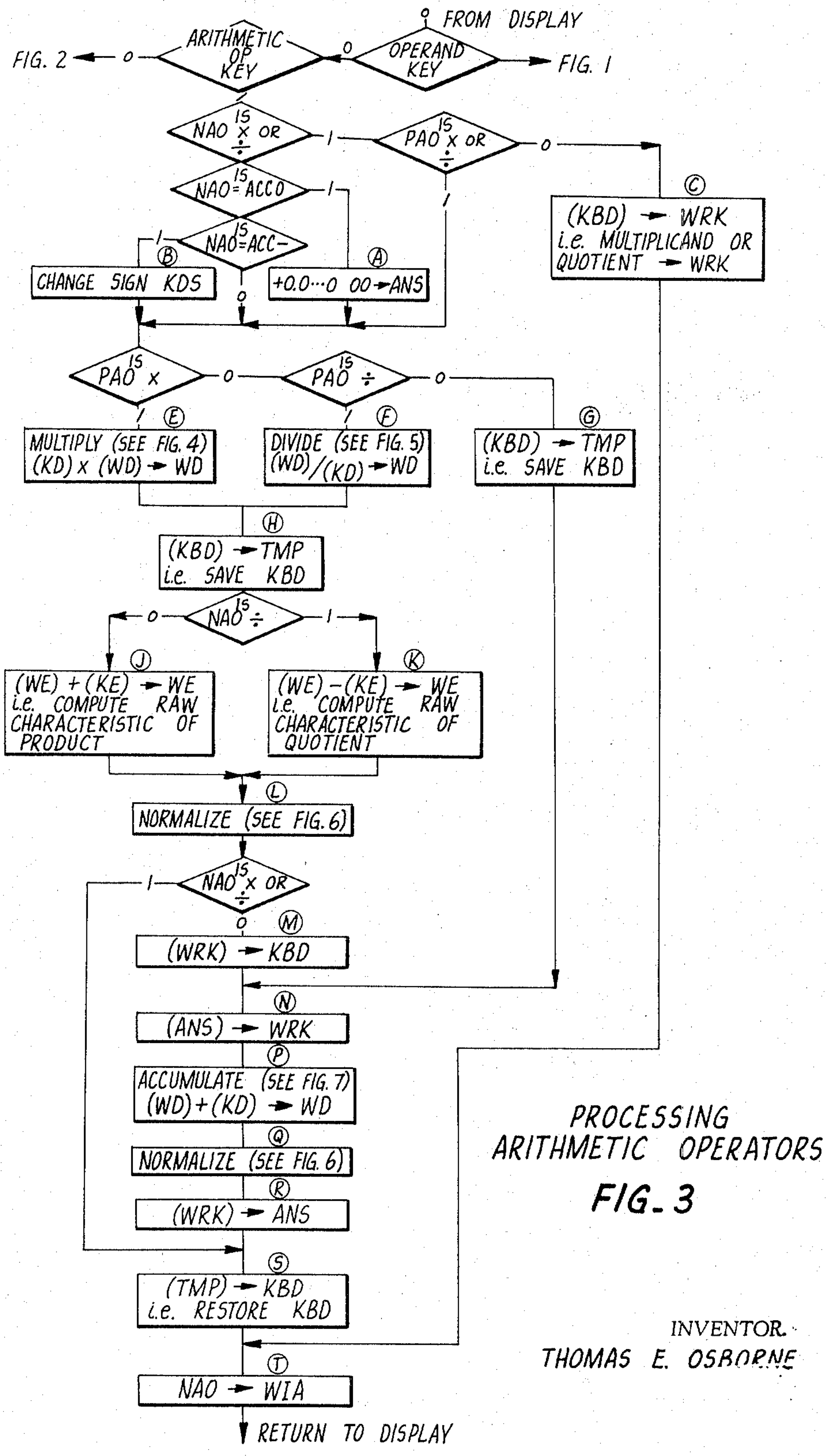
FIG. 3 is a diagram illustrating the manner in which the calculator operates in response to arithmetic operator keys.

The method of processing arithmetic operators is shown in FIG. 3. Two new symbolic abbreviations are introduced in this section. The arithmetic operator causing control to be sent to the arithmetic operation section is defined as the New Arithmetic Operator, abbreviated as NAO. The previous Arithmetic Operator, abbreviated as PAO, occupies AIA. Notice that the NAO of any arithmetic operation becomes the PAO for the next arithmetic operation when an arithmetic oeration is complete, state 3S. The fact that the processor is able to recall the previous arithmetic operation allows the multiply and divide operators to precede all multipliers and divisors. This differs from the Lukasiewicz or parenthesis free notation which requires the multiply or divide operator to follow the multiplier or divisor.

When control enters state 3A, the ANS register is zeroed. If control is then routed through 3G to 3N, 3P, 3Q, 3R, 3S and 3T, the processor accumulates the zero in the ANS register to the (KBD) and places that result in ANS, i.e., (ANS) + (KBD) → ANS. Since the ANS was zeroed in 3A, the effect is that (KBD) → ANS. When control is routed from state 3A through 3E or 3F to the remaining states, the product or quotient formed is accumulated to (ANS). This results in the product or quotient appearing in ANS.

When control enters 3G as a result of an ACC +, the processor responds by (ANS) + (KBD) → ANS. If the ACC + operator sends control to 3E or 3F, the resultant product or quotient is accumulated to the (ANS). The result is (ANS) + product or quotient → ANS.

The ACC − arithmetic operator causes control to go to state 3B where the sign of KBD is changed. The resultant arithmetic computations are identical to those resulting from the ACC + operator except that (ANS) − (KBD) → ANS when control is routed through 3G and (ANS) − product or quotient → ANS when control is given to 3E or 3F. Note that KDS remains changed after passing through 3B.

State 3C enters multiplicands and dividends into the WRK register.

In state 3E, (KBD) X (WRK) → WRK. In state 3F, (WRK)/(KBD) → WRK. For a detailed description of the multiply and divide operations, see the "Multiplication" and "Division" sections which follow.

States 3G and 3H save the KBD register in TMP, thereby freeing KBD for other purposes.

The "raw characteristic" of a product or quotient is formed in 3J or 3K. The raw characteristic is simply (KE) + (WE) → WE for products and (WE) − (KE) WE for quotients. If a product results in an overflow, i.e., the product of two normalized mantissas is greater than or equal to 10, the raw characteristic must be incremented one count to obtain the true characteristic, and the product must be normalized by shifting it one position to the right. Correspondingly, if a quotient overflows (the division of two normalized mantissas resulted in a quotient greater than or equal to one), the true characteristic and the quotient must be shifted one position right to normalize. When the quotient is not overflowed, the raw characteristic must be decremented by one count to obtain the true characteristic. Normalizing is accomplished in 3L. Details of the normalizing procedure are discussed under a separate heading, "Normalize."

In state 3M, the product or quotient formed in 3E or 3F is transferred into KBD to become an addend in a forthcoming algebraic accumulation in 3P. The answer to the previous term, or zero if control passed through 3A, is transferred into WRK in state 3N. This becomes the augend of the algebraic sum formed in 3P. After the answer to a new term is formed in 3P, that answer is normalized in 3Q and transferred into ANS in 3R.

The KBD register is restored in 3S and the NAO becomes the next PAO in 3T.

Figure 41:
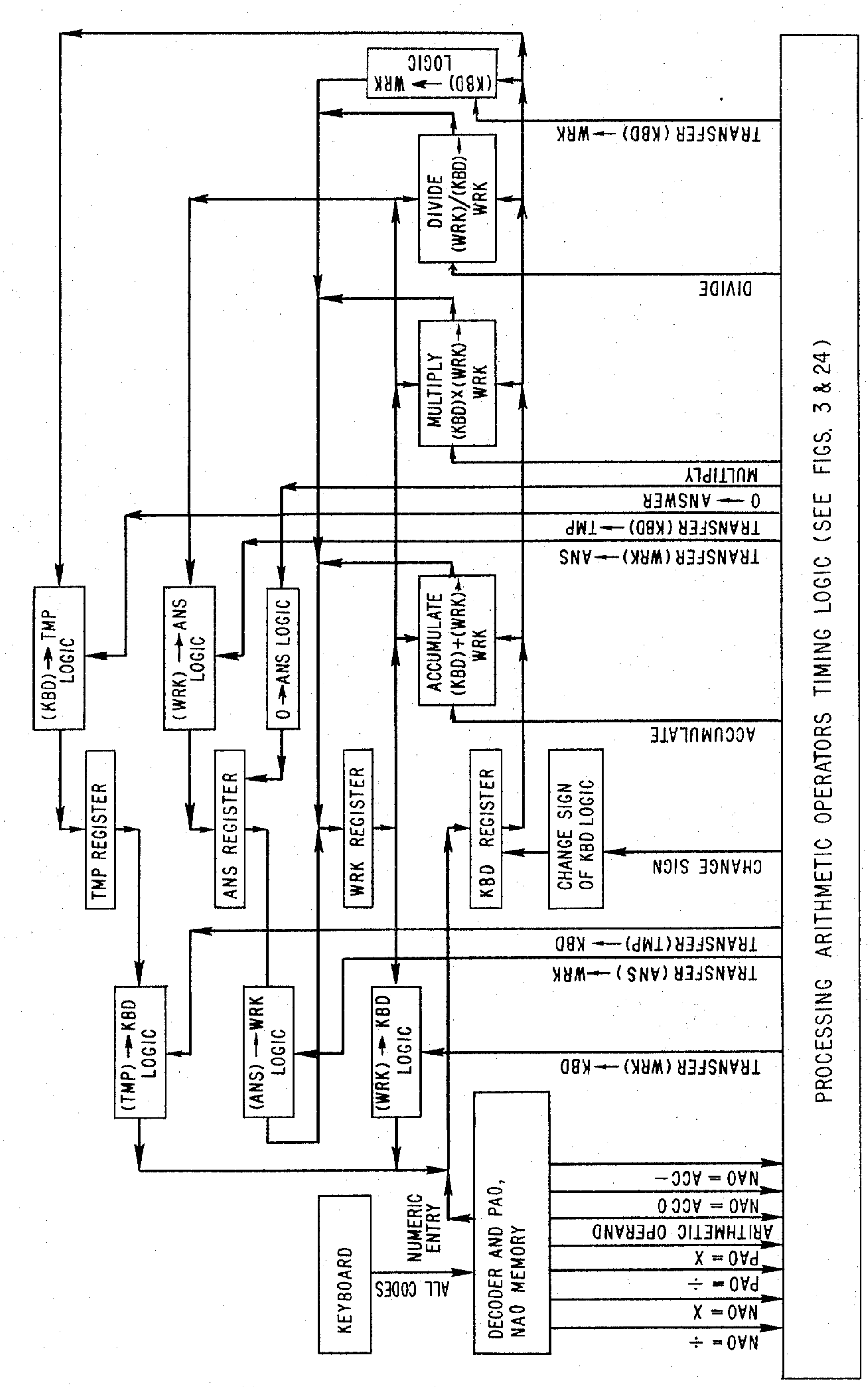
FIG. 41 is a simplified block diagram of logic circuits employed in processing arithmetic operators as shown in FIG. 3.

A simplified block diagram of logic circuits employed in processing the arithmetic operators is shown in FIG. 41. The detailed construction of these logic circuits is incorporated in the logical equations given hereinafter.

ADDITION

The add subroutine forms the non-algebraic sum of either the mantissa or characteristic, i.e., |(WD)| + |(KD)| → WD or |(WE)| + |(KE)| → WE. The contents of the KBD register, WDS, and WES are not altered by the addition process.

Addition occurs one character at a time beginning at $D_0$ for mantissa additions or $E_0$ for characteristic additions and progressing through $D_9$ or $E_1$. If a carry occurs, a carry flip flop will contain a "carry" signal. The logic for any character procedes in the following manner: the KBD character is read, and if a carry is present, the BFF are incremented. The four LSB of the BFF are transferred into four other flip flops connected with logical circuitry allowing them to be decremented in straight binary fashion. The WRK character is then read. The four flip flops containing the old KBD character are then decremented until their contents become zero. For each decrement, the (BFF) are incremented 1 count. Since incrementing the BFF is cyclic 0 – 9 with a carry occuring on 9 to 0 transitions, the sum of the KBD character and the WRK character, augmented by the condition of the carry flip flop, is in the BFF. A store command places the sum in the appropriate WRK character. The process is repeated on progressively more significant characters until the addition is complete.

COMPLEMENTING

The 10's complement of a mantissa or characteristic is formed by beginning at $D_0$ or $E_0$ and progressing through $D_9$ or $E_1$, looking for a non-zero character. When one is found, the 9's complement of that character is obtained and incremented by one count. The 9's complement of each remaining character is formed. Complementing also results in a change of sign of the mantissa or characteristic. The 10's complement of zero results in a one condition being set into the carry flip flop.

ALGEBRAIC SUMS

The system employs an improvement on the logic described on pages 168–170 of the book *The Logic of Transistor Digital Computers* by Maley and Earle, Prentice-Hall, 1963, to form algebraic sums of the mantissas or characteristics, i.e., (KE) + (WE) → WE or (KD) + (WD) → WD. Again, overflows resulting from algebraic sums appear in the carry flip flop. The algebraic addition of two numbers A and B is performed in accordance with the following rules:

1. If the signs of A and B are different, form the 10's complement of A including the sign of A. Thus, the 10's complement of −6.4021 is +3.5979.
2. Then add A + B using the complemented A if it was formed in step 1. The sum of this addition carries the original sign of B whether A was complemented or not.
3. When A was not complemented under step 1, the sum calculated in step 2 is the arithmetic sum (this is simple addition).

4. When A was complemented under step 1, the sum calculated in step 2 is further processed to get the algebraic sum (this is the case of subtraction or addition of terms with different signs, and subtraction is performed simply by changing the sign of one term before arithmetic addition), and this further processing is performed in accordance with the following rules:
   a. When the sum has an overflow, the overflow is dropped, and the sum calculated in 3 with its sign, but dropping the most significant digit, is taken as the arithmetic sum. The most significant digit here is a "carry" number which "overflows" the normal capacity of the register.
   b. When the sum has no overflow, the 10's complement of the sum if formed, including the complement of the sign of the sum, and this recomplemented sum is taken as the arithmetic sum.

Arithmetic addition following these rules may be understood from the following examples of the arithmetic addition of A and B.

EXAMPLE I

A = 4.2361
B = −1.5926
Step 1, form 10's complement A′ of A (A′ = A − 10 = −5.7639)
A′ = −5.7639
B = −1.5926
A′ + B = −7.3565 (step 2)
Step 4*b*, recomplement giving 10 − 7.3565 = 2.6435 (answer)

EXAMPLE II

A = −4.2361
B = 1.5926
complement A (A′ = 10 + A = +5.7639) (step 1)
A′ = +5.7639
B = +1.5926
A′ + B = +7.3565 (step 2)
step 4*b*, recomplement giving 7.3565 − 10 = −2.6435 (answer)

EXAMPLE III

A = −1.5926
B = 4.2361
complement A (A′ = 10 + A = +8.4074) (step 1)
A′ = + 8.4074
B = + 4.2361
A′ + B = +12.6435 (step 2, note numeral 1 is an "overflow")
step 4*a*, drop overflow, answer is 2.6435

EXAMPLE IV

A = +1.5926
B = −4.2361
complement A (A′ = A − 10 = −8.4074) (step 1)
A′ = −8.4074
B = − −4.2361
A′ + B = −12.6435 (step 2)
step 4*a*, drop overflow, answer is −2.6435

Figure 15:
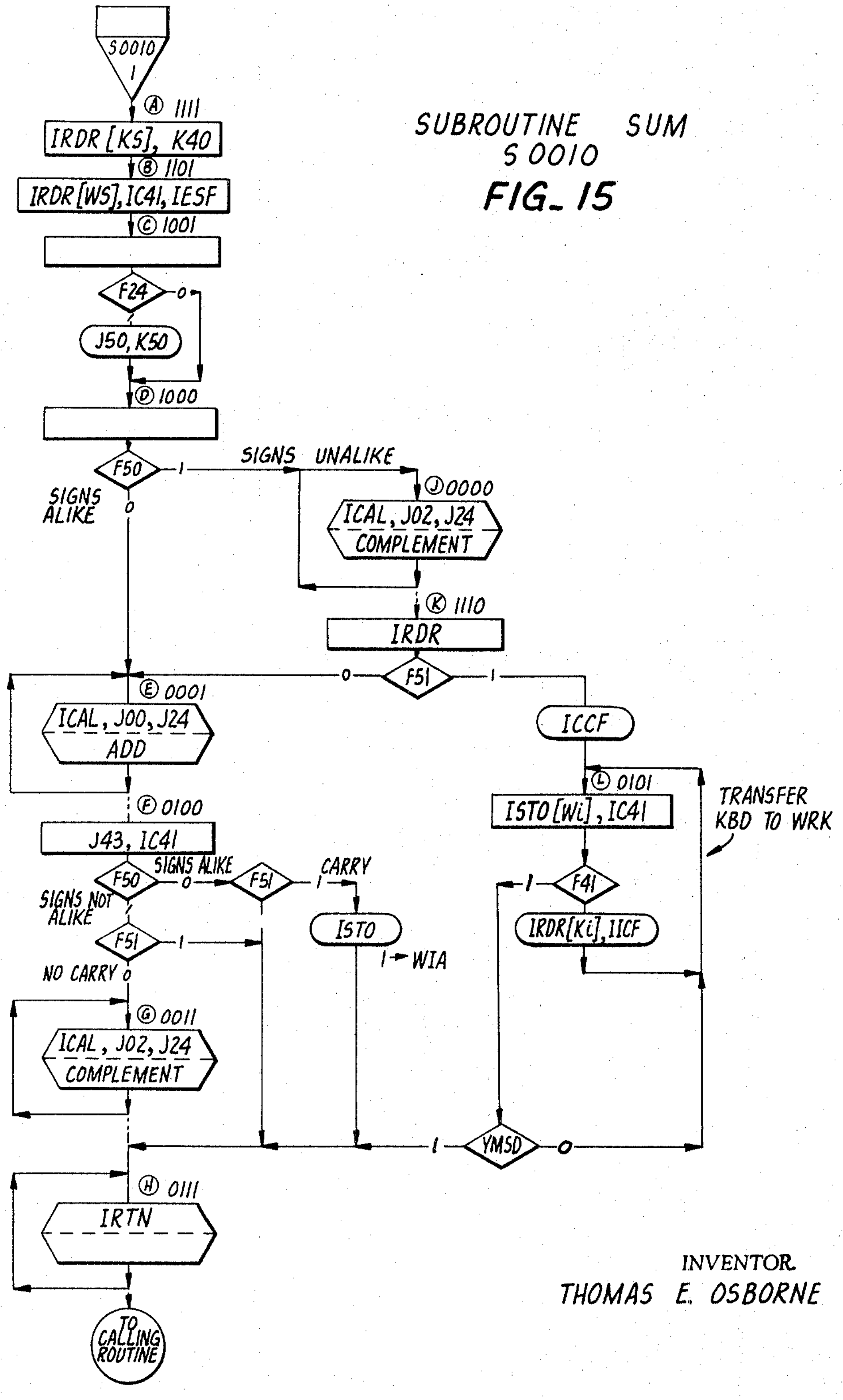
FIG. 15 is a detailed flow chart of the sum subroutine.
Figure 16:
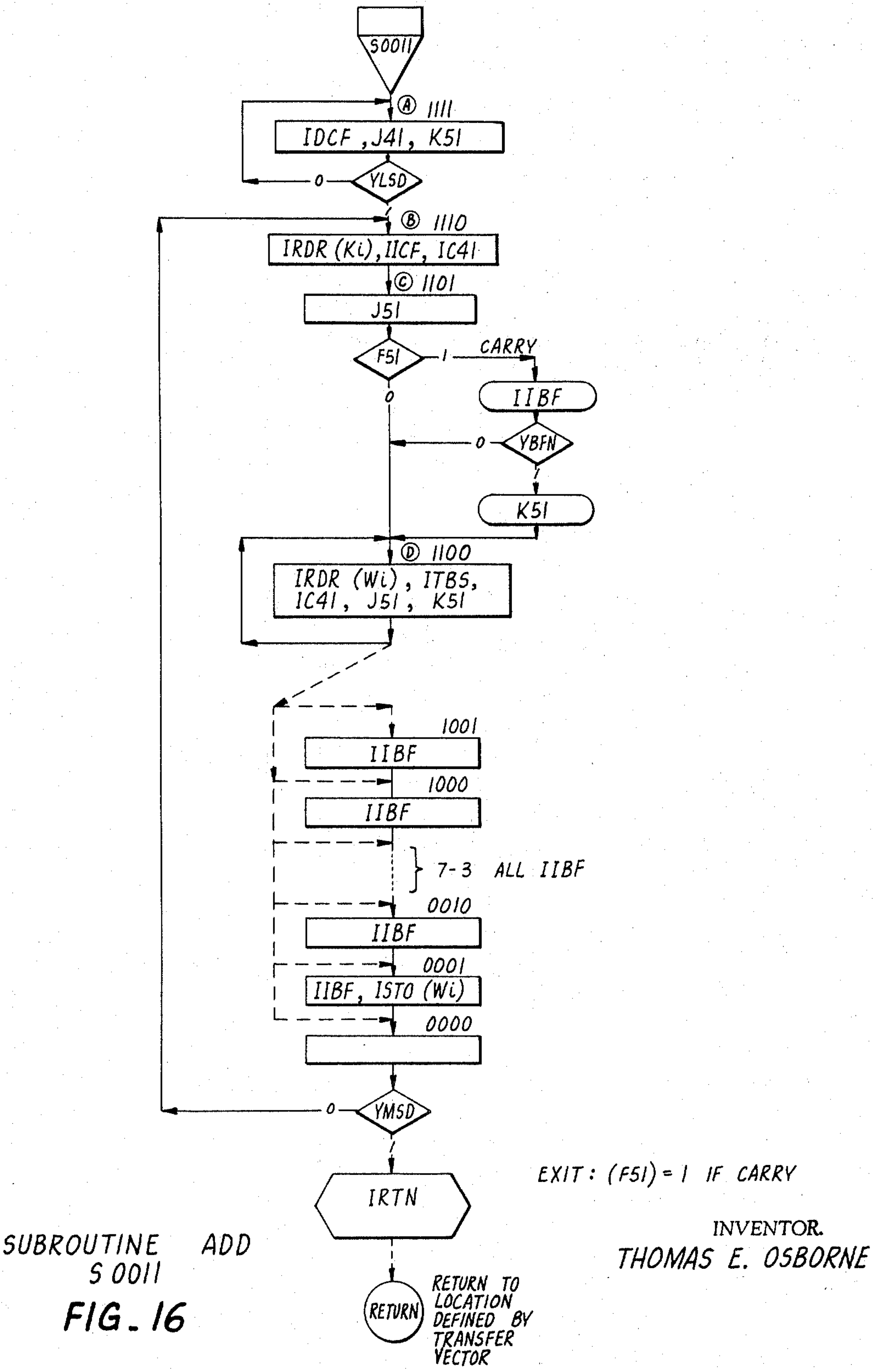
FIG. 16 is a detailed flow chart of the add subroutine.
Figure 40:
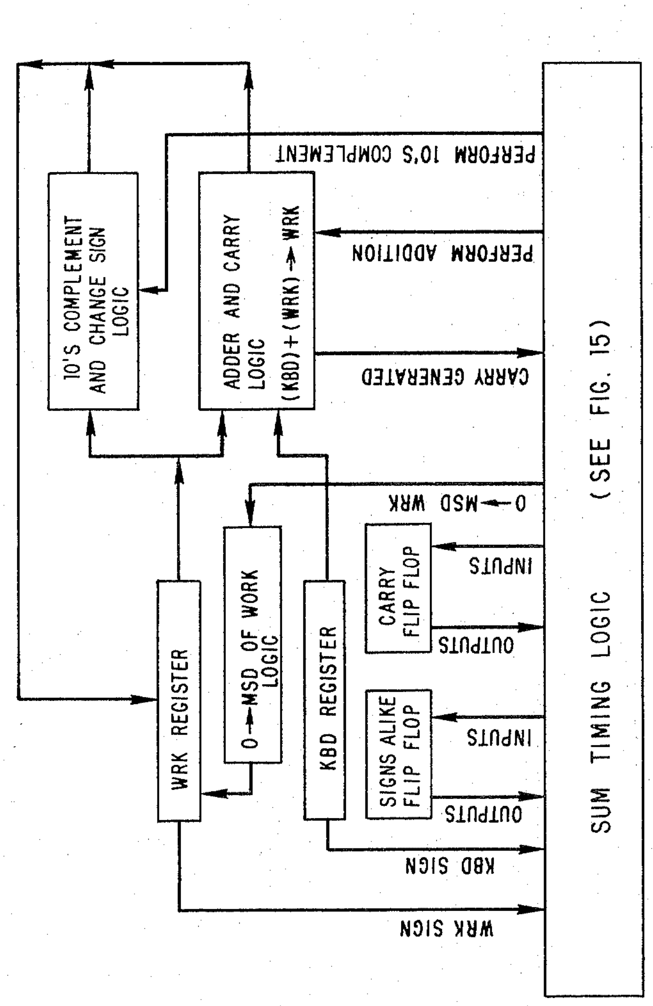
FIG. 40 is a simplified block diagram of logic circuits employed in performing the sum subroutine as shown in FIG. 15.

A flow chart of the subroutine for calculating algebraic sums is shown in FIG. 15, and a simplified block diagram of logic circuits employed in performing this subroutine is shown in FIG. 40. The detailed construction of these logic circuits is incorporated in the logical equations given hereinafter for the sum subroutine.

SHIFTING

The mantissa of any register can be shifted in four possible ways.

1. Right Shift, RS. Each character of the mantissa is shifted one position to the right. Zero is shifted into $D_9$ and ($D_0$) are lost. The mantissa sign is preserved.
2. Long Right Shift, LRS. LRS is the same as the RS except that the four LSB of the IA character are shifted into $D_9$. Zero is shifted into the IA character. The signs of $D_9$ and IA are not shifted.
3. Left Shift, LS. Each character of the mantissa is shifted one position to the left. Zero is shifted into $D_0$ and ($D_9$) are lost. The mantissa sign is preserved.
4. Long Left Shift, LLS. LLS is the same as LS except ($D_9$) are shifted into IA. The signs of $D_9$ and IA are not shifted.

MULTIPLICATION

The process of multiplication is shown in FIG. 4. It will be seen that a 19 or 20 digit product will be formed with automatic truncation occuring in the nine least significant characters. The 10 or 11 most significant characters of the product appear in WRK when the multiplication is complete. The (KBD) are unchanged by the multiplication process. The algebraic sign of the product is placed in WDS.

Upon entering the multiplication subroutine, the multiplier and multiplicand are in KBD and WRK respectively. In state 4A, the multiplicand is sent to TMP. WD is then zeroed in state 4B. This initializes the partial product accumulator to zero.

The signs of the multiplier and multiplicand are compared in 4C, and the proper product sign is sent to WDS.

In state 4D, the least significant digit of the multiplier is placed into TIA. The (TD) are then shifted one position to the right to place the next least significant digit of the multiplicand into $TD_0$. The binary number 1111 is sent into $TD_9$ in 4F. As partial products are formed, the 1111 in $TD_9$ shifts to $TD_0$. When it arrives in $TD_0$, the product has been formed and control is sent to state L of FIG. 2.

Before forming a partial product, the contents of WRK undergo a LRS in 4G so that the partial product to be formed will accumulate into the proper position.

In 4H, the partial product multiplicand is decremented by one count in straight binary fashion. When the four LSB of TIA become 1111, a partial product has been computed and control is directed toward 4D to begin forming a new one.

Partial products are formed and accumulated to form the total product in 4J. The total number of passes through J is determined by the number placed in TIA during state 4D. A tally of the product accumulations resulting in a carry is kept by state 4K. The LRS in 4G causes these carrys to shift into $WD_9$ and become part of the total partial product. Notice that products of normalized multipliers and multiplicands having a value of 10 or more result in an overflow condition upon exit. In other words, the most significant digit of the product is in WIA. The overflowed condition indicates that the raw characteristic computed in state E of FIG. 3 must be incremented by one count. This adjustment and the LRS required to restore the product to normal form are executed in state L of FIG. 3.

DIVISION

Upon entering the divide subroutine, the dividend is in WD and the divisor is in KD. The divide subroutine loop forms the one's complement of each BCD quotient character. In state K, after the quotient is developed in TMP, the individual characters are complemented, forming the true BCD quotient. The division process is similar to that employed by mechanical rotary calculators.

In state 5A, TIA and TD are zeroed in preparation to receiving characters of the quotient. If a division by zero is attempted, control is directed to state 5B which alerts the user that a division by zero has been attempted. The processor remains in 5B until the ERR operator is activated.

For meaningful divisions, control is sent to 5C where the algebraic sign of the quotient is determined and sent to TDS.

In state 5D, the 10's complement of the divisor is formed. Since the calculator has no subtractor, per se, it substracts by adding the 10's complement of the subtrahend to the minuend.

The complemented divisor is added to the dividend (or remainder) in 5E. If a carry occurs, control is routed to 5H where the 1's complement of quotient characters is formed by successively decrementing $TD_0$. If no carry occurs and (WIA) $\neq$ 0, control goes to 5G where the MSD of the remainder is decremented. When there is no carry and (WIA) = 0, an overdraft has occurred. If (TIA) $\neq$ 0, the entire quotient has been formed and control is sent to 5K. When (TIA) = 0, the partial quotient undergoes a long left shift in 5F to make room for the next 1's complement quotient character in $TD_0$. The overdraft is restored by recomplementing KD in 5D, and adding the true value in KD to the remainder in 5E. Since this restoration always results in a carry, control is sent to 5H where ($TD_0$) are decremented from 0000 (the LLS in 5F put zero in $TD_0$) to 1111. Control is sent from 5H to 5J because (TIA) = 1111.

The LLS of WRK in 5J adjusts the remainder into a new dividend. Control is sent to 5D where the 10's complement of KD is again formed and the repeated subtraction process occurs to form the 1's complement of the new quotient character.

Since the 1's complement of each BCD decimal digit is a non-zero term, it follows the ($TD_0$) can not be zero after forming the first digit of the quotient. As successive quotient characters are formed, the non-zero term progresses toward TIA by the LLS in 5F. When it finally arrives in TIA, the division is complete. After forming the final character of the quotient control is sent to 5K where the true value of the quotient is obtained by forming the 1's complement of each character. If (TIA) is now zero, the quotient of the normalized dividend and divisor was less than 1. The raw characteristic formed in 5K must be decremented one count. If (TIA) is non-zero, the raw characteristic is correct, but the quotient must undergo a long right shift to be in normal form. Characteristic corrections and normalization occur in FIG. 3, state L.

Figure 5:
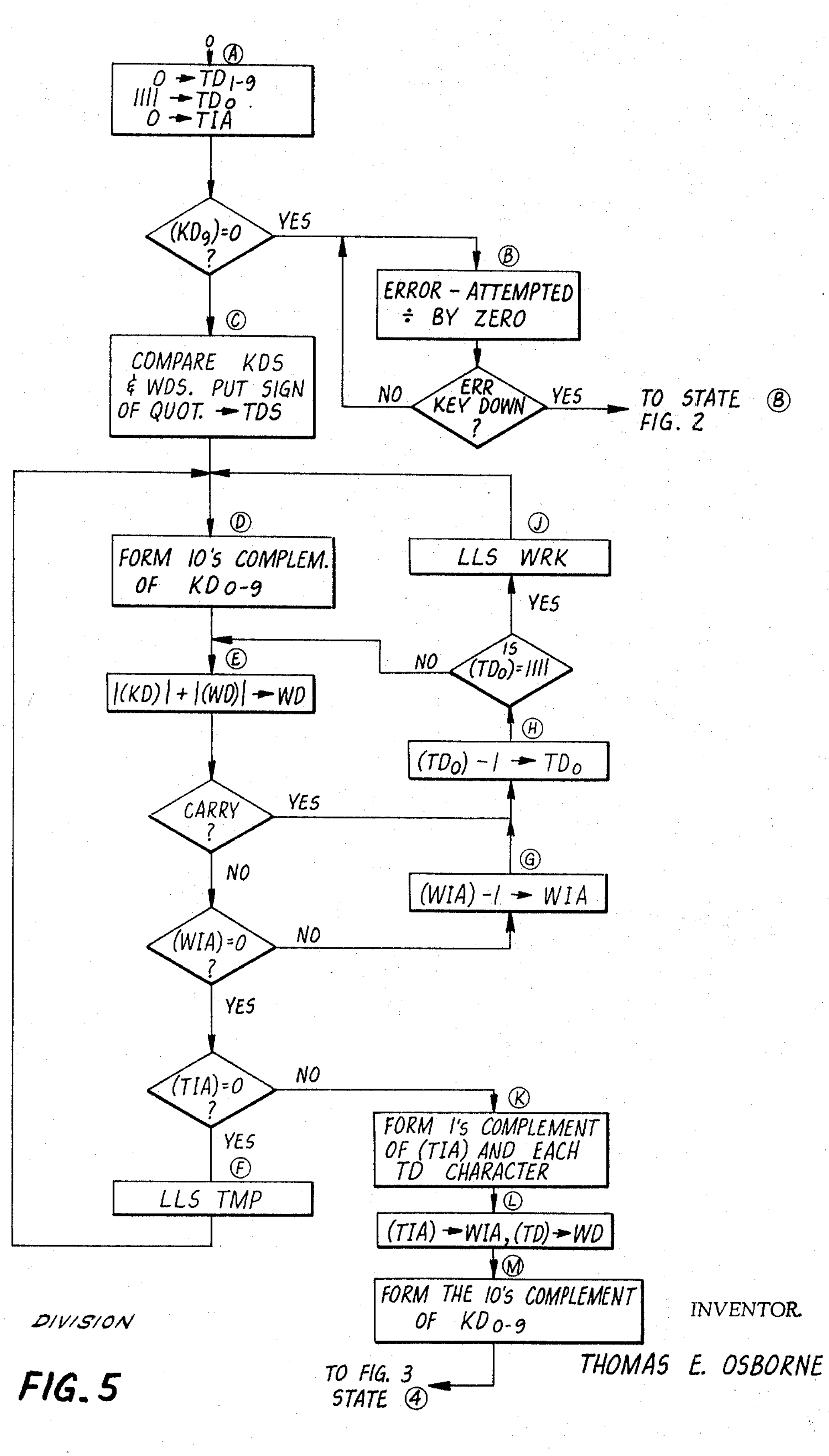
FIG. 5 is a diagram illustrating the manner in which the calculator operates in response to the divide key.

The quotient is transferred from TMP to WRK in state L, FIG. 5. In 5M, KD is restored by forming the 10's complement of KD.

NORMALIZE

Normalize shifts the mantissa which is the result of a multiplication, division, or accumulation into normal form and converts the raw characteristic accompanying the mantissa into a true characteristic.

Figure 6:
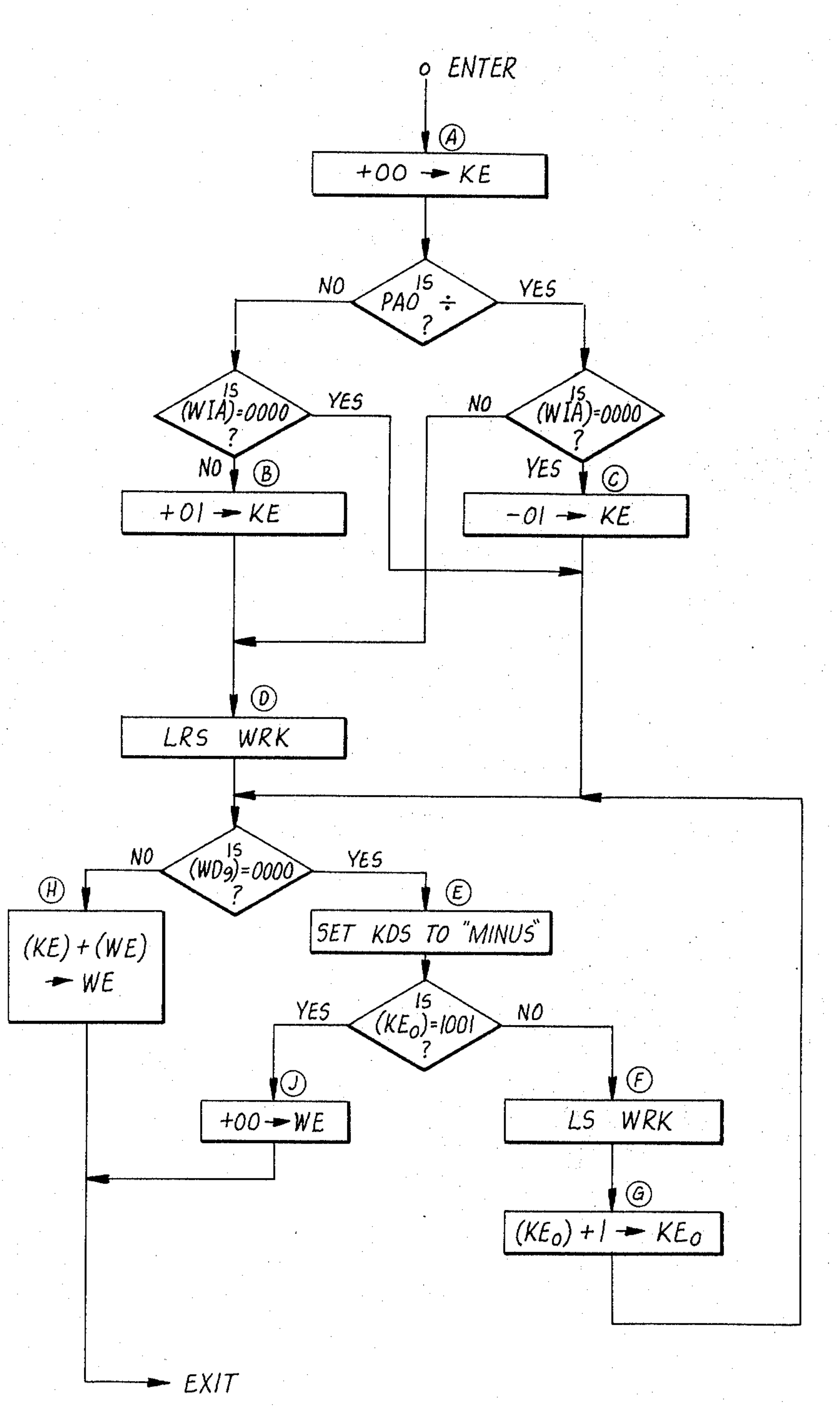
FIG. 6 is a diagram illustrating the manner in which the calculator normalizes numbers.

In state A, FIG. 6, KE is set to zero. If the previous arithmetic operation is ÷ and (WIA is zero, the raw characteristic must be decremented by one, hence a −01 → KE in state 6C. If the PAO was not a divide and (WIA) is not zero, the raw characteristic must be incremented by one, hence 01 → KE in 6B. (The actual incrementing or decrementing process occurs in 6H when (KE) + (WE) → WE.)

If an overflow has occurred, the mantissa is placed in normal form by state 6D. When control passes through 6D, it will generally go directly to 6H where the true characteristic is formed. Certain circumstances will result in ($WD_9$) = 1, routing control to 6E. These are: (1) a zero product, quotient or sum, and (2) a non-zero sum resulting in zero(s) in the most significant character(s).

The processor will left shift (WRK) in state 6F to get a non-zero digit into $WD_9$. Each shift is accompanied by an increment to $KE_0$ in 6G. IF the sum is non-zero, control is sent from 6G to 6H when the sum is shifted into normal form. The raw exponent of the number being normalized is updated in 6H to form the true exponent.

If, after nine shifts, the ($WD_9$) are still zero, control is sent from 6E to 6J where the true exponent is set to +00, resulting in (WRK) = 0.000000000 00. This is the proper indication for a normal zero.

ACCUMULATE

The accumulate subroutine shifts the characters in KD or WD so that their decimal points align. It then forms their algebraic sum.

Figure 7:
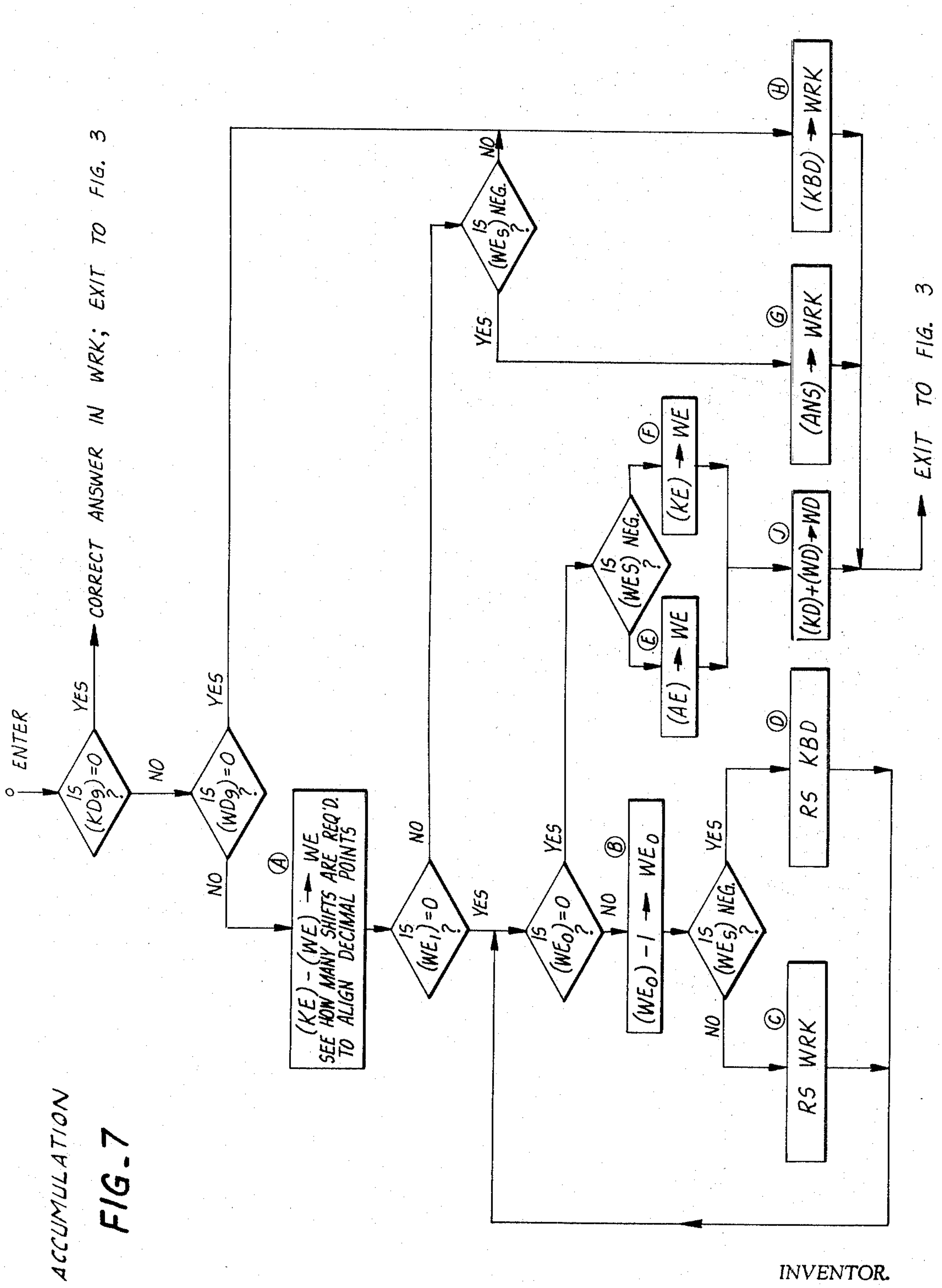
FIG. 7 is a diagram illustrating the manner in which the calculator operates in response to the accumulate keys.

When neither quantity to be summed is zero, control is sent to state A of FIG. 7. Here the value of (KE) − (WE) is fromed and sent into WE. This difference indicates how many shifts are required to align the decimal points. If the difference is positive, (WD) must be shifted right to achieve alignment. When the difference is negative, (KD) require right shifts for proper alignment. Shifting is accomplished in states 7C and 7D.

If more than nine shifts are required to achieve alignment, i.e., ($WE_1$) $\neq$ 0 upon leaving 7A, control is sent to 7G or 7H. If (WES) is positive, the number in KBD is the true sum so (KBD) → WRK in 7H. When (WES) is negative, the true sum is in (ANS) so (ANS) → WRK in state 7G.

The raw characteristic of the sum is lost in 7A. In &E and 7F, the raw characteristic (the characteristic of the number having the largest characteristic) is placed in WE. The mantissas are summed in 7J. Overflows resulting from this state are normalized and true characteristics are determined in state Q, FIG. 3.

The logic described thus far would interpret a normal zero as a larger quantity than a number having a negative characteristic. A portion, or all of the number having the negative characteristic could be lost by shifting if precautions are not taken to prevent such action. For this reason, control is sent directly from the input to the output if ($KD_9$) = 0. In other words, if (KBD) = 0, the true sum is already in WRK. On the other hand, when $(WD_9) = 0$ and $KD_9 \neq 0$, control is routed directly from the input to 7H where (KBD) → WRK.

STRUCTURAL ARRANGEMENT

Figure 8:
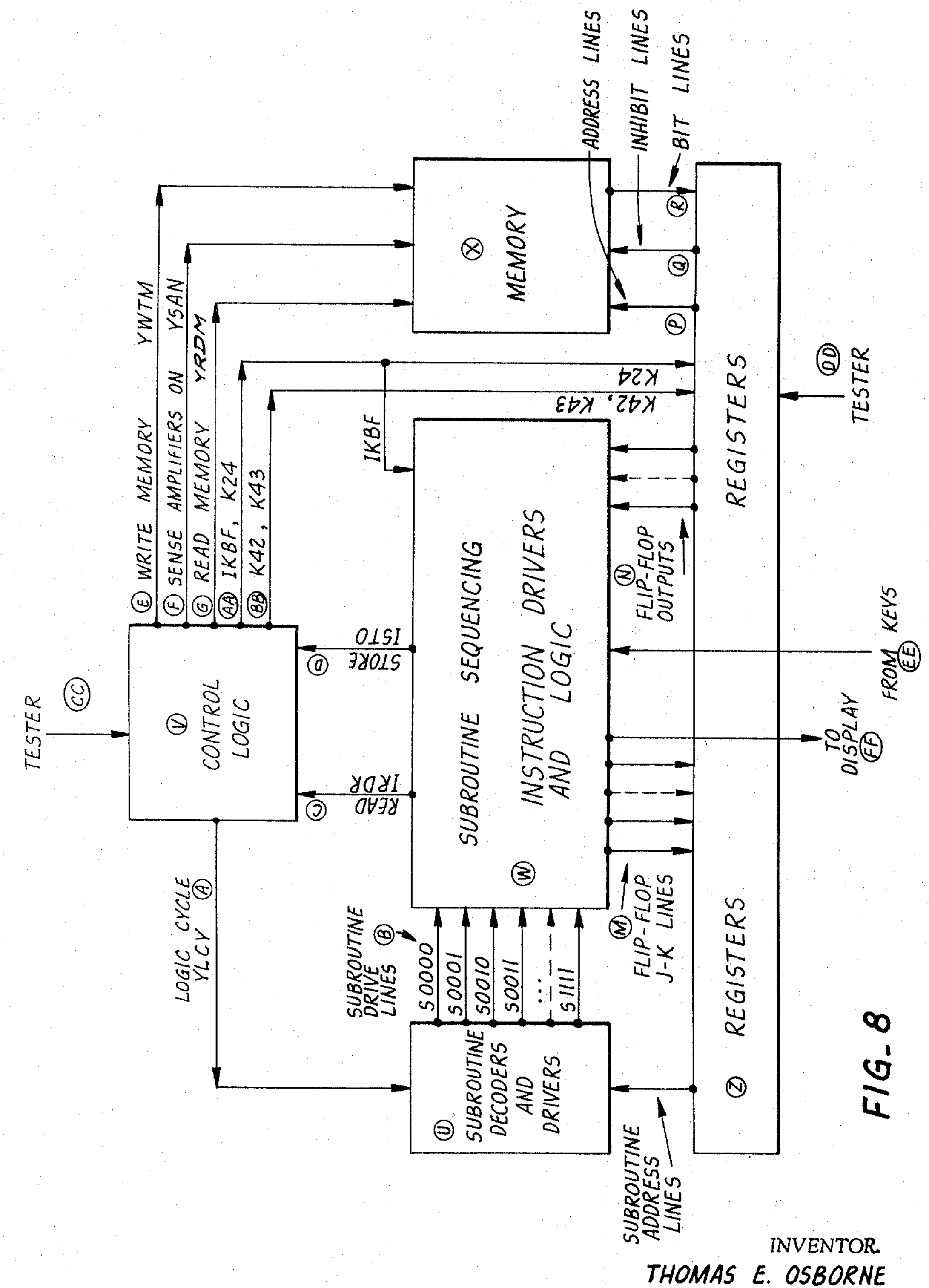
FIG. 8 is a block diagram of the electronic circuits employed in the calculator.

Referring to FIG. 8, the calculator's electronic section consists of control logic 8V, two fixed wired logic sections 8U and 8W, a random access memory 8X, flip flop registers 8Z, input lines 8EE and output lines 8FF, and, in addition, a tester can be connected to the calculator at 8DD and 8CC as explained more fully hereinafter.

Logic is performed within the calculator by properly sequencing the flip flop input lines 8M from the logic box 8W. The logic within this box has a dual responsibility; first, it determines the internal sequencing of events by controlling a set of eight flip flops (F13, F12, F11, F10, F03, F02, F01, F00) while controlling the remaining flip flops either directly by their input lines or indirectly by controlling "instructions" which are connected to other instructions or to flip flop inputs. Those instructions connected to other instructions must eventually terminate at an instruction which controls flip flop inputs.

Figure 9:
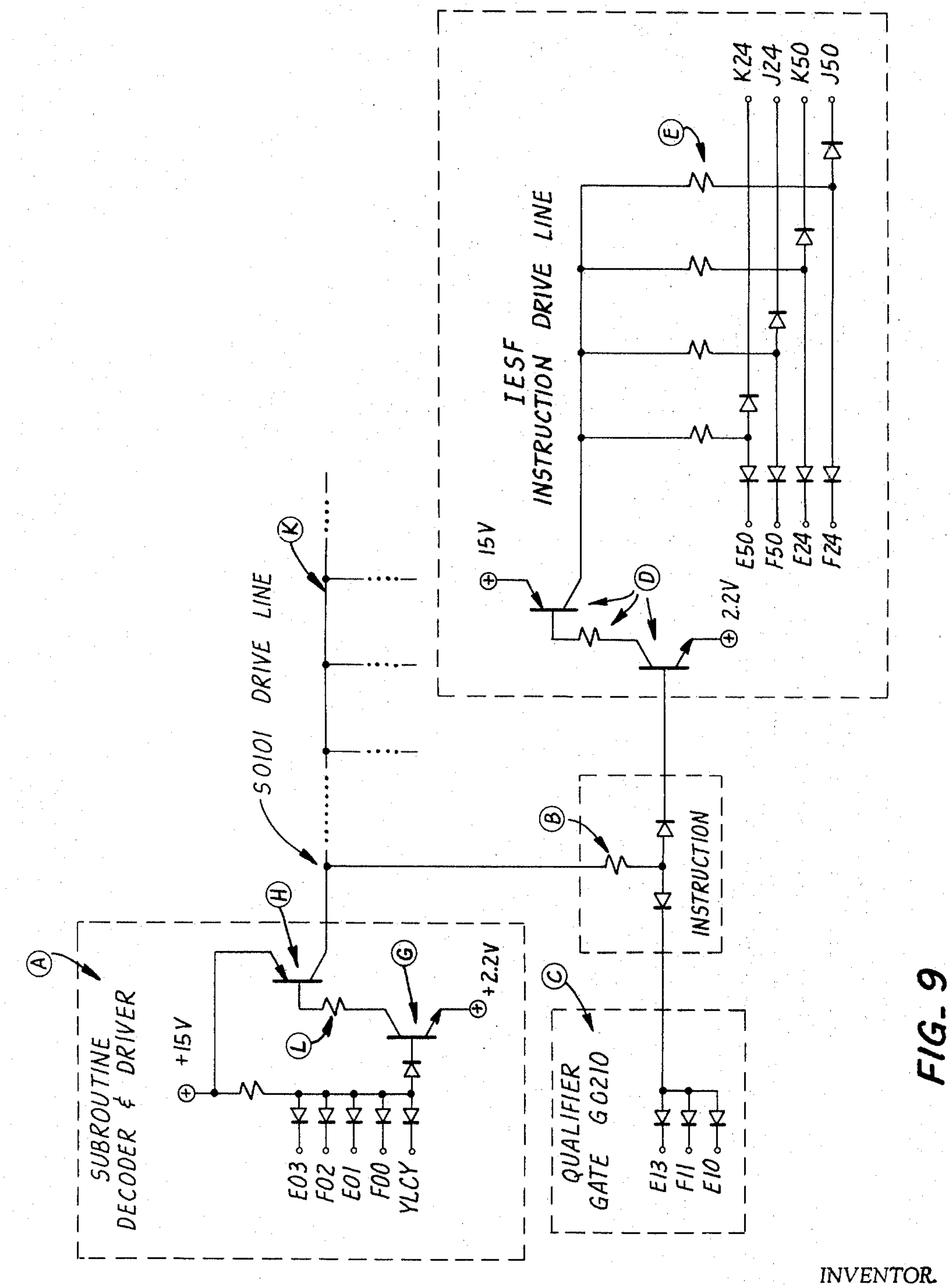
FIG. 9 is a schematic diagram of typical circuits employed in the calculator to execute logic functions by power switching.

Four of the flip flops that control internal sequencing are used as inputs to the subroutine decoders and drivers 8U. The 16 possible combinations of F03 – F00 flip flops are decoded and connected to a driver circuit (FIG. 9) which selects one of the 16 subroutine drive lines. The selected drive line is connected to the positive supply. The remaining 15 subroutine drive lines remain floating at near zero volts. A typical subroutine driver is shown in FIG. 9, 9A. Notice that the driver is qualified with the signal YLCY which emanates from the control logic 8V in FIG. 8. By this means, all subroutine drive lines are off when YLCY is false (0 volts).

The remaining flip flops that determine internal sequencing (F13, F12, F11 and F10) are decoded into gates which are used to clamp signals coming from the subroutine drive lines via resistors B in FIG. 9. In order to achieve minimum cost, the clamping gates or "qualifiers" are not limited to the 16 possible four input gates. All of the eighty possible and-gates using F13, F12, F11, and F10, are developed. They are defined in a later section, a typical qualifier gate is shown in FIG. 9, 9C. These gates are used quite frequently throughout the system. Most of the internal sequencing is accomplished directly from the subroutine drivers and qualifiers formed from F13, F12, F11 and F10. It will be shown later how the states of the remaining flip flops will be used to form other qualifiers which in combination with the qualifiers from F13, F12, F11 and F10, will precisely define the internal sequencing.

The second responsibility of the logic box 9W is that of controlling the remaining flip flops either directly by actuating their inputs, or indirectly via instructions. FIG. 9 shows how a typical instruction is executed. Assume that the S0101 drive line is selected as is the qualifier gate E13·F11·E10 (E13 represents the 0 output line of F13, while F13 is the 1 output line.) Current passing through 9B then enters the instruction driver 9D. In response, the IESF (Instruction Exchange Sign and Fifty) instruction drive line is connected to +15 volts and current will pass through the resistors 9E. The logic of this instruction will cause the contents of flip flops F50 and F24 to be exchanged between each other.

Any of the 52 J–K input lines or 29 instructions may be connected to a subroutine drive line and executed when the qualifying conditions are met. In this way, complete control over the system is available at all times.

A brief description of all flip flops, instructions and qualifiers follows.

FLIP FLOP ASSIGNMENTS AND PRIMARY USES

| | |
|---|---|
| 0 0<br>0 1<br>0 2<br>0 3 | Primary Flip Flops (PFF), used to identify subroutines. |
| 1 0<br>1 1<br>1 2<br>1 3 | Secondary Flip Flops (SFF), used to identify states within subroutines. |
| 2 0<br>2 1<br>2 2<br>2 3<br>2 4 | Bit Flip Flops (BFF), used as data register for information into and out of the core memory. |
| 3 0<br>3 1<br>3 2<br>3 3<br>4 3 | Character Flip Flops (CFF), used to define character addresses in core memory. |
| 4 0<br>4 1<br>4 2 | Word Flip Flops (WFF), used to define word addresses in core memory. |
| 5 0<br>5 1 | Temporary Flip Flops (TFF), used as temporary information buffers such as for carry bits during an add. |
| 6 0<br>6 1<br>6 2<br>6 3 | Memory Flip Flops (MFF), used to determine core memory cycling and to allow the tester to be connected to the system. |

INSTRUCTIONS

| | | |
|---|---|---|
| 1. | IACE | Turns the CRT trace ON. |
| 2. | IBRS | Causes (BFF) to be shifted right one position, zeros enter F24 while bits leaving F20 enter F50 |
| 3. | ICAL | Used to call a subroutine. As a result of ICAL, the following events occur simultaneously:<br>1. 1 1 1 1 → SFF<br>2. (SFF) → BFF<br>3. 110 → F43, F42, F41<br>4. 1200 → CFF, (1,0,0) → F33, F31, F30<br>5. ISTO |
| 4. | ICCF | Causes (CFF) to change from MSD or LSD of Mantissa or exponent according to the following convention:<br>F10 = 1     F10 = 0<br>Do → D9     Do → E1<br>D9 → Do     E1 → Do<br>Eo → E1     D9 → Eo<br>E1 → Eo     Eo → D9<br>The ICCF instruction actually complements F30, and F31 at all times and complements F32 if F10 = 0. |
| 5. | IC40 | Complements F40. |
| 6. | IC41 | Complements F41. |
| 7. | IDBF | Decrements BFF, 8–4–2–1 Binary Cyclic, i.e., $17_8 - 0_8$ Cyclic. |
| 8. | IDCF | Decrements CFF, Binary Cyclic. |
| 9. | IDDL | Display Decode — Left Half of "E" Pattern. |
| 10. | IDDR | Display Decode — Right Half of "E" Pattern. |
| 11. | IDHD | Hold "Down" CRT Trace. |
| 12. | IDHL | Hold "Left" CRT Trace. |
| 13. | IDRD | Restore "Down" CRT Trace. |
| 14. | IDRL | Restore "Left" CRT Trace. |
| 15. | IDRR | Restore "Right" CRT Trace. |
| 16. | IESF | Exchange (F90) and (F24). |
| 17. | IIBF | Increment BFF. Counts 0–9 in 8–4–2–1 Cyclic. 1 → F50 when counting from 9 to zero, i.e., carry used in adding. |

INSTRUCTIONS

| | | |
|---|---|---|
| 18. | IICF | Increment CFF, Counts 0 – $17_8$ Cyclic. |
| 19. | IJBJ | 1 1 1 1 → F23, F22, F21, F20. |
| 20. | IKBF | 0000 → F23, F22, F21, F20. |
| 21. | IRDR | Read Memory into BFF and restore. |
| 22. | IRTN | Used to return from a called subroutine to the calling subroutine. In response to an IRTN, the following steps are executed simultaneously:<br>1. 1000 → PFF<br>2. 1200 → CFF, (1,0,0) → F33, F31, F30<br>3. 1 1 1 1 → SFF<br>4. 110 → F43, F42, F41<br>5. IRDR |
| 23. | ISTO | Stores (BFF) into Core Memory. |
| 24. | ITBS | (BFF) → SFF. |
| 25. | ITKB | Encoded Keys → Bit Flip Flops. |
| 26. | ITRA | Inter-subroutine Transfer. |
| 27. | ITSB | (SFF) → BFF, F24 Unchanged. |
| 28. | ITVF | Transfer Vector Decoding (F24 = 1). |
| 29 | ITVE | Transfer Vector Decoding (F24 = 0). |

Qualifier Gates

Eighty qualifier and-gates numbered in radix 3 from G0000 to G2221 are used. The ternary digit 0 defines the zero or E state of a flip flop as one input while the digit 1 defines the one or 1 state of the flip flop. The digit 2 means that the flip flop corresponding to that particular digit position is not used in forming the gate. The digit positions from, most significant to least significant position, define the inputs required from flip flops 13, 12, 11 and 10 respectively. Thus, the gate G0210 represents a connection of the wires E13, F11 and E10. These gates are defined by logical equations as explained below where the gate G0210 would be defined as follows:

$$G0210 = E13 \cdot F11 \cdot E10$$

The actual wiring of G0210 is shown in FIG. 9 at 9C.

In addition to these 80 qualifier gates, the following special qualifiers are used.

SPECIAL QUALIFIERS

| | | |
|---|---|---|
| 1. | YBFN | (BFF) = $9_{10}$(i.e., 2 1 0 0 1) |
| 2. | YBFU | (BFF) = $1_{10}$(i.e., 2 0 0 0 1) |
| 3 | YBFZ | (BFF) = 0 (i.e., 2 0 0 0 0) |
| 4. | YDNE | (CFF) = $D_9$ |
| 5. | YEOD | End of Display |
| 6. | YEZR | (CFF) = Eo |
| 7. | YKDN | Key Down |
| 8. | NKDN | Key Not Down |
| 9. | YLSD | (CFF) = Eo or Do |
| 10. | YLCY | Perform Logic Cycle |
| 11. | YMOD | Multiply or Divide Key Down |
| 12. | NMOD | Multiply or Divide Key Not Down |
| 13. | YNZE | Zero Key Not Down |
| 14. | NQ24 | |
| | to | Five Levels Encoding Keyboard Conditions |
| 18. | NQ20 | |
| 19. | YQAA | Special, YQAA = F24·F21·G0001 |
| 20. | YRDM | Read Memory |
| 21. | YRUN | Tester Switch Condition |
| 22. | YSAN | Sense Amplifiers ON |
| 23. | YSIN | (CFF) = Ds or Es |
| 24. | YSSR | Single Step Read Switch on Tester |
| 25. | YSSS | Single Step Store Switch On Tester |
| 26. | YSST | Single Step Switch On Tester |
| 27. | YWTM | Write Memory |
| 28. | YMSD | (CFF) = $E_1$or $D_9$ |

LOGICAL EQUATIONS

The circuitry of the calculator described herein is presented in the form of logical equations instead of circuit diagrams, since the circuitry is much less cumbersome and much more understandable in the form of logical equations. The logical equations are equivalent to circuit diagrams, and an operating calculator constructed as shown herein has been built directly from the logical equations without the intermediate step of preparing complete circuit diagrams. The logical equations are written in the form of X = Y · Z where the terms X, Y and Z denote electrical terminals which are connected together by wires and diodes, for instance, in such a way that terminal X receives a signal when terminals Y and Z are concurrently giving signals. (The · symbol between terms on the right hand side of the equation indicates that all of the events indicated on the right side of the equation must occur simultaneously to cause the event on the left side to occur.) The electrical terminals which are denoted by the terms in the logical equations are (1) the electrical terminals of certain mechanical switches such as the keyboard switches or switches like the YRUN switch mentioned in the preceding section, (2) the electrical terminals of flip flops, (3) instruction drive lines, etc., and (4) certain electrical terminals called gates.

Figure 29:
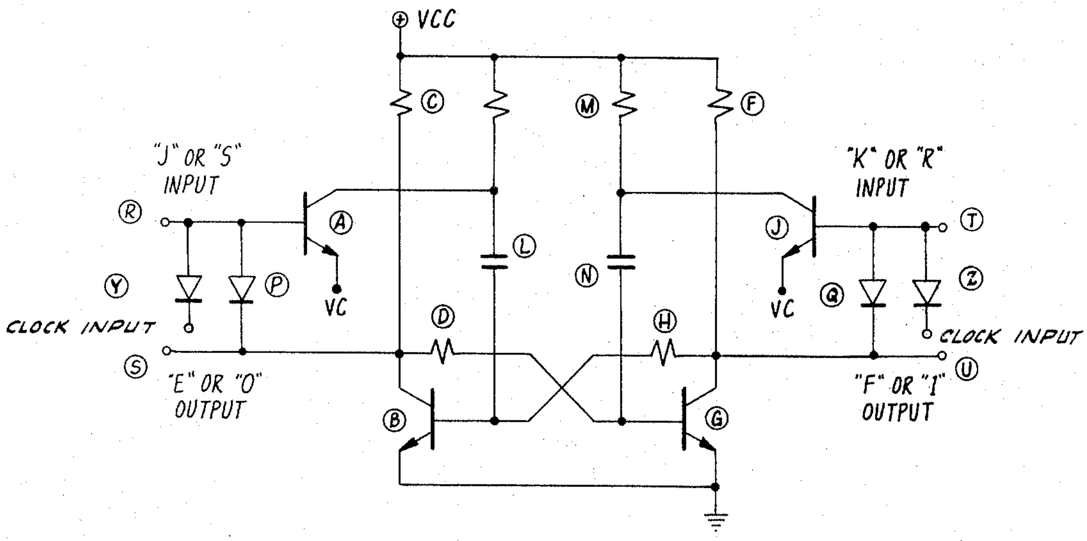
FIG. 29 is a schematic diagram of one of the flip-flop circuits used in the calculator.
Figure 29:
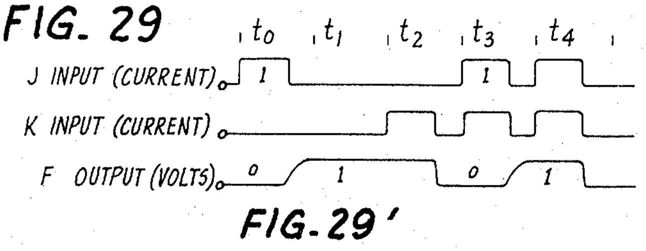

The flip flops (bistable devices) employed in the calculator, are preferably of the type known as J–K flip flops having two input terminals denoted by the letters J and K, and two alternately operable output terminals denoted by the letters E and F. The preferred flip flop is illustrated in FIG. 29, and is described in detail below. The flip flop operates as follows: An input pulse at terminal J causes an output signal at terminal F; an input pulse at K causes an output signal at E, and simultaneous inputs at J and K cause the signals at E and F to reverse.

As mentioned above, the calculator described herein employs 27 flip flops which have been assigned arbitrary flip flop numbers 00, 01, 02, 03, 10, etc. The terms in the logical equations which denote flip flop terminals are written in the form of a letter followed by a two digit number where the number identifies the flip flop and the letter identifies the particular terminal of the flip flop. Thus, the term F62 means the F terminal of flip flop number 62.

The 29 instruction drive lines are identified in equation terms by four letter codes starting with I as illustrated under the heading INSTRUCTIONS above.

The electrical terminals called gates are merely preassembled groups of connections which are used so frequently that it is convenient to connect the gate components to a single terminal to which a single connection may be made (and a single logical equation written) each time it is desirable to use the complete combination of components. The calculator employs 108 of these gates as indicated above. A connection to a gate is written as a term in a logical equation as the letter G followed by the gate number or by a four letter code starting with Y or N. One logical equation defines the components of a gate while several other logical equations define the manner in which the gate is connected to flip flop terminals, etc.

For example, logical equations may be used for defining the electrical circuits of FIG. 9. The equation G0210 = E13 · F11 · E10 defines a gate and can be read, "a signal appears at the output of gate G0210 when signals appear concurrently at the E terminal of flip flop number 13, at the F terminal of flip flop number 11, and at the E terminal of flip flop number 10." Similarly, the equation S0101 = E03 · F02 · E01 · F00 · YLCY means that the drive line S0101 is energized when signals appear simultaneously at the E terminals of flip flops 03 and 01, the F terminals of flip flops 02 and 00, and at the YLCY qualifier gate.

As mentioned in the preceding section, the YLCY qualifier denotes that flip flops 63, 62, 61, and 60 are in their 0, 0, 0, and 1 states, respectively. Accordingly, the YLCY qualifier gate may be defined by the logical equation YLCY = E63 · E62 · E61 · F60. This definition of the gates, such as YLCY, simplifies the logical equations considerably as indicated by the S0101 equation where gate definition is not used:

S0101 = E03 · F02 · E01 · F00 · E63 · E62 · E61 · F60

With the above logical equations defining parts of the circuits in FIG. 9, the remaining circuits in FIG. 9 are defined by the following logical equations.

IESF = S0101 · G0210

K24 = IESF · E50

J24 = IESF · F50

K50 = IESF · E24

J50 = IESF · F24

It should be noted that the transistor drive 9D does not appear specifically in the IESF equation. However, the calculator is designed for minimum power consumption by employing a transistor drive like 9D for each of the 29 instruction lines thereby providing power consumption in only those instruction lines that are actually performing useful work at any given instant. The final four equations above indicate the connections by which the IESF instruction driver performs its intended function i.e., exchange the contents of flip flops 24 and 50.

The actual composition of the special qualifier gates may now be described with the aid of logical equations. Some of these special qualifier gates are manual switches, the circuitry of which is apparent from the qualifier definition. The remaining qualifier gates are electronic gates made up by interconnecting flip flop terminals and other gates. The circuitry employed to form these remaining qualifier gates will be apparent from the following logical equations.

YBFN = F23 · E22 · E21 · F20
YBFU = E23 · E22 · E21 · F20

YBFZ = E23 · E22 · E21 · E20

YDNE = YMSD · E32

YEOD = YSIN · E32 · E40 · F51

YEZR = YLSD · E32

YLSD = F33 · F32 · F30

YLCY = F60 · E61 · E62 · E63

YQAA = F24 · F21 · G0001

YRDM = F60 · F63

YSAN = F61 · F62 · F63

YSIN = F33 · E31 · F30

YWTM = F61 · E63
YMSD = F33 · E31 · E30

SUBROUTINE LINES

In addition to the flip flops, instructions, and qualifiers, the calculator employs 16 subroutine instruction lines which are made up as electronic connections of PFF. These 16 subroutine instructions are numbered in binary from s0000 to S1111. Each of the digit positions defines the 1 or the 0 state of a flip flop as an input. The digit positions from most significant to least significant position define the states of flip flops 03, 02, 01 and 00, respectively. Each instruction has a fifth input which is the qualifier YLCY. The resistor in each of these instructions returns to the power supply. Thus, the instruction S0101 is of the form:

S0101 = E03 · F02 · E01 · F00 · YLCY

One equivalence exists in the system. The instruction ISTO is equivalent to J63, i.e., they both represent the same signal.

MEMORY ORGANIZATION

The memory 8X is a conventional ferrite core random access memory requiring the following control and information lines: address lines 8P to define the character being accessed; bit lines 8R to convey the information from the memory to the memory access register, i.e., bit flip flops - F24, F23, F22, F21, F20; inhibit lines 8Q to define which bits in the selected character are to receive information during a write cycle; and three control lines 8E, 8F and 8G. The latter three lines emit signals under the direction of the control logic 8V which cause information to be read into or out of memory. This section is discussed in detail under the *Control Logic* section. In essence, whenever a read instruction, IRDR 8C, is received by the control logic 8V, it will issue IKBF and K24 instructions at 8AA to zero F24, F23, F22, F21 and F20. The memory is then read and the sense amplifiers are activated 8F. Any information in the memory is placed into F24 – F20. The read memory cycle is followed by a write memory cycle 8E which, via the inhibit lines 8Q, writes the information present in F24 – F20 into the memory. Thus, the IRDR instruction provides a read and restore function, and hence nondestructive readout.

The store instruction, ISTO at 8D, is identical to the IRDR instruction except that the IKBF and K24 instructions at 8AA are not given and the sense amplifiers are not turned on (8F) This results in the core being cleared during the read memory. cycle 8G, and the information in the bit flip flops (F24 – F20) being written into core.

Figure 10:
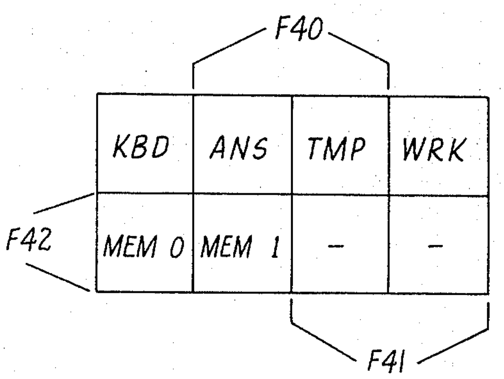
FIG. 10 is a Karnough map illustrating the memory addressing arrangement employed for addressing each word in the core memory of the calculator.

The memory consists of six words defined by the Karnaugh Map of FIG. 10. Each word consists of 13 characters of five bits each. The characters are defined by the Karnaugh Map of FIG. 11. Note the characters EI and ES and D9 and DS are decoded as one and the same chaacter. This is because the sign bit of both the mantissa (DS) and the exponent (ES) occupy the fifth bit (F24 position) of the most significant character of the mantissa (D9) and ezponent (E1) respectively. Notice that whenever F43 goes to a1, state the instant access character (IAS) is accessed, regardless of the status of F33 – F30.

Figure 11:
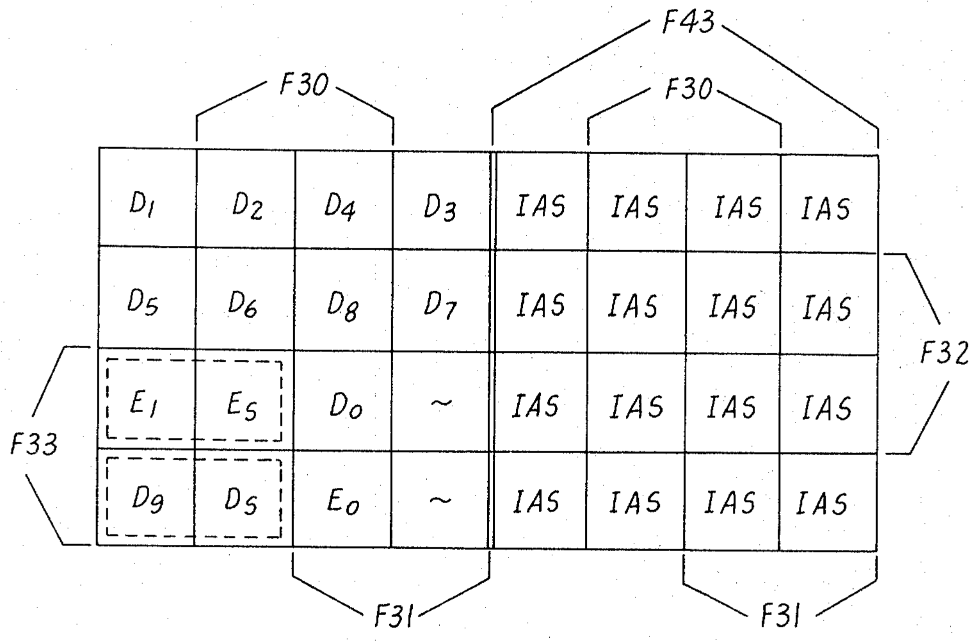
FIG. 11 is a Karnough map illustrating the memory addressing arrangement employed for addressing individual characters within each word in the core memory of the calculator.

A nomenclature evolves around the Karnaugh Maps of FIGS. 10 and 11. It is common to refer to the four registers KBD (keyboard), ANS (answer), TMP (temporary), and WRK (working). To define a specific character within a register, the first letter of that register designator is combined with the two letter identifier of the character encoding. For example, KD9 refers to the most significant character of the KBD register; WES refers to the exponent sign of WRK, and TIA refers to the instant access character of TMP. The binary addresses for these three characters are (F42, F41,

F40, F43, F33, F32, F31, F30) = (0, 0, 0, 0, 1, 0, 0, 0), (0, 1, 0, 0, 1, 1, 0, 1), and (0, 1, 1, 1, 2, 2, 2, 2)respectively. The 2's in the latter case signify that the conditions of F33, F32, F31 and F30 can be either 1's or 0's.

All numeric information stored in memory is in standard 8-4-2-1 BCD. When accessing memory, F20 is the least significant bit and F23 is the most significant bit of numeric information. F24 is the most significant bit of all five bit characters.

CONTROL LOGIC

Figure 12:
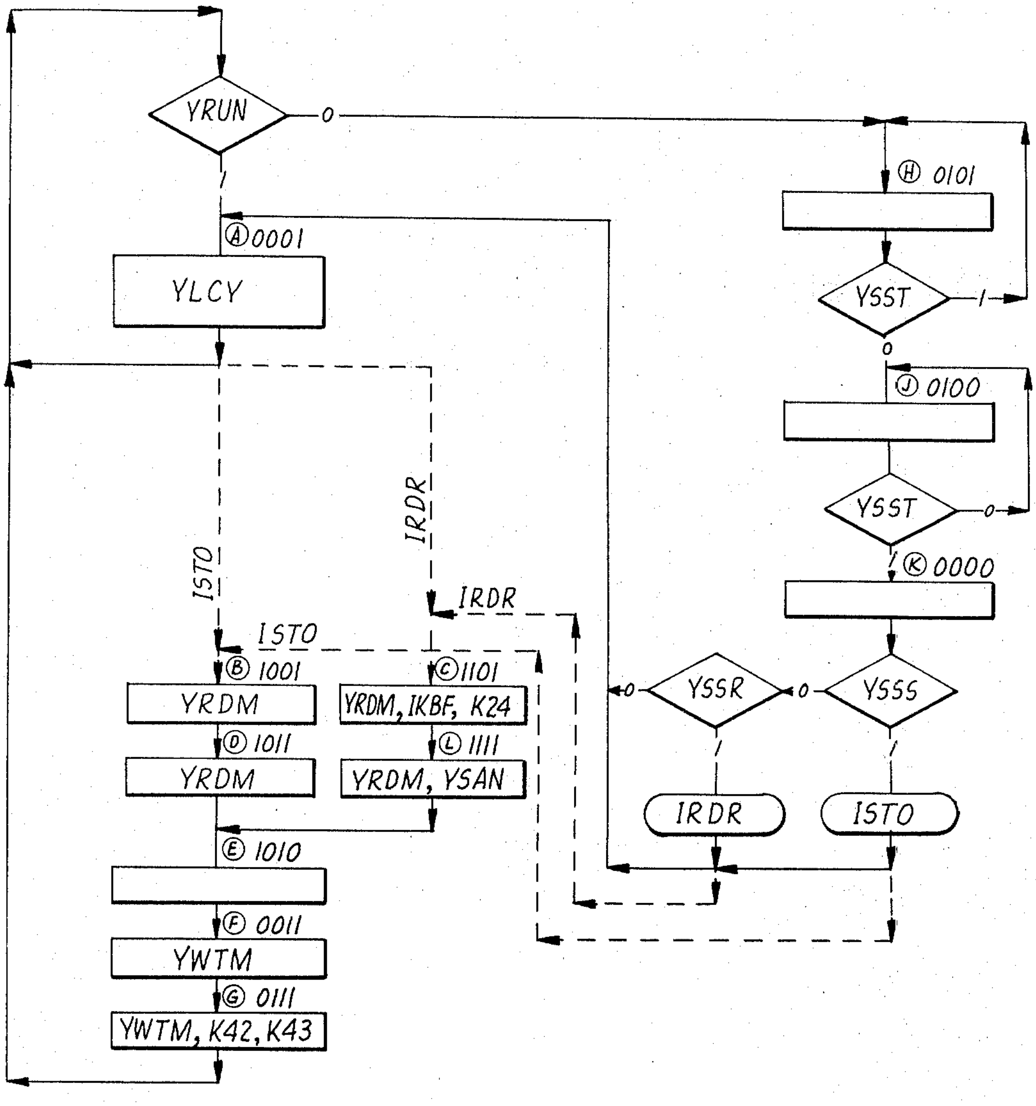
FIG. 12 is a detailed flow chart of the control logic of the calculator.
Figure 13:
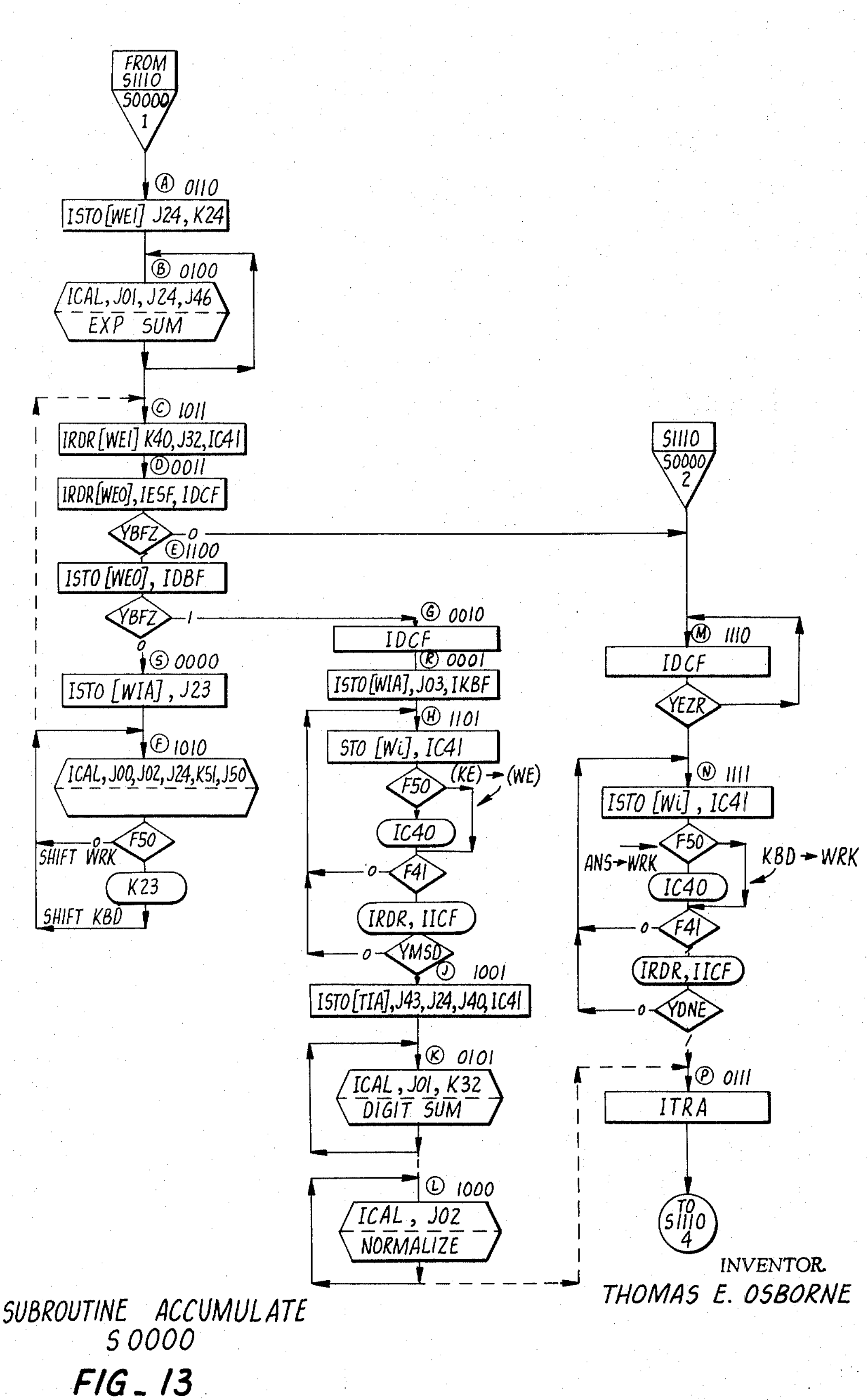
FIG. 13 is a detailed flow chart of the accumulate subroutine.
Figure 14:
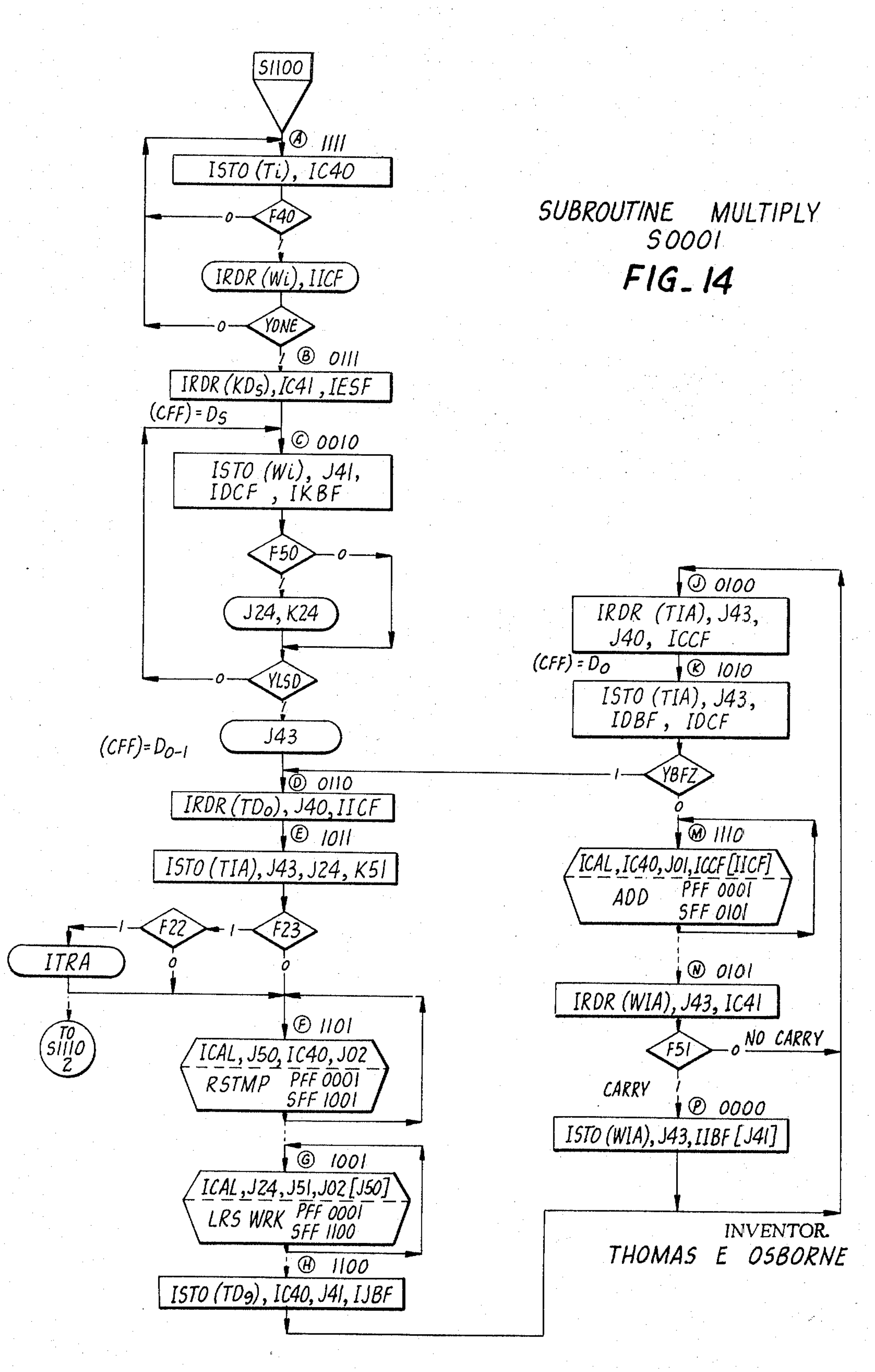
FIG. 14 is a detailed flow chart of the multiply subroutine.

The Control Logic Section 8V is illustrated in greater detail in FIG. 12, and consists of four flip flops F63, F62, F61, F60 and associated wiring. A large portion of this section deals with the tester used to check out the system. Although the tester is described in detail elsewhere, for the purposes of this explanation, it can be considered to consist of a device with a haltrun switch, a single step switch, a read switch, and a store switch, and a means for forcing all of the flip flops in the system, except those used in the control logic (F63 – F60), into any desired state.

Assume that the run-halt switch is in the run position (YRUN = 1) and that F63, F62, F61, F60) = (0, 0, 0, 1), state 12A, then according to FIG. 12, the control logic will issue a YLCY qualifier. This signal will allow one of the subroutine drive lines (FIG. 8B) to emit a signal, hence a logic cycle will occur. At the end of the current clock pulse all instructions directed by 8W will be executed. If neither an IRDR (read & restore), or an ISTO (store) instruction occured, control remains in state A of FIG. 12, and a new logic cycle will commence.

On the other hand, if an ISTO command occurs, a J63 command is given and control goes from 12A to 12B. This causes memory to be read with the sense amplifiers off (states 12B and 12D) followed by a period for memory drivers to recover 12E, and a write memory qualifier to occur in states 12F and 12G. The clock frequently is chosen so that the switching time of the cores is twice the clock period. Other schemes can be used depending upon memory requirements. Two instructions, K42 and K43 are given from state 12G. These particular reset instructions result in considerable economy by providing automatic reset of instructions using IAS memory characters and auxiliary storage registers. Note that no logic cycles occur when accessing memory since YLCY occurs only when in state 12A. This saves on power supply needs by insuring that no power is used in blocks U or W of FIG. 8, during a memory access and visa versa. It also insures that no instructions are executed during memory cycling.

When an IRDR instruction is encountered from A, FIG. 12, control is sent to 12C where the bit flip flops F24 – F20 are cleared by the IKBF and K24 instructions, and the information present in cores is read into F24 – F20 during 12L. The information is restored into memory during 12F and 12G.

If the run-halt switch is switched to halt (YRUN = 0, NRUN = 1), control is directed from 12A or 12G to 12H. Once in 12H, if the single step switch of the tester is down (YSST = 1), as it may be when operating in the single step mode, control remains at 12H. When the single step switch is released (YSST = 0), control goes to 12J and remains there until the single step switch is actuated again. Control then goes to 12K. If neither the store switch or read switch on the tester is on (Ysss = 0, YSSR = 0), control goes to 12A and a single logic cycle is executed (unless YRUN was switched to Halt). If the store switch was down when the single step switch was actuated from 12J, control goes from 12K to 12B and the information in F24 – F20 is stored in memory and a logic cycle is not executed. Similarly, if the read switch is actuated, the memory is read into F24 – F20 and a logic cycle is not executed.

The actual electronic circuitry for performing the various steps illustrated in FIG. 12 will be apparent from the "logical equations" set forth below.

With the above description of the meaning of the logical equations, the circuitry used in the Control Logic Section illustrated in FIG. 12 will be apparent from the following logical equations:

K62 = F63 · F61
K62 = E60 · YSST
K62 = F61 · YRUN
J62 = F60 · E63 · NRUN
J62 = F61 · E63
K60 = E61 · F62 · E63 · NSST
K60 = F61 · F63
K63 = E60
J60 = E62
J61 = F63
K61 = F62 · E63
IRDR = E60 · E62 · E63 · YSSR
K42 = F61 · F62 · F63
K43 = F61 · F62 · F63
ISTO = E60 · E62 · E63 · YSSS
IKBF = YGATE
K24 = YGATE
YLCY = F60 · E61 · E62 · E63
YSAN = F61 · F62 · F63
YRDM = F60 · F63
YWTM = F61 · F63
YGATE = F62 · E61 · F63

The circuitry employed in the other sections of the calculator will be understood from the logical equations which are set forth below read in conjunction with the corresponding figure of the drawing. These logical equations are written in the same form as the equations given above with one exception. It will be noted from the IESF equations given above in connection with FIG. 9 that the same term "IESF" appears on the right in a series of equations (the last four). In order to avoid repetition of such terms in long series of equations, certain headings are used below to indicate the omission of a repeated term from the right hand sides of the several equations of the series. Written with such a heading, the IESF equations become:

S0101 = E03 · F02 · E01 · F00 · YLCY
G0210 = E13 · F11 · E10
IESF = S0101 · G0210
(equals followed by IESF)
K24 = E50
J24 = F50
K50 = E24
J50 = F24
(end of IESF)

Where in such a series, the omitted term was the only term on the right hand side of the equation, an * is used on the right hand side of the equation.

LOGICAL EQUATIONS - INSTRUCTIONS (equals followed by IBRS)
K24 = *
J23 = F24
K23 = E24
J22 = F23
K22 = E23
J21 = F22
K21 = E22
J20 = F21
K20 = E21
J50 = F20
K50 = E20
(end of IBRS)

(equals followed by ICAL)
ITSB = *
ISTO = *
J13 = *
J12 = *
J11 = *
J10 = *
(equals followed by IDBF)
J23 = E22 · E21 · E20
K23 = E22 · E21 · E20
J22 = E21 · E20
K22 = E21 · E20
J21 = E20
K21 = E20
J20 = *
K20 = *
(end of IDBF)

(equals followed by IDCF)
J33 = E32 · E31 · E30
K33 = E32 · E31 · E30
J32 = E31 · E30
K32 = E31 · E30
J31 = E30
K31 = E30
J30 = *
K30 = *
(end of IDCF)

(equals followed by IESF)
J50 = F24
K50 = E24
J24 = F50
K24 = E50
(end of IESF)
(equals followed by IIBF)
J23 = F22 · F21 · F20
K23 = F20
J22 = F21 · F20
K22 = F21 · F20
J21 = E23 · F20
K21 = F20
J20 = *
K20 = *
J51 = BFZ
(end of IIBF)

(equals followed by IICF)
J33 = F32 · F31 · F30
K33 = F32 · F31 · F30
J32 = F31 · F30
K32 = F31 · F30
J31 = F30
K31 = F30
J30 = *
K30 = *
(end of IICF)
(equals followed by ITKB)
K24 = NQ24
K23 = NQ23
K22 = NQ22
K21 = NQ21
K20 = NQ20
(end of ITKB)

ITRA = G2011 · F22 · F23

(equals followed by ITSB)
J23 = F13
K23 = E13
J22 = F12
K22 = E12
J21 = F11
K21 = E11

J43 = *
J42 = *
K41 = *
J33 = *
K31 = *
K30 = *
(end of ICAL)

(equals followed by ICCF)
J32 = E10
K32 = E10
J31 = *
K31 = *
J30 = *
K30 = *
(end of ICCF)

J40 = IC40
K40 = IC40
J41 = IC41
K41 = IC41
(equals followed by IDDL)
J23 = YBFU
J23 = F22 · E21 · E20
J23 = F22 · F21 · F20
K23 = E20
J22 = F22
K22 = F21 · E20
J21 = E23 · E22
K21 = E22
K21 = E20
J20 = E22 · F20
K20 = F22 · E21
K20 = F23
J50 = YBFU
J50 = F22 · E20
(end of IDDL)

(equals followed by IDDR)
J23 = *
J22 = F21 · E20
K22 = *
J21 = *
J20 = F22 · F21
K20 = F21
K20 = E22
J50 = *
(end of IDDR)
(equals followed by IJBF)
J23 = *
J22 = *
J21 = *
J20 = *
(end of IJBF)
K20 = IKBF
K21 = IKBF
K22 = IKBF
K23 = IKBF

J62 = IRDR
J63 = IRDR
K24 = IRDR (equals followed by ITBS)
J13 = F23
K13 = E23
J12 = F22
K12 = E22
J11 = F21
K11 = E21
J10 = F20
K10 = E20
(end of ITBS)

K13 = G1012
J12 = E10
K12 = G0200
K12 = G1201
J11 = G0120
K11 = E12
J10 = F12
J10 = F12
K10 = G1012
(end of ITVE)

(equals followed by ITVF)
K03 = E11
K02 = E10
K02 = E12
J01 = G0002
J01 = G0021

-Continued

LOGICAL EQUATIONS - INSTRUCTIONS

J20 = F10
K20 = E10
(end of ITSB)

(equals followed by ITVE)
K03 = G1202
K03 = E12
J02 = E12
J02 = E11
J01 = E11
J00 = G1202
J13 = F12
K13 = G1021

J10 = F13
K10 = G0201
K10 = G2001
(end of ITVF)

(equals followed by IRTN)
J03 = *
K02 = *
K01 = *
K00 = *
IRDR = *
J13 = *

J00 = G1201
J00 = G2110
J13 = E10
J13 = F12
K13 = G2000
K13 = G2110
J12 = E11
J12 = G2221
K12 = E11
J11 = E10
K11 = G2110
J10 = F11
J10 = F12
J12 = *
J11 = *
J10 = *
J43 = *
J42 = *
K41 = *
J33 = *
K31 = *
K30 = *
J40 = F10
K40 = E10
(end of IRTN)

LOGICAL EQUATIONS - SUBROUTINE ACCUMULATE S0000 - FIG. 13

(equals followed by S0000)
J13 = G0221
K13 = G1021
K13 = G2100
K13 = G1111 · F41 · YDNE
J12 = G0021
J12 = G1202
K12 = G1100
K12 = G1102 · F41 · YMSD
J11 = G0020
K11 = G0220
K11 = G0021 · YBFZ
J10 = G2210 · YEZR
K10 = G0012
K23 = G2010 · F50
J24 = G1022
J24 = G0220
J32 = G1012
J40 = G0100
J40 = G1001
J43 = G2002
J50 = G1020
K24 = G0112

J11 = G2220 · YBFZ
J13 = G0002
ICAL = G0102
ICAL = G1020
IC40 = G1121 · F50
IC41 = G1221
IDBF = G1120
IDCF = G0012
IDCF = G1210
IESF = G0211
IICF = G1121 · F41
J00 = G1010
J01 = G0102
J02 = G1020
K32 = G0201
K40 = G2011
K51 = G1012
IRDR = G2011
IRDR = G1121 · F41
ISTO = *
ITRA = G2122 · G0211
IKBF = G0001
J23 = G0020
(end of S0000)

LOGICAL EQUATIONS — SUBROUTINE MULTIPLY S0001 - FIG. 14

(equals followed by S0001)
ICAL = G1201
ICAL = G1110
ICCF = G0100
ICCF = G1110
IC40 = G1122
IC41 = G0121
IDBF = G1020
IDCF = G2010
IICF = G1111 · F40
IESF = G0211
IIBF = G2000
IICF = G2110
J13 = G0120
K13 = G2100
K13 = G1020 · YBFZ J40 = G0120
J41 = G1200
J41 = G0022
J43 = G0202
J43 = G1022
J43 = G2010 · YLSD
J50 = *
J51 = G2001

K13 = G2111 · F40 · YDNE
J12 = G0202
J12 = G1212
J12 = YLSD
K12 = G0120
K12 = G0112
K12 = G0201 · F51
J11 = G0120
K11 = G1021
J10 = G0112
K10 = G0221
IJBF = G1200
J01 = G1110
J02 = G1201
J24 = G1021
J24 = G0210 · F50
IKBF = G0210
K24 = G0210 · F50
ITRA = G2011 · F22 · F23
IRDR = G0122
IRDR = G2111 · F40
ISTO = *
K51 = G2011
(end of S0001)

LOGICAL EQUATIONS - SUBROUTINE SUM - S0010 - FIG. 15

(equals followed by S0010)

| | |
|---|---|
| K13 = G2220 | J00 = G0001 |
| K13 = G2220 · F50 · E51 | J02 = G0000 |
| K12 = G1102 | J02 = G0012 |
| J11 = G0122 · E41 · YMSD | J24 = G0022 |
| K11 = G1212 | J43 = G0100 |
| J10 = G2122 | J50 = G1001 · F24 |
| J10 = E50 | K50 = G1001 · F24 |
| K10 = G1002 | IRDR = G1122 |
| ICAL = G0022 | IRDR = G2101 · F41 |
| ICCF = G1210 · F51 | IRTN = G0112 |
| K40 = G1121 | ISTO = G2122 · E50 · F51 |
| IC41 = G2102 | ISTO = G0201 |
| IESF = G1102 | IICF = G0102 · F41 |
| | (end of S0010) |

LOGICAL EQUATIONS — SUBROUTINE ADD — S0011 — FIG. 16

(equals followed by S0011)

| | |
|---|---|
| J13 = G2000 | IIBF = G1002 |
| K13 = G2000 | IIBF = G0221 |
| J12 = G2000 | IIBF = G0210 |
| K12 = G0200 | IIBF = G0102 |
| J11 = G0200 | IIBF = G1201 · F51 |
| J11 = G2000 | IICF = G1110 |
| K11 = G2210 | J41 = G1211 |
| J10 = G2210 | J51 = G1102 |
| J10 = G0102 | K51 = G1100 |
| J10 = G1002 | K51 = G1102 · YBFN |
| K10 = G0221 | K51 = G1211 |
| K10 = G1201 | IRDR = G1120 |
| K10 = G1211 | ISTO = G0001 |
| IC41 = G1120 | ITBS = G1100 |
| IDCF > G1211 | IRTN = G0000 · YMSD |
| | (end of S0011) |

LOGICAL EQUATIONS—SUBROUTINE NORMALIZE—S0100—FIG. 17

(equals followed by S0100)

| | |
|---|---|
| J13 = G2122 | J12 = G0222 |
| J13 = G2220 | J12 = G2221 |
| K13 = G1121 | K12 = G2110 |
| K13 = G1001 | J11 = G0020 |
| K13 = G2110 · YBFZ | J11 = G1120 |
| J11 = G1122 · YBFZ | J43 = G1121 |
| K11 = G0021 | J43 = G2212 |
| K11 = G0220 · YBFN | J43 = G0020 |
| J10 = G1220 | J50 = G1221 |
| K10 = G0112 | J51 = G1211 |
| K10 = G1201 | K02 = G1100 |
| ICAL = G1012 | K24 = G2022 |
| ICCF = G1202 | K32 = G1221 |
| IC41 = G0100 | K40 = G0112 |
| IESF = G2112 | K50 = G2010 |
| IIBF = G0112 | K51 = G0120 |
| IIBF = G0022 · F24 · F51 | IKBF = G1102 |

Figure 17:
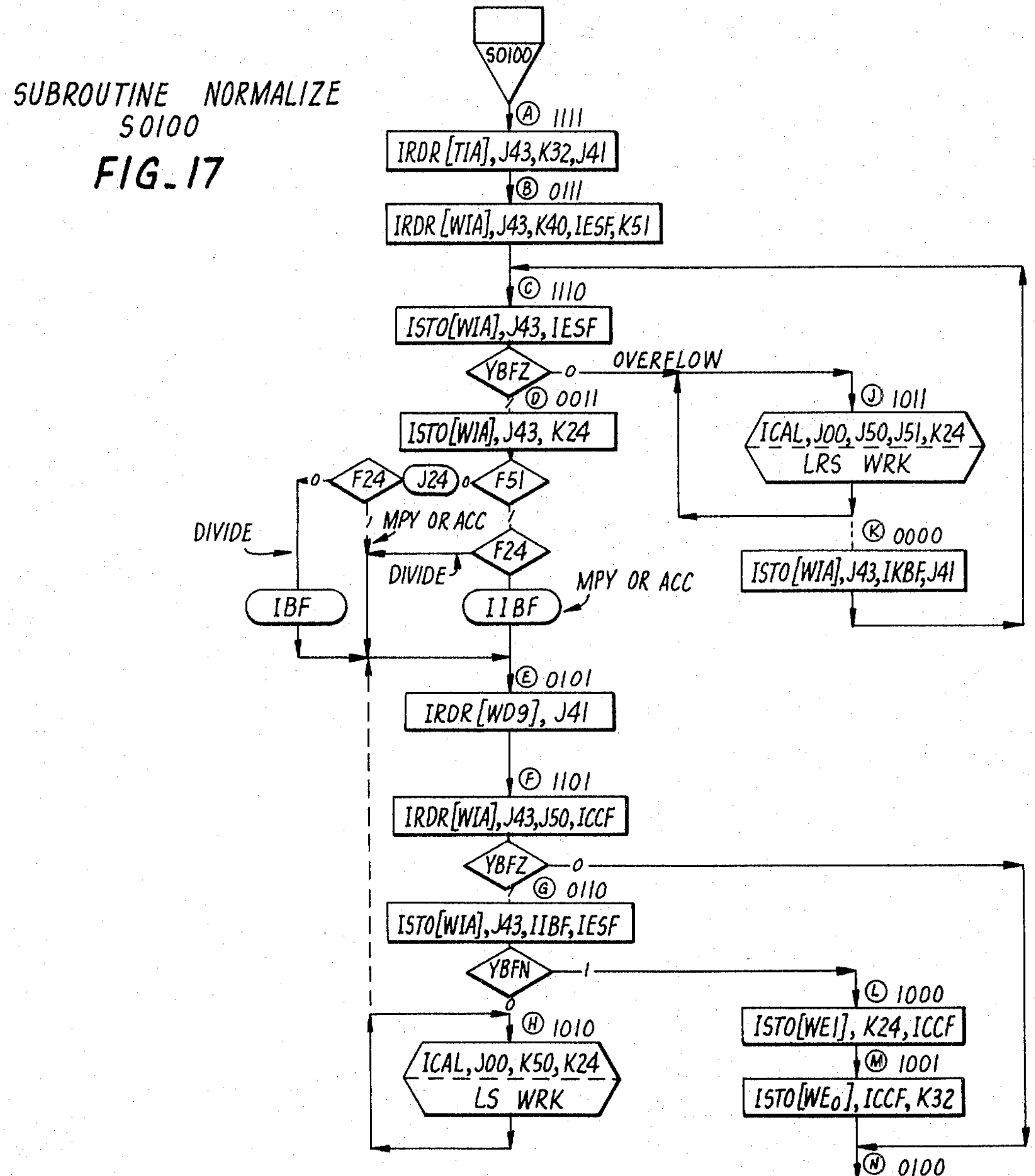
FIG. 17 is a detailed flow chart of the normalize subroutine.
Figure 18:
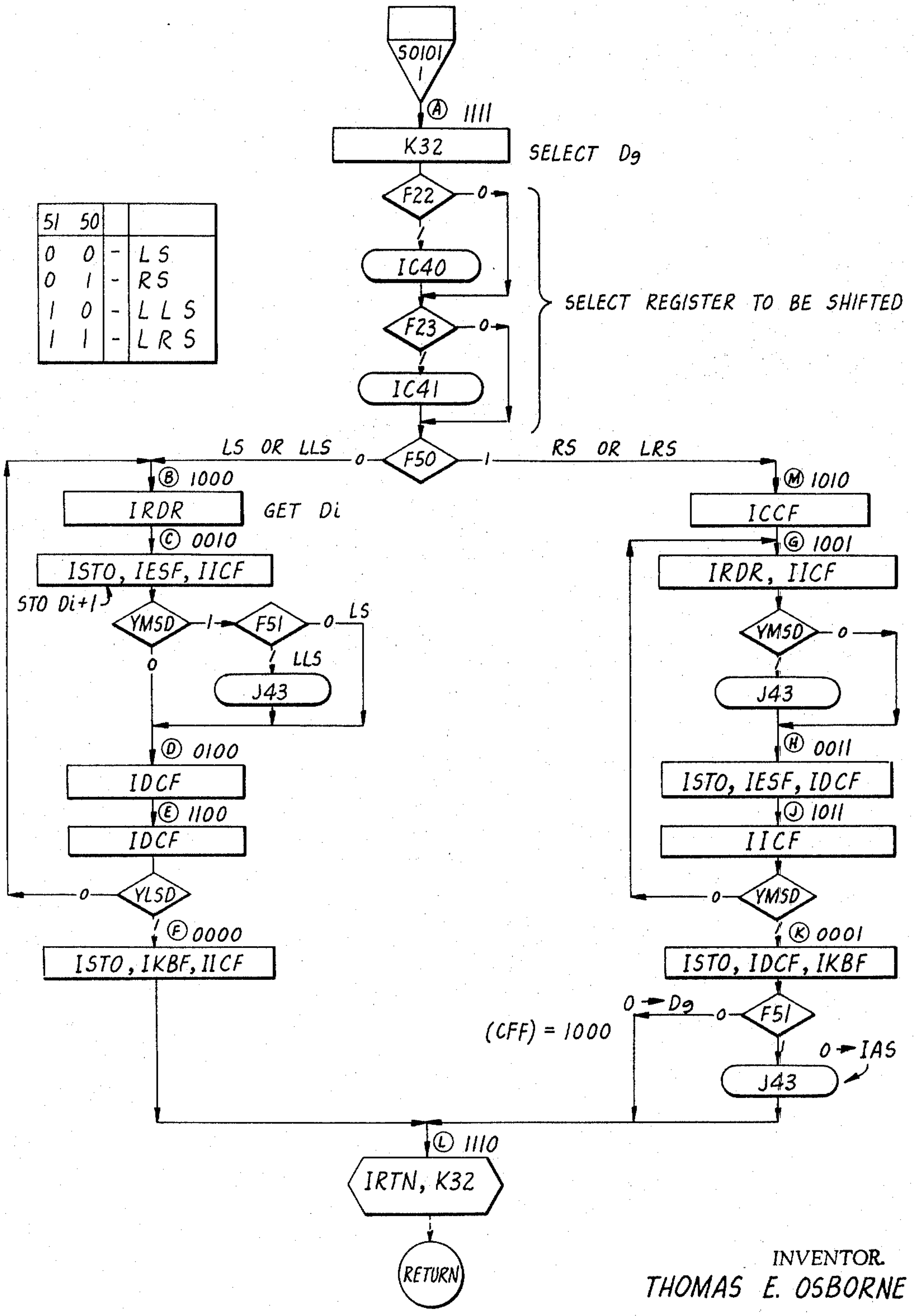
FIG. 18 is a detailed flow chart of the shift subroutine.

LOGICAL EQUATIONS—SUBROUTINE NORMALIZE—S0100—FIG. 17—Continued

| | |
|---|---|
| J00 = G1012 | IKBF = G0002 |
| J01 = G1100 | IRDR = G2121 |
| J42 = G2121 | ISTO = * |
| J42 = G0022 | J24 = G0022 · E51 |
| | IIBF = G0022 · E24 · E51 |
| | (end of S0100) |

LOGICAL EQUATIONS — SUBROUTINE SHIFT S0101 — FIG. 18

(equals followed by S0101)

| | |
|---|---|
| J13 = G0200 | J12 = G0210 |
| K13 = G1002 | K12 = G1200 |
| K13 = G1200 · YLSD | K12 = G2111 |
| K13 = G1021 · YMSD | J11 = G2002 |
| J12 = G0002 | K11 = G1012 |
| K11 = G0020 | J43 = G0201 · F51 |
| K11 = G2111 · E50 | IKBF = G0002 |
| J13 = G0021 | K32 = G1112 |
| J10 = G1010 | IRDR = G1002 |
| K10 = G0201 | IRTN = G2110 |
| K10 = G0112 | ISTO = G0022 |
| ICCF = G1010 | IICF = G0121 |
| IC40 = G2111 · F22 | IICF = G0020 |
| IC41 = G2111 · F23 | (end of S0101) |
| IDCF = G2100 | |
| IDCF = G0021 | |
| IESF = G0012 | |
| J43 = G1201 · YMSD | |
| J43 = G0210 · YMSD · F51 | |

Figure 19:
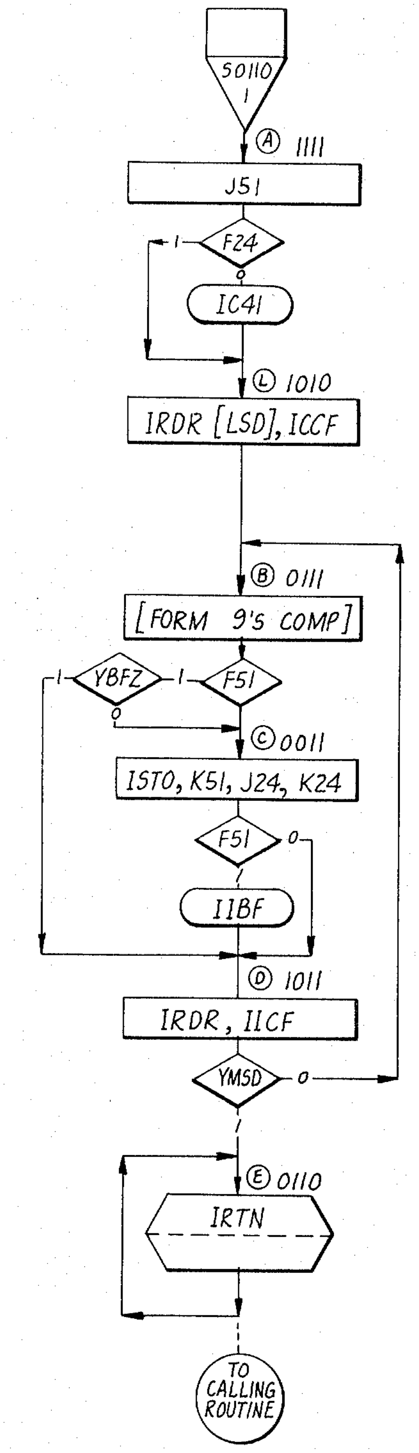
FIG. 19 is a detailed flow chart of the complement subroutine.
Figure 20:
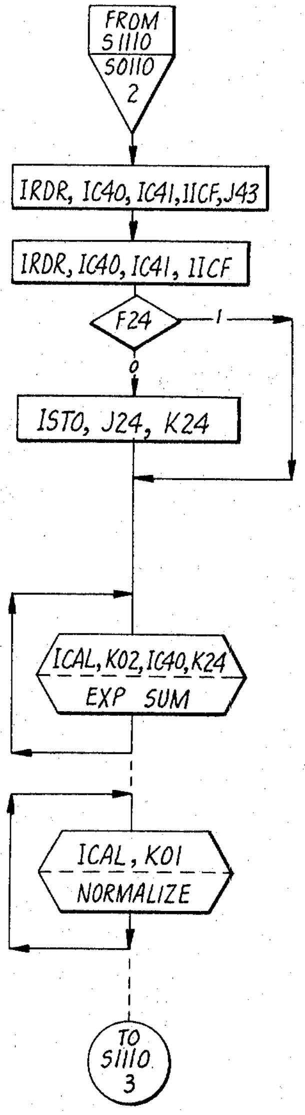
FIG. 20 is a detailed flow chart of the exponent update subroutine.
Figure 21:
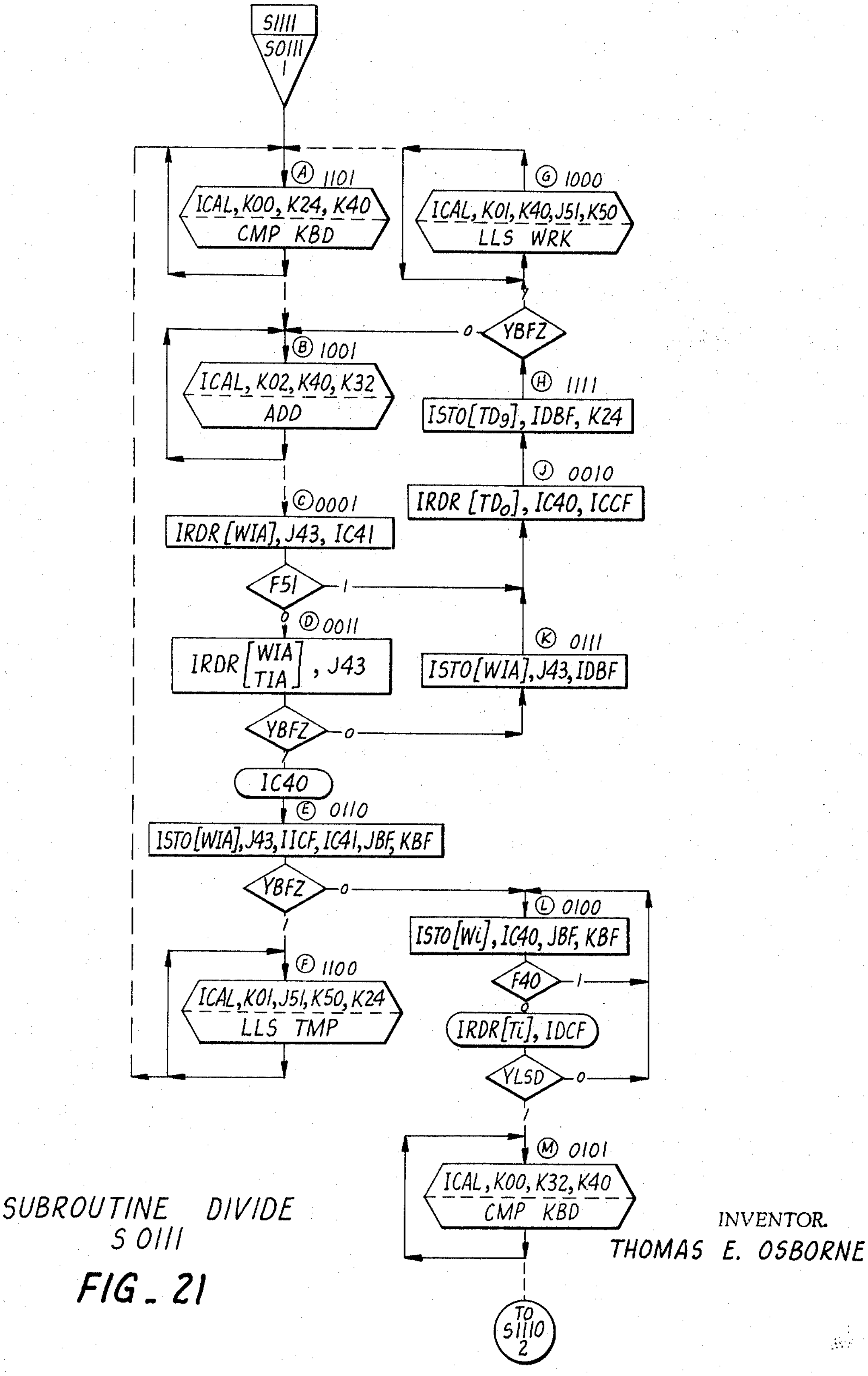
FIG. 21 is a detailed flow chart of the divide subroutine.
Figure 22:
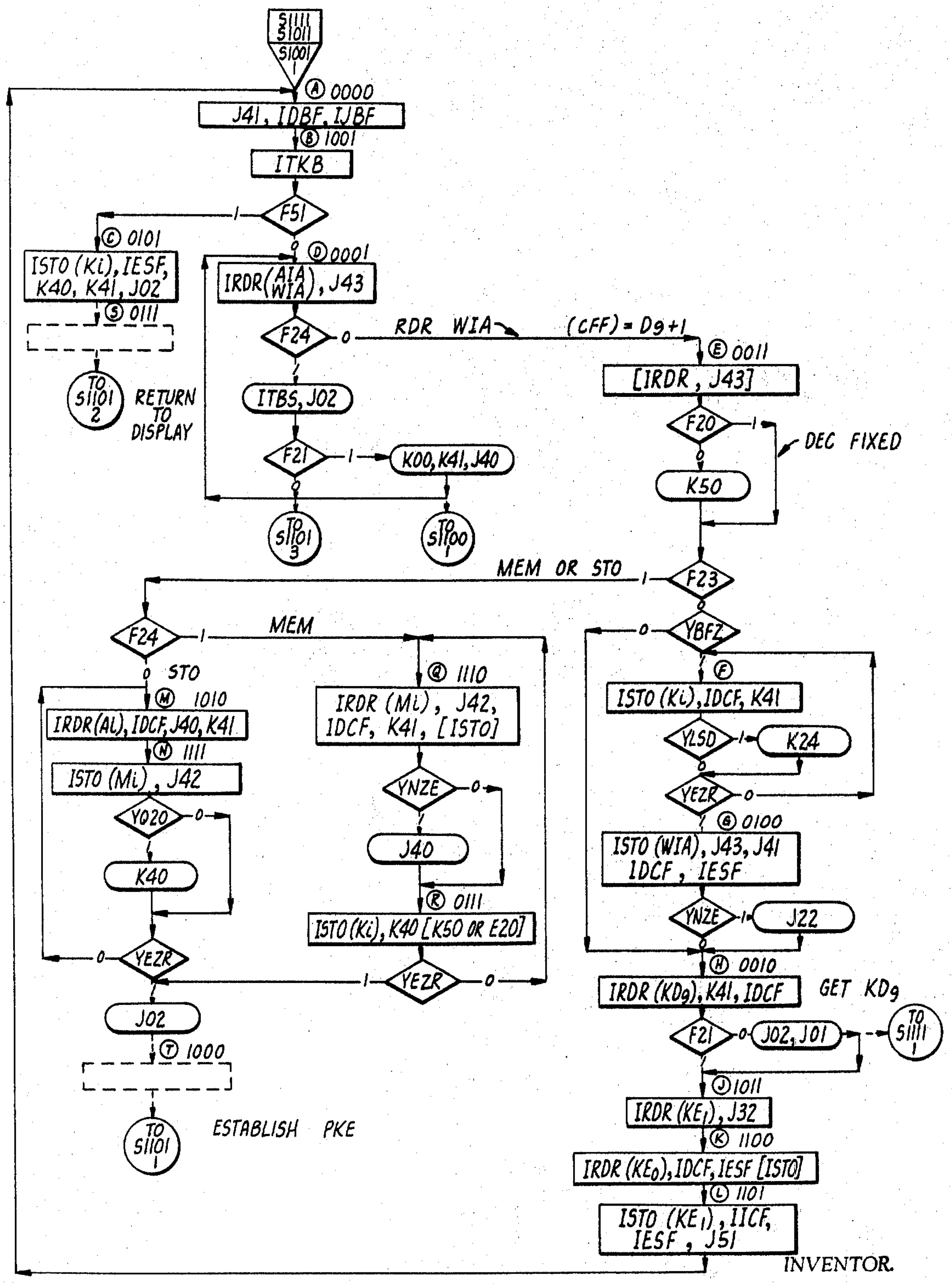
FIG. 22 is a detailed flow chart of the enter digit subroutine.
Figure 23:
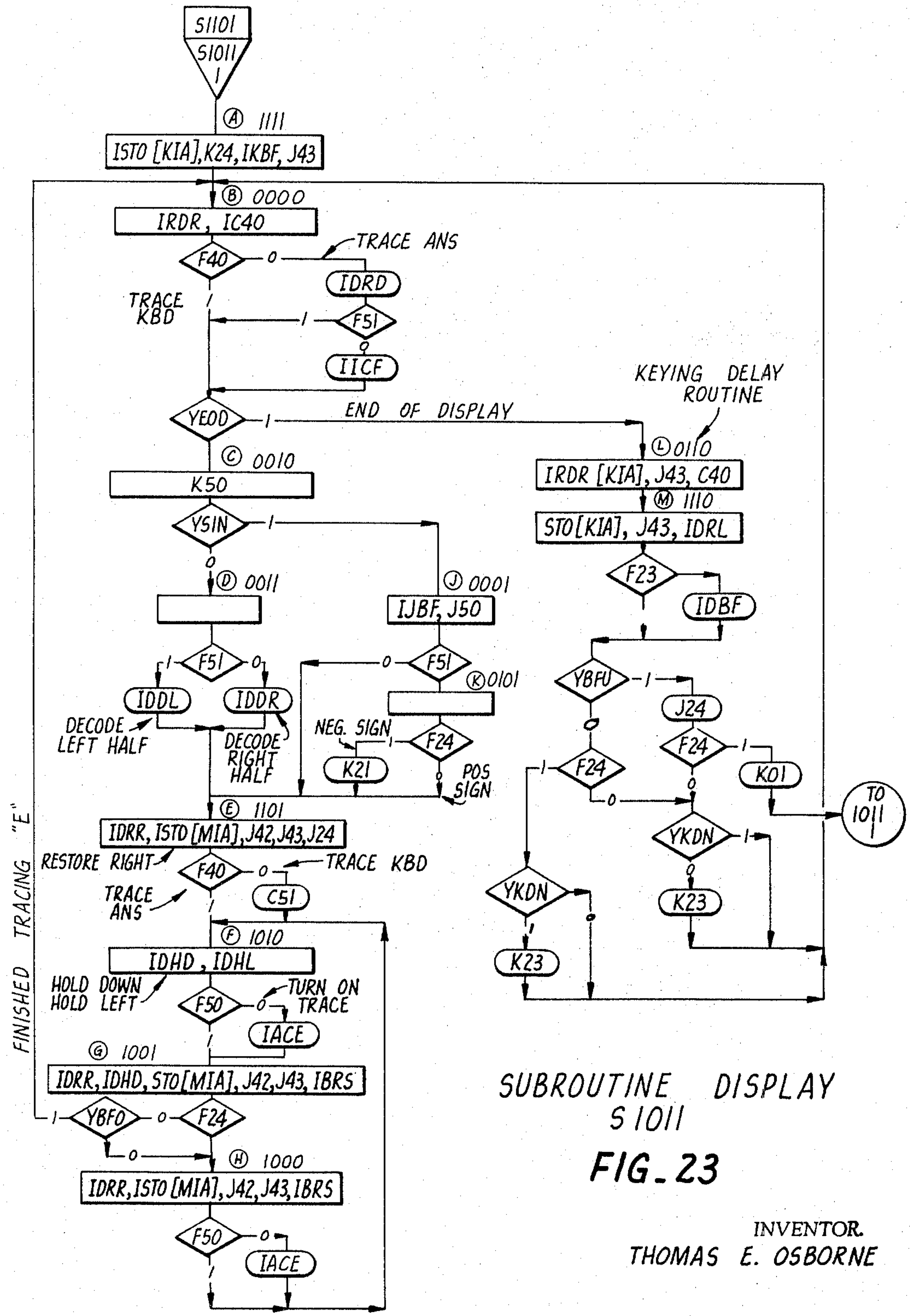
FIG. 23 is a detailed flow chart of the display subroutine.

LOGICAL EQUATIONS — SUBROUTINE COMPLEMENT & EXPONENT UPDATE — S0110 — FIGS. 19 & 20

(equals followed by S0110

| | |
|---|---|
| J13 = G2011 | K10 = G1121 |
| J13 = G2111 · F51 · YBFZ | K10 = G1012 · YMSD |
| K13 = G1012 | ICAL = G0200 |
| K13 = G1020 | ICCF = G1210 |
| J12 = G1212 | IC40 = G2002 |
| K12 = G2111 | IC41 = G1002 |
| J11 = G1220 · E24 | IC41 = G1121 · F24 |
| K11 = G0020 | IIBF = G0021 · F51 |
| J10 = G1210 | IICF = G1022 |
| K10 = G1002 | J24 = G0012 |
| J43 = G1201 | ISTO = G0012 |
| J51 = G1122 | J23 = G0121 · E21 · E22 |
| K01 = G2100 | K23 = G0121 |
| K02 = G0000 | J22 = G0121 · F21 |
| K24 = G0022 | K22 = G0121 · F21 |
| K51 = G0021 | J20 = G0121 |
| IRTN = G2110 | K20 = G0121 |
| IRDR = G1022 | (end of S0110) |

LOGICAL EQUATIONS — SUBROUTINE DIVIDE — S0111 — FIG. 21

(equals followed by S0111)

| | | |
|---|---|---|
| J13 = G2010 | K40 = G2202 | J51 = * |
| J13 = G2110 · YBFZ | K50 = * | IKBF = G0220 |
| J12 = G0012 | IRDR = G0022 | (end of S0111) |
| K12 = G2111 | IRDR = G0200 · E40 | |
| J11 = G0201 | ISTO = * | |
| K11 = G0120 | ICAL = G2101 | |
| K11 = G1121 | ICAL = G1202 | |
| J10 = G0012 | ICCF = G2010 | |
| J10 = E40 · YLSD | IC40 = G0220 | |
| K10 = G0112 | IC40 = G0012 · YBFZ | |
| K10 = G2211 · YBFZ | IC41 = G0002 | |
| K10 = G0002 · F51 | IDBF = G2111 | |
| K00 = G2101 | IDCF = G0200 · E40 | |
| K01 = G1200 | IICF = G2110 | |
| K02 = G1021 | IJBF = G0220 | |
| K24 = G1222 | J43 = G0021 | |
| K32 = G2201 | J43 = G0112 | |

LOGICAL EQUATIONS - SUBROUTINE TRANSFER VECTOR - S1000

| | |
|---|---|
| ITBS = S1000 | ITVE = S1000 · E24 |
| ITVF = S1000 · F24 | |

LOGICAL EQUATIONS - SUBROUTINE ENTER DIGIT S1001 - FIG. 22

| | |
|---|---|
| (equals followed by S1001) | |
| J13 = G2020 | IESF = G2102 |
| J13 = G2111 | K24 = G0120 · YLSD |
| J13 = G2011 · F23 | IICF = G1101 |
| K13 = G1201 | IJBF = G2000 |
| K13 = G1210 | J01 = G0010 · E21 |
| J12 = G1012 | J02 = G0101 |
| J12 = G2001 · F51 | J02 = G0201 · F24 |
| J12 = G2011 · YBFZ | J02 = G0010 · E21 |
| J12 = G2011 · F23 · F24 | J02 = G2111 · YEZR |
| K12 = G0200 | J22 = G0100 · YZNE |
| K12 = G1121 | J32 = G1011 |
| K12 = G2111 · YEZR | J40 = G1020 |
| J11 = G0102 | J40 = G1210 · YNZE |
| J11 = G0201 · E24 | J40 = YQAA |
| K11 = G1021 | J41 = G0200 |
| K11 = G2111 · YEZR | J42 = G1112 |
| K11 = G0112 · YEZR | J43 = G0021 |
| J10 = G2020 | J43 = G0100 |
| J10 = G1220 | J51 = G1101 |
| K10 = G2211 | K00 = YQAA |
| K10 = G1121 | K40 = G0121 |
| IDCF = G2220 | K40 = G2111 · YNQ21 |
| K41 = G2210 | IRDR = G2012 |
| K41 = G0101 | ISTO = G2212 |
| K41 = YQAA | ITBS = G0001 · F24 |
| K50 = G0211 · E20 | ITKB = G1002 |
| IRDR = G0021 | (end of S1001) |
| IRDR = G1220 | |

LOGICAL EQUATIONS - SUBROUTINE DISPLAY - S1011 - FIG. 23

| | |
|---|---|
| (equals followed by S1011) | |
| J13 = G2211 | IDDL = G0211 · E51 |
| J13 = G0122 | IDDR = G0211 · E51 |
| K13 = G1112 | IDHD = G1012 |
| K13 = G1121 · F24 · YBFU | IDHL = G1012 |
| J12 = G0221 | IDRD = G0200 · E40 |
| J12 = G0202 · YEOD | IDRR = G1202 |
| K12 = G1222 | IDRL = G0112 |
| J11 = G2200 | IICF = G0200 · E40 · F51 |
| J11 = G1102 | IJBF = G0001 |
| K11 = G1212 | J24 = G1102 |
| K11 = G2211 | J24 = G1120 · YBFU |
| K11 = G2012 · YSIN | J42 = G1202 |
| J10 = G2012 | J43 = G1202 |
| K10 = G1222 | J43 = G2112 |
| IACE = G1020 · E50 | J50 = G0001 |
| IBRS = G1002 | J51 = G1102 · E40 |
| IC40 = G0200 | IKBF = G2111 |
| IC40 = G0112 | K21 = G0102 · F24 · F51 |
| IDBF = G1120 · E23 | |
| K32 = G1120 · F24 · YKDN | IRDR = G0112 |
| K23 = G1120 · E24 · NKDN | ISTO = G1202 |
| K24 = G1211 | ISTO = G1122 |
| K50 = G0010 | K01 = G1120 · YBFU · F24 |
| K51 = G1102 · E40 | (end of S1011) |
| IRDR = G0200 | |

LOGICAL EQUATIONS-SUBROUTINE DETERMINE ARITHMETIC OPERATOR - S1100 - FIG. 24

| | |
|---|---|
| (equals followed by S1100) | |
| J13 = G0002 | IRDR = G0210 |
| J13 = G0220 | IRDR = G1200 · F41 |
| J13 = G0102 · YEZR · E50 | ISTO = G1220 |
| K13 = G1121 | ISTO = G2101 · NMOD |
| J12 = G2012 | ISTO = G2211 |
| K12 = G0200 | ITBS = G1210 |
| K12 = G1202 | ITBS = G2011 · YBFZ |
| K12 = G0121 · YEZR | ITSB = G2011 |

Figure 24:
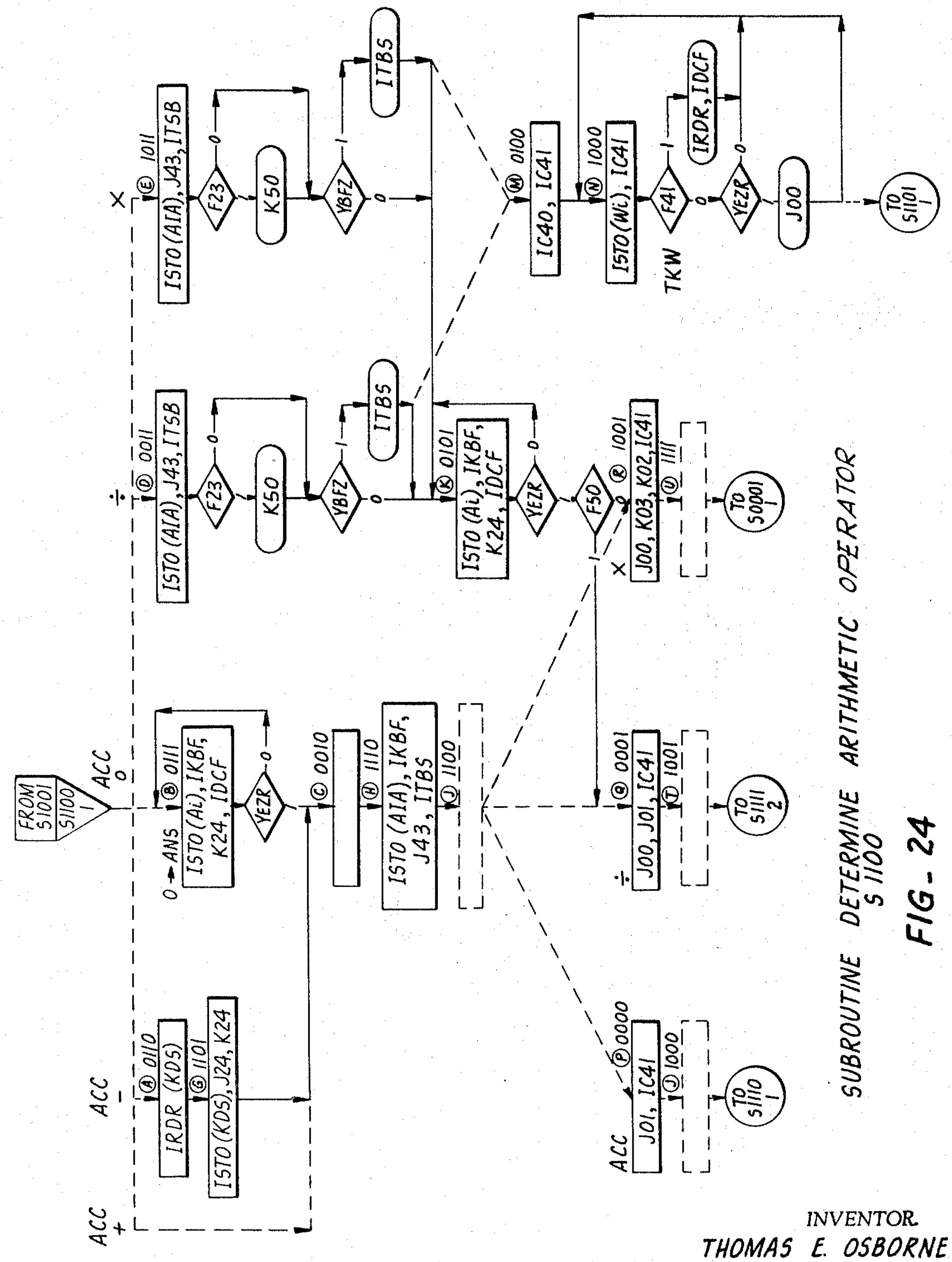
FIG. 24 is a detailed flow chart of the subroutine used for determining arithmetic operators.
Figure 25:
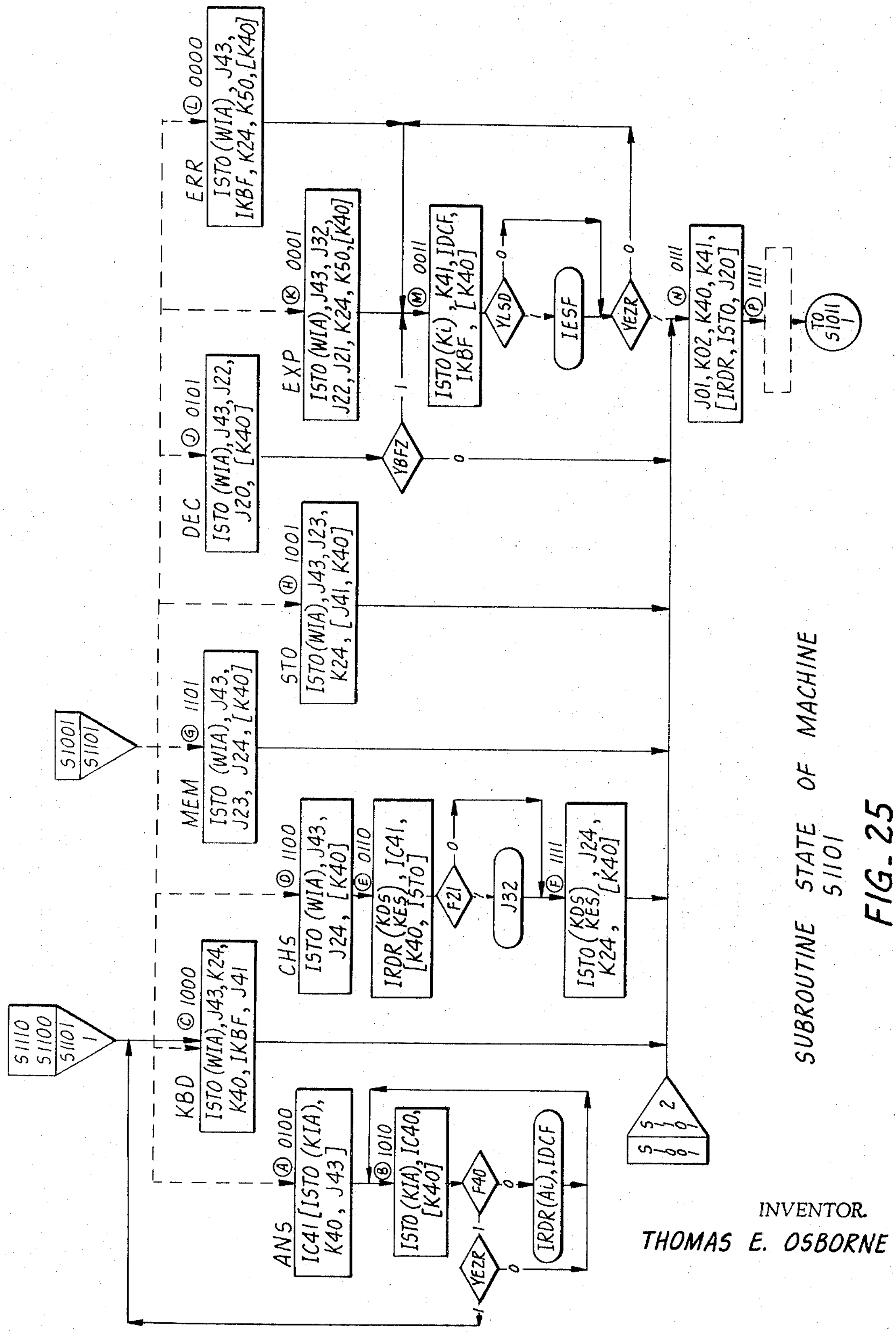
FIG. 25 is a detailed flow chart of the subroutine used for determining the state of the machine.
Figure 26:
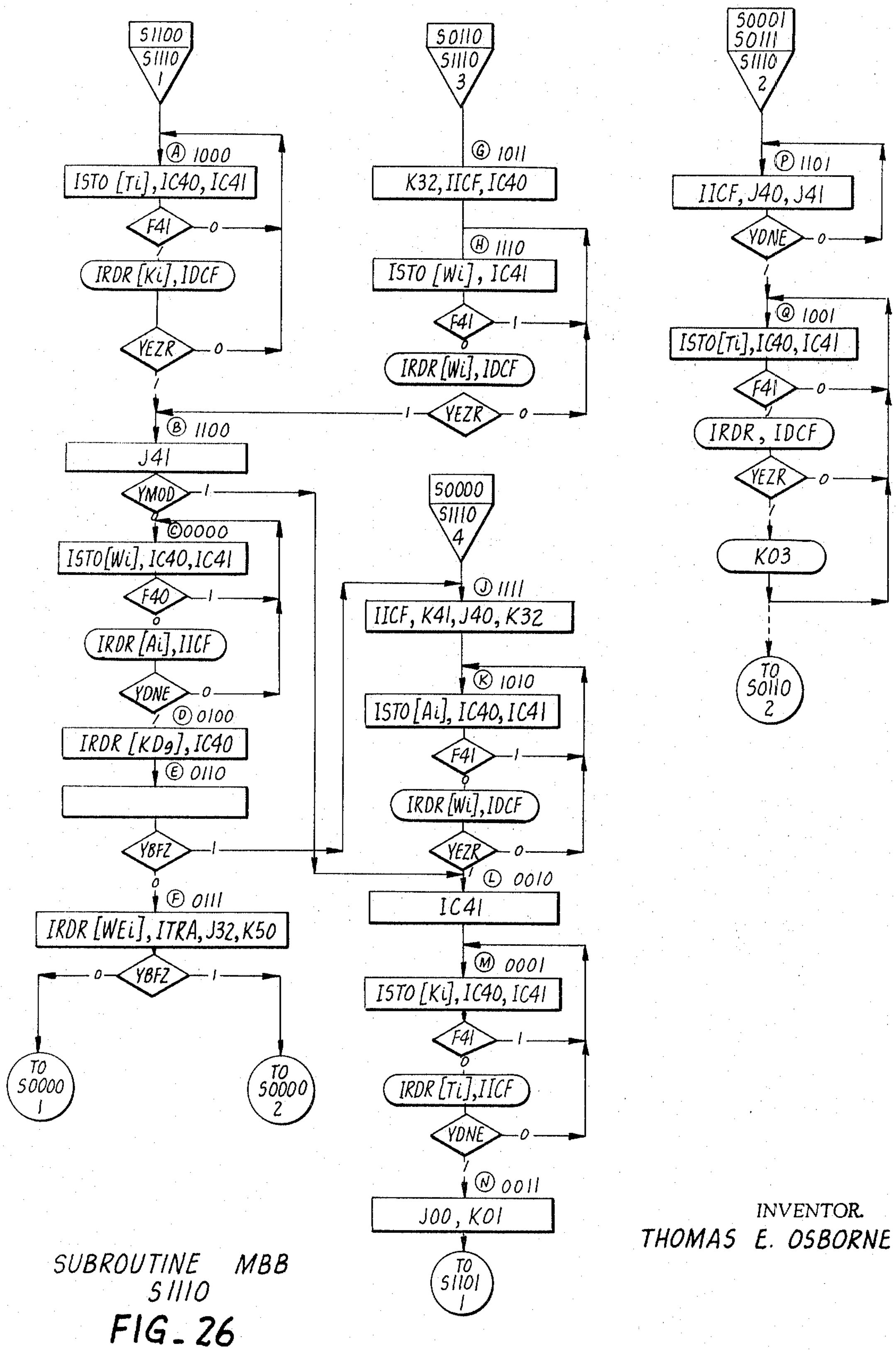
FIG. 26 is a detailed flow chart of the MBB subroutine used for miscellaneous matters.

LOGICAL EQUATIONS - SUBROUTINE DETERMINE ARITHMETIC OPERATOR - S1100 - FIG. 24—Continued

| | |
|---|---|
| J11 = G1201 | IC40 = G0120 |
| K11 = G2011 | IC41 = G0200 |
| K11 = G2110 | IC41 = G2002 |
| J10 = G0112 | J00 = G2001 |
| K10 = G1102 | J00 = G1200 · E41 · YEZR |
| K10 = G0112 · YEZR | J01 = G0002 |
| IDCF = G0121 | J24 = G1102 |
| IDCF = G1200 · F41 | J43 = G2012 |
| IKBF = G0121 | J43 = G1210 |
| IKBF = G1120 | K03 = G1001 |
| KO2 = G1001 | J40 = G0022 |
| K24 = G2121 | (end of S1100) |
| K50 = G2011 · F23 | |

LOGICAL EQUATIONS - SUBROUTINE STATE OF MACHINE - S1101 - FIG. 25

| | |
|---|---|
| (equals followed by S1101) | |
| J13 = G2111 | J43 = G2202 |
| J13 = G0120 | K24 = G2002 |
| K13 = G1211 | K24 = G1112 |
| K13 = G1202 | K40 = * |
| J12 = G1002 | K41 = G0211 |
| J12 = G0012 · YEZR | K50 = G0002 |
| K12 = G0200 | IDCF = G0012 |
| K12 = G0102 · YBFZ | IDCF = G1210 · E40 |
| J11 = * | IESF = G0012 · YLSD |
| K11 = G1012 · YEZR · F40 | IKBF = G2000 |
| J10 = G2000 | IKBF = G0012 |
| J10 = G0112 | IRDR = G0112 |
| IC40 = G1012 | IRDR = G1210 · E40 |
| IC41 = G0120 | ISTO = * |
| J20 = G0121 | J01 = G0111 |
| J21 = G0001 | K02 = G0111 |
| J22 = G0201 | (end of S1101) |
| J23 = G1201 | |
| J24 = G1122 | |
| J32 = G0001 | |
| J32 = G0210 · F21 | |
| J41 = G1002 | |

LOGICAL EQUATIONS - SUBROUTINE MBB S1110 – FIG. 26

| | |
|---|---|
| (equals followed by S1110) | |
| J13 = G2011 | IDCF = G1210 · E41 |
| J13 = G0112 · YBFZ | IICF = G0002 · E40 |
| K13 = G2100 | IICF = G1121 |
| K13 = G2010 · E41 · YEZR | IICF = G1211 |
| J12 = G1211 | J00 = G0011 |
| J12 = G0200 · E40 · YDNE | J32 = G0121 |
| J12 = G1200 · F41 · YEZR | J40 = G1121 |
| K12 = G1200 | J41 = G1102 |
| K12 = G1111 | K01 = G0011 |
| K12 = G1221 · YDNE | K03 = G1001 · F41 · YEZR |
| J11 = G0122 | IRDR = G1002 · F41 |
| J11 = G0221 · E40 · YDNE | IRDR = G1210 · E41 |
| J11 = G1100 · YMOD | IRDR = G0002 · E40 |
| K11 = G0012 | IRDR = G0122 |
| K11 = G1120 · E41 · YEZR | ISTO = G2002 |
| J10 = G0212 | ISTO = G2210 |
| K10 = G2211 | ITRA = G0121 |
| IC40 = G0202 | K32 = G1211 |
| IC40 = G1022 | K50 = G0121 |
| IC41 = G2002 | K41 = G1111 |
| IC41 = G2210 | (end of S1110) |
| IDCF = G1002 · F41 | |

Figure 27:
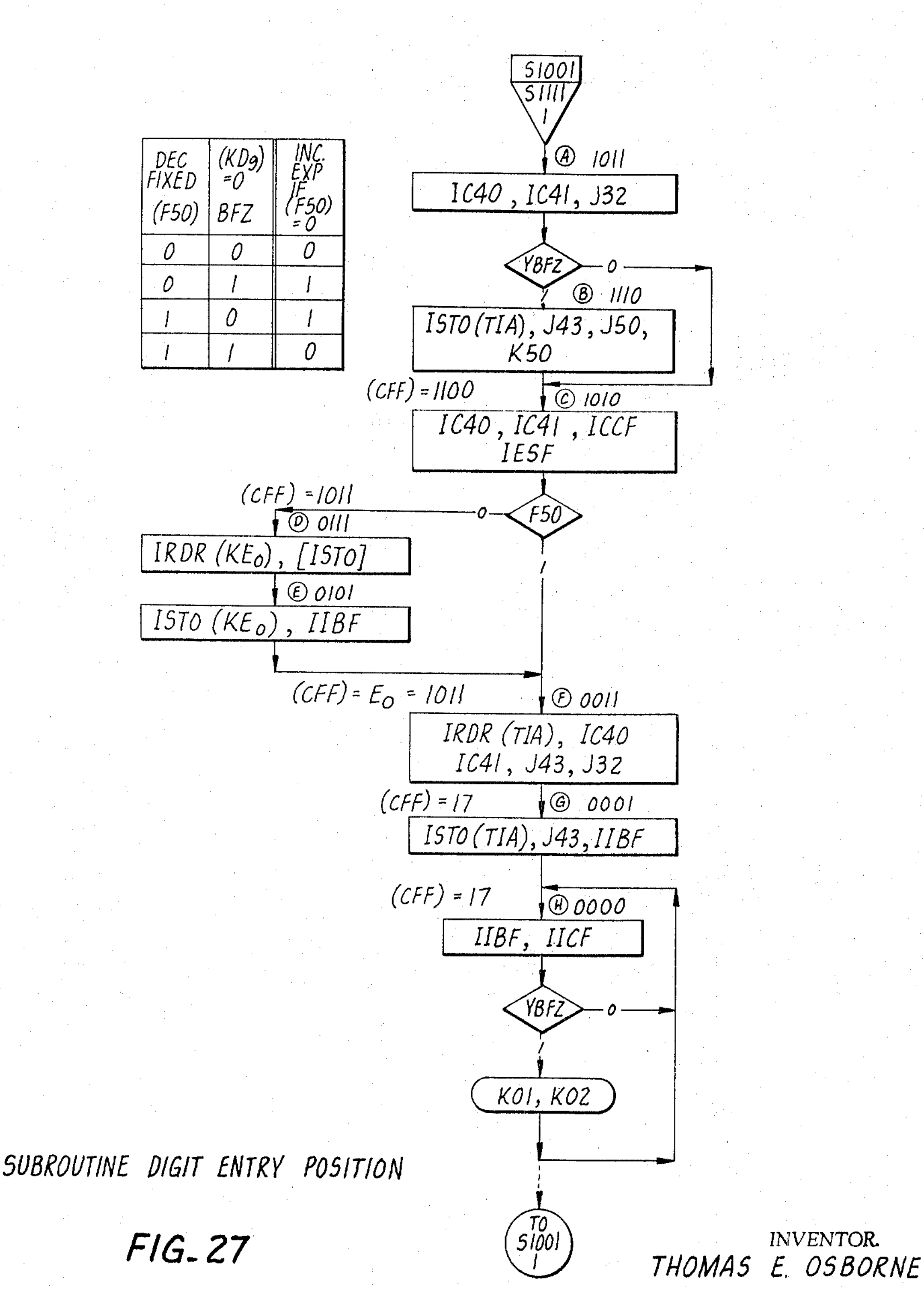
FIG. 27 is a detailed flow chart of the subroutine used for determining the position of entered digits.
Figure 28:
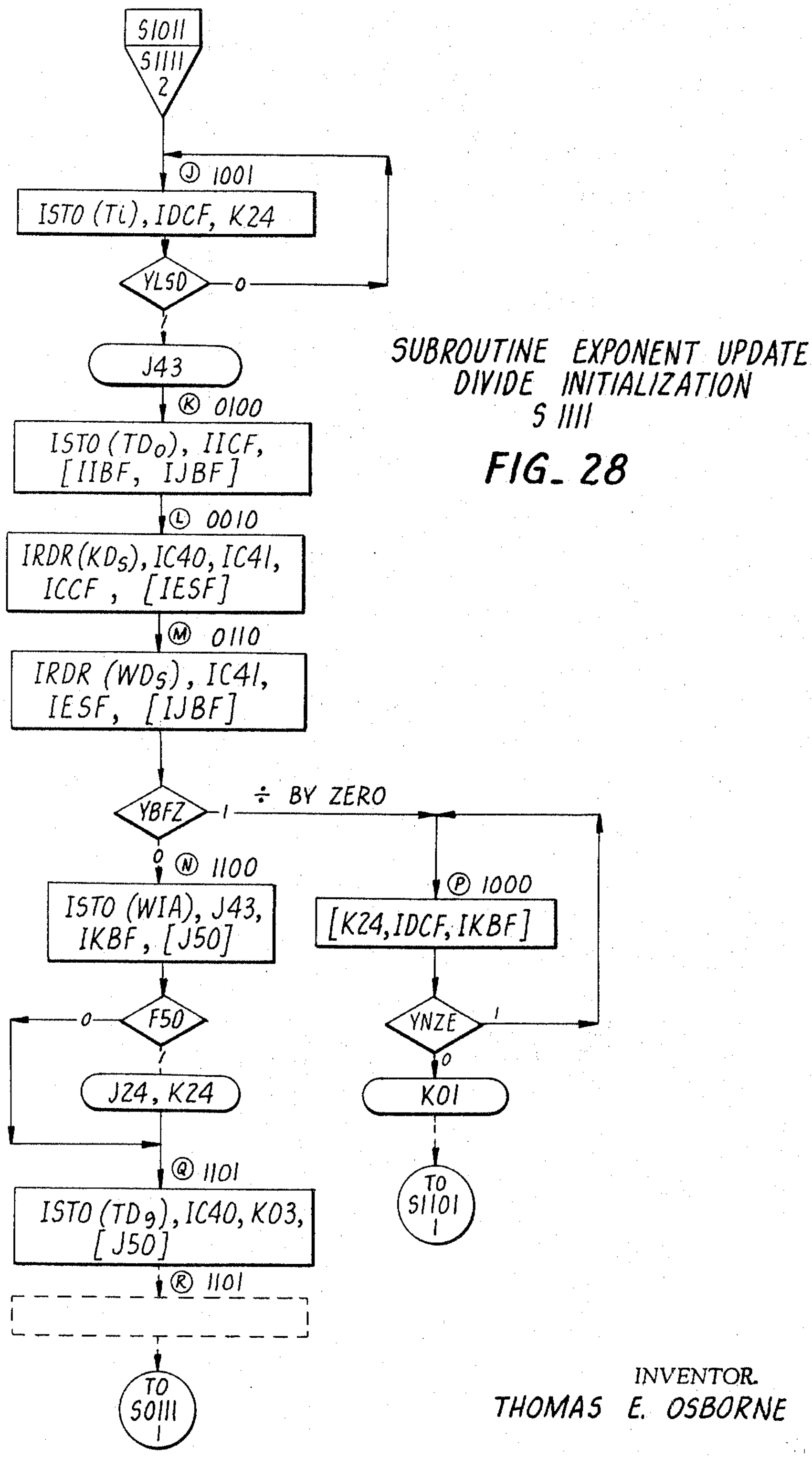
FIG. 28 is a detailed flow chart of the subroutine used for updating exponents and initiating the first portion of the division process.

LOGICAL EQUATIONS-SUBROUTINES DIGIT ENTRY POSITION-EXPONENT UPDATE & DIVIDE INITIALIZE-S1111-FIGS. 27 & 28

| | |
|---|---|
| (equals followed by S1111) | |
| J13 = G2110 | IESF = G0210 |
| K13 = G2010 | IESF = G2010 |
| K13 = G2001 · YLSD | IIBF = G0202 |
| J12 = G0210 | IICF = G0200 |
| J12 = G1201 · YLSD | IKBF = G1200 |
| J12 = G1211 · YBFZ | IRDR = G0212 |
| J12 = G1210 · E50 | ISTO = G2001 |
| K12 = G0102 | ISTO = G2122 |
| K12 = G1112 | IJBF = G0120 |
| K12 = G2110 · YBFZ | J24 = G1200 · F50 |

LOGICAL EQUATIONS - SUBROUTINES
DIGIT ENTRY POSITION - EXPONENT UPDATE
& DIVIDE INITIALIZE - S1111 - FIGS. 27 & 28 – Continued

| | |
|---|---|
| J11 = G0102 | J32 = G2011 |
| K11 = G0211 | J43 = G1120 |
| K11 = G0112 | J43 = G0021 |
| J10 = G1102 | J43 = G2001 · YLSD |
| J10 = G1210 | J50 = G1122 |
| K10 = G0001 | K01 = G0000 · YBFZ |
| K10 = G1211 | K01 = G1200 · G1002 |
| K10 = G1021 · YLSD | K02 = G0000 · YBFZ |
| ICCF = G2010 | K03 = G1121 |
| IC40 = G2012 | K24 = G1200 · F50 |
| IC40 = G1121 | K24 = G1002 |
| IC41 = G2012 | K50 = G1112 |
| IC41 = G0210 | (end of S1111) |
| IDCF = G1102 | |

FLIP FLOP DRIVER AND GATING

As indicated above, the calculator includes a plurality of flip flops. A number of different bistable devices may be used for these flip flops, but preferably, all of the flip flops are constructed in the form of the J–K flip flop illustrated in FIG. 29. This particular flip flop has several distinct advantages which make it desirable in the calculator and in other situations where bistable devices are used.

In connection with the description of the flip flop, it should be noted that the calculator has two general power sources, a direct current source, and a clock source which delivers pulses at a frequency of 700 kilocycles. The flip flop has two J–K input terminals labled R & T respectively in FIG. 29, which receive drive pulses. The two E-F output terminals 29S and 29U respectively which alternatively conduct a signal from the direct current source, and the particular one of the E and F terminals which conducts the direct current signal is determined by which of the J–K input terminals received the most recent pulse.

As explained below, input pulses at J or K cause output signals at F or E respectively, and simultaneous pulses at J and K cause the signals at E and F to reverse.

The change in signals at E and F caused by pulses at J or K or both J and K occurs at the end of the pulse which causes the change. In other words, where the E terminal is conducting a direct current and an input pulse is connected to the K terminal the first portion of the input pulse preconditions the flip flop to change state, and the preconditioned flip flop changes state at the end of the pulse to a condition with the F terminal conducting the direct current and the E terminal not conducting. Because of this mode of operation, it is possible to exchange the contents of two flip flops directly during a single clock interval. For instance, where F40 and E24 are conducting before a clock interval, the connection of F40 to J24 and the connection of E24 to K40 during the clock interval will cause the E24 signal to be transferred into flip-flop 40 and the F40 signal to be transferred into flip-flop 24 simultaneously at the end of the clock interval.

The actual operation of the flip flop will be understood with reference to FIG. 29 where reference letters appear which are prefixed herein by the FIG. number and with reference to FIG. 29' where the direct current output of terminal F is plotted on a time scale against input pulses at terminals J and K.

The direct current output at terminal E is the reverse of the F terminal output. It will be noted from this description that this J–K flip flop may be used without two diodes in situations where an R–S flip flop is desired, an R–S flip flop being the type of flip flop in which the E–F outputs resulting from simultaneous J–K inputs (called R–S inputs) are not predictable.

Resistors 29C, 29D, 29F and 29H in conjunction with transistors 29B and 29G comprise a standard flip flop. Transistors 29A, 29J, resistors 29X, 29M, and capacitors 29L, 29N make up two identical flip flop drivers, one for each side of the flip flop. Diodes 29P and 29Q result in the standard "J–K" flip flop whereas the elimination of 29P and 29Q will result in a standard "R–S" flip flop.

Assume that the diodes 29P and 29Q are connected and that the flip flop input signals are in the period $T_0$ of FIG. 29', i.e., clock high, 29A, 29B and 29J non-conducting, and 29G conducting. At $t = 0_+$, an input is provided at the J input, 29R. Transistor 29A will conduct causing the junction of 29L and 29X to assume a potential more negative than Vcc. Transistor 29B will become reverse biased, but remain cutoff. Current passing upward through 29L will result in the voltage across 29L decreasing from its initial value of +Vcc. The application of an input at 29R has not yet affected the state of the flip flop. When the signal at 29R is removed or interrupted, transistor 29A is turned off. In regaining the charge lost when 29A was on, 29L conducts via 29X and the base of 29B. (A small current flows in 29H, but is not relevant in this discussion). The current flowing into 29B turns it on, resulting in the flip flop changing states from 0 to 1. (The signal at terminal E goes from 1 to 0, and the signal at terminal F goes from 0 to 1).

During time $t_1$ no input signals occur and the flip flop remains in the 1 state. However, the input at 29T during $t_2$ will result in the flip flop changing states from 1 to a 0.

Thus far, diodes 29P and 29Q have had no effect on circuit operation. However, during $t_3$ inputs occur simultaneously at 29R and 29T. Since 29G is conducting and 29B is cutoff, the current that would normally enter the base of 29J is diverted into the collector of 29G by 29Q. During $t_3$, the circuit will respond precisely as it did during $t_0$. Correspondingly, during $t_4$, diode 29P will conduct and the circuit will respond as it did during $t_2$.

The voltage at Vc during the first portion of any time period $t_n$ is set to eliminate the deleterious effects of noise on the input lines. Transistors 29A and 29J cannot conduct until their input lines are more positive than Vc. Vc is typically set at plus 2.2 volts.

The currents entering 29R and/or 29T can be interrupted to cause transferral of information from 29L or 29N to 29B or 29G respectively by switching Vc more positive than the open circuit input signal at 29R or 29T, or by diverting the input current with diodes (as indicated in dashed lines in FIG. 29) or transistors.

The transistors 29A and 29J, in addition to providing noise immunity, operate as power amplifiers. Signals need only be present long enough to guarantee that the charge on 29L or 29N be sufficient to guarantee switching of 29B or 29G respectively. The gating circuit dissipates no standby power.

Since switching is initiated by turning 29A and 29B off, it is evident that any "hazards" or false input signals occuring at the flip flop inputs will be ignored as long as the transistors 29A and 29B remain cutoff.

INSTRUCTION LINES AND INSTRUCTION DRIVERS

As mentioned above in connection with the description of FIG. 9, and in the explanation of the meaning of logical equations, transistor drivers such as 9D are used for driving each of the instruction lines. Similar transistor drivers are used for driving each of the subroutine drive lines such as the transistor driver for the S0101 drive line in FIG. 9. As indicated in 9A and 9C, the transistor drivers are turned on by selected combinations of output gates of the flip flops, and as indicated in 9E, the instruction signal will advance one flip flop or a combination of flip flops one step in a sequence determined by the levels existing in the flip flops and/or levels originating exterior to the flip flops at the onset of the instruction signal. Any given flip flop can respond to more than one instruction, and an instruction can effect more than one flip flop.

The transistor driver 9D and the corresponding driver for S0101 consist of two transistors 9G and 9H and a resistor 9L. A signal in the base of transistor 9G will cause current to flow in the collector of 9G and the base of 9H. Transistor 9H will turn on connecting the drive line 9K to the 15 volt emitter supply voltage of transistor 9H. Current will then flow through the combinatorial logic resistors 9B to effect the desired responses in devices which receive the drive signal; these devices may, of course, be flip flops, qualifier gates, or other instruction drivers.

The use of these drivers provides two distinct advantages. The amplifying power of each driver provides a "power supply" for the group of devices driven by the driver directly at the input of that group of devices, and since this "power supply" is turned off at all times when the group of devices is not in use, the power consumption of the calculator is greatly reduced. In this regard, it will be noted that the calculator includes 16 transistor drivers for the subroutine drive lines and 29 drivers for the instruction lines, but of these 45 "power supplies", only a small portion of these "power supplies", typically two to five, are supplying power at any given time.

Secondly, the drivers provide noise immunity in the system because the controlled voltage, indicated as 2.2 volts in FIG. 9, at the emitter of transistor 9G provides a controlled threshold which signals must exceed before the driver turns on. Thus, the input voltage at the base of 9G must exceed 2.2 volts before 9G turns, thereby excluding noise below 2.2 volts.

TRANSFER VECTORS

In order for one portion of a computing system (hereafter called the common subroutine) to be used by several other portions of the system, information (hereafter called the transfer vector) for control upon exit from the common subroutine must be originated and placed in a storage area before entering the common subroutine. Control can then be directed to the common subroutine. Upon completion of the common routine, the transfer vector is recalled from storage and analyzed (decoded) to direct control to the prescribed place.

Except for the process of decoding the transfer vector, the process is analogous to executing a "transfer and set index", i.e., "TSX" instruction, in a digital computer to enter an "open ended" computer subroutine followed by a "transfer with a tag" instruction upon completion of the open ended subroutine.

In the general purpose computer, the transfer vector contains either sufficient binary bits to define every possible memory location in the machine, e.g., IBM 7094, or sufficient bits to define a large number of memory locations so that an indirect addressing technique can be used to direct control to any of the possible memory locations. The technique to be here used in the calculator differs from these methods in that the number of bits in the transfer vector need only be as large as the $LOG_2$ (or the next integer above $LOG_2$ if the $LOG_2$ is not an integer) of the number of *different* transfer vectors. Thus, the transfer vector stored upon entry to a common subroutine is an encoded binary number, and when the common subroutine is completed, the encoded binary number is recalled from storage, decoded and used to direct control to the next routine.

The procedure by which the transfer vector is used in the calculator will be apparent from the following sequence of steps:

A. ENTRY - The transfer procedure is entered by giving an ICAL instruction which causes the following instructions to occur simultaneously.

1. 1111 → SFF - All called subroutines are entered at condition 17 of the primary flip flops. PFF entry information is accumulated in the calling routine.
2. ITSB(SFF → BFF without changing F24) - is determined by the (F24) and (BFF). (F24) is fixed by the calling routine, while (BFF) became (SFF) via ITSB. Each subroutine call is given from a different state as defined by (F24) and (BFF). Thirty transfer vectors are possible since two [11111, 01111] are used by the return transfer vector routine.
3. 111 → F43, F42, F41. This condition of F41, F42 and F43 selects the IAS location of auxiliary register MEMO or MEM 1 as the location in which the transfer vector will be stored. The calling routine puts 0 → F40 for zero order subroutines or 1 → 40 for first order subroutines.
4. 1200 → (CFF) - Each subroutine is entered with (CFF) = Dg or $E_1$, that is, the MSD of the mantissa or characteristic. This procedure is taken to standardize the calling process.
5. ISTO - The transfer vector determined in part 2 is stored in the memory location determined in part 4.

B. RETURN - The transfer vectors stores in MEM O IAS or MEM I IAS are recalled and decoded so that control can be sent to the proper location depending on the location from which the common subroutine was entered. The LSB of the SFF (F10) defines whether the subroutine is a zero order to routine, (F10) = 0, or a first order subroutine, (F10) = 1. The return of the transfer vector is started by the giving of instruction IRTN which issues the following instructions simultaneously.

1. 1000 → PFF - The decoding of the transfer vector is done in the subroutine S1000.
2. 1200 → CFF - This establishes the MSD on exit.
3. 1111 → SFF - To be used during decoding.
4. 110 → F43, F42, F41, and F10 → F40.
5. IRDR, which reads the transfer vector into the BFF.

C. DECODE - As a result of steps $B_1 - B_5$, the transfer vector appears in the BFF, and control is sent to S1000. From this condition, the following commands are given.

1. ITBS - The transfer vector is sent to SFF for decoding. It will be decoded from SFF rather than BFF because the gates G0000 to G2221 can be used.
2. ITVF if (F24) = 1, or ITVE if (F24) = 0 - This is the actual decode command. However, the transfer vector as defined by (F24) and (SFF) is either 01111 or 11111, and in either case, the command ITVF or ITVE attempts to send control to S1000. Were it not for the ITBS given in step C1, the machine would lock up in S1000. The ITBS puts the actual transfer vector into the SFF and the next clock period finds the real transfer vector in (F24) and (SFF) so that the decode can return control to the desired location.

DISPLAY

Figure 30:
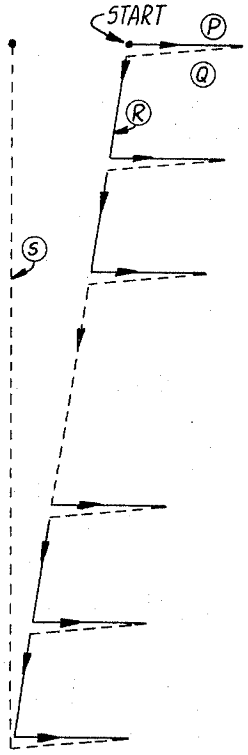
FIG. 30 is a diagram of the trace pattern on the output cathode ray tube of the calculator.
Figure 31:
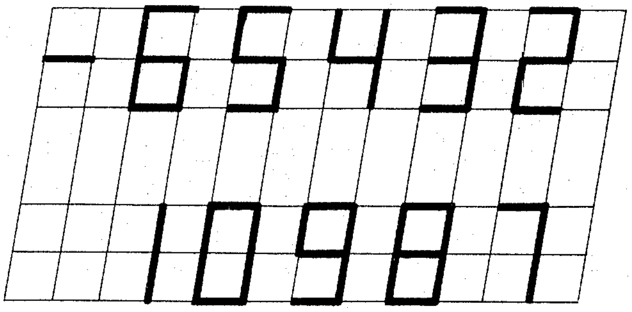
FIG. 31 is a diagram illustrating how decimal numbers are displayed from the trace pattern of FIG. 30.
Figure 32:
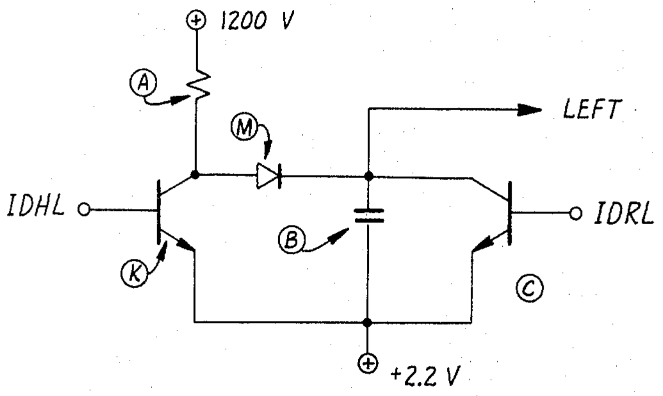
FIG. 32 is a schematic diagram of the left deflection circuit for the cathode ray tube.
Figure 33:
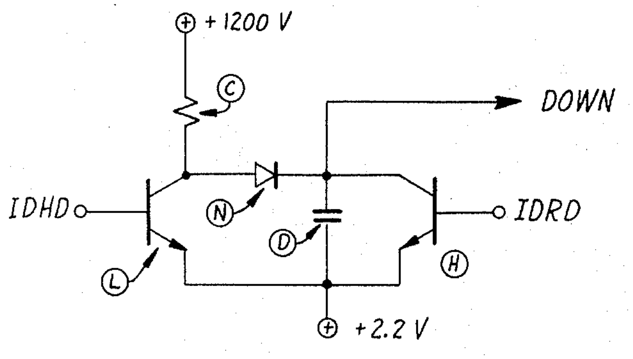
FIG. 33 is a schematic diagram of the down deflection circuit for the cathode ray tube.

The digits 0–9 and the minus sign can be generated on the CRT from the basic E trace shown in FIG. 30. This figure shows two E's above each other because this configuration is used in the calculator to trace the two lines of numbers corresponding to (KBD) and (ANS) simultaneously. Any number of E traces could be generated above each other depending entirely upon system requirements. By placing E traces front to back as shown by the light lines in FIG. 31, a cross hatch pattern is formed. Proper modulation of two successive front to back E traces results in generation of the digits 0–9 as shown in FIG. 31.

Figure 34:
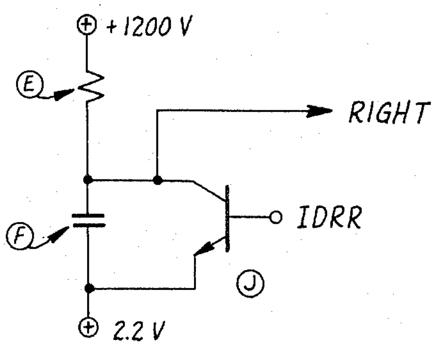
FIG. 34 is a schematic diagram of the right deflection circuit for the cathode ray tube.
Figure 35:
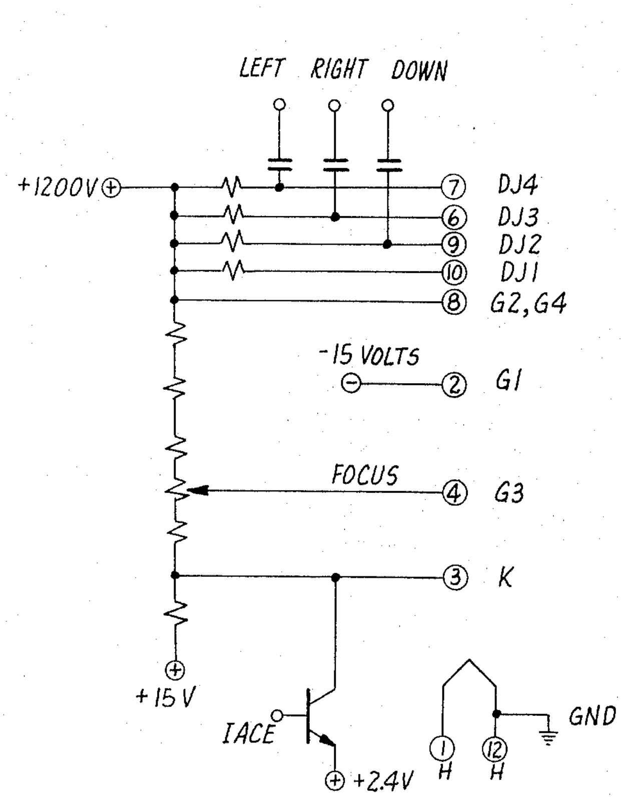
FIG. 35 is a schematic diagram of the biasing circuits for the cathode ray tube.

The circuitry for beam deflection and modulation is shown in FIGS. 32–35. FIG. 35 shows a standard biasing arrangement for a 3RP1 cathode ray tube. The control grid (PIN2) is connected to −15 volts and the CRT beam is turned on by applying an input to IACE. Three deflection signals are sufficient to generate the E trace. They are left, right, and down signals which are applied to pins 7, 6 and 9 respectively, of the 3RP1 CRT. These three signals are generated by the left deflection circuit, (FIG. 32), the down deflection circuit, (FIG. 33), and the right deflection circuit, (FIG. 34).

Each deflection circuit consists of a resistor 32A, 33C, or 34E connected to a high voltage (+1200) source which charges a capacitor 32B, 33D, or 34F. Since the deflection voltages are small in comparison to the high voltage supply, the signals are essentially linear. To restore any of the three traces it is necessary to apply signals to transistors 32C, 33H, or 34J. This will discharge the capacitors and prevent further buildup of wave forms. Both the left deflection circuit and the down deflection circuit have the ability to interrupt or "hold" a wave form by applying a signal to transistors 32K or 33L. This diverts the current that would normally charge the capacitors 32B or 33D. Diodes 32M and 33N prevent the capacitors from discharging.

One way to generate the E trace (FIG. 30) is to apply signals at IDHL and IDHD to hold the left and down traces. During this time no signal is applied to IDRR and the beam traces out a horizontal line 30P. During the next time interval IDDR turns on to restore the right trace 30Q. IDDR remians on while the signals at both IDHL and IDHD are removed. The beams thereupon traces out the skewed line 30R. The process is continued until the down trace must be restored 30S. Similarly, when the leftmost excursion has been reached, a signal at IDRL will restore the left trace.

The details of forming the modulating wave forms are shown above in connection with the display routine.

CLOCK CIRCUIT

As mentioned above, the calculator employs a clock circuit which controls the timing at which events occur. A variety of different clock circuits might be used. However, the clock illustrated by FIGS. 36 and 37 is preferred because it operates at the desired high frequency, 700 kilocycles, and because it provides good control of pulse shape and frequency stability with changes in supply voltage.

Figure 36:
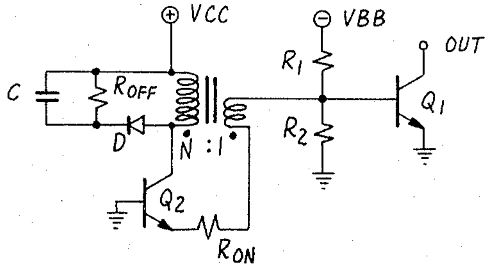
FIG. 36 is a circuit diagram for the clock source used in the calculator.

Referring in detail to FIG. 36, the clock circuit includes a transformer having N turns in the primary per turn of the secondary with a diode 36D, a capacitor 36C, and a resistor $\mathbf{36R}_{off}$ in the primary circuit. The primary is connected to the secondary through a grounded base transistor $\mathbf{36Q}_2$ and a resistor $\mathbf{36R}_{on}$. Positive input voltage Vcc is connected to the primary, and negative input voltage VBB is connected to the secondary through resistor $\mathbf{36R}_1$ which is grounded through resistor $\mathbf{36R}_2$. The secondary and the junction between $\mathbf{36R}_1$ and $\mathbf{36R}_2$ are connected to the base of a transistor $\mathbf{36Q}_1$. The emitter of $\mathbf{36Q}_1$ is grounded, and the collector of $\mathbf{36Q}_1$ forms the output terminal for clock pulses.

Figure 37:
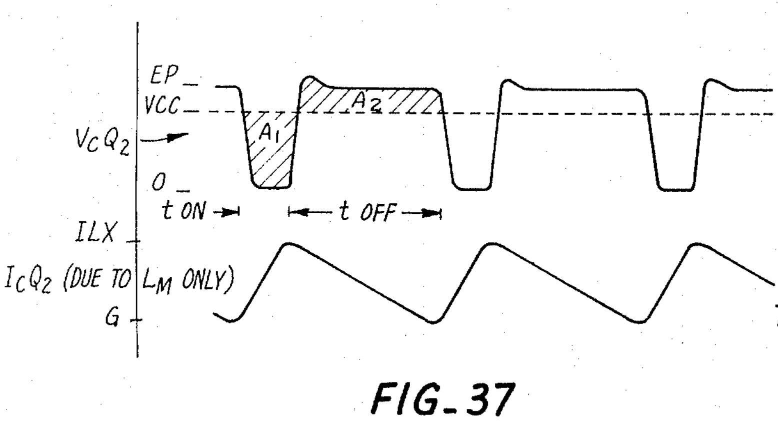
FIG. 37 is a waveform diagram illustrating the operation of the clock source of FIG. 36.

The operation of the clock will be understood with reference to FIG. 37 where the collector voltage $V_cQ_2$ of $\mathbf{36Q}_2$ is plotted on a time line above the collector current $I_cQ_2$ of $\mathbf{36Q}_2$. It should be noted that $I_cQ_2$ also has a DC component caused by $\mathbf{36R}_{on}$ which is not illustrated in FIG. 37.

During $t_{on}$ in FIG. 37, the inductor current builds up from zero to ILX. When the blocking oscillator turns off, the inductor current goes through 36D and charges 36C. The capacity of 36C is very large, and the resultant voltage change across 36C is small.

Since $L_m$, the primary inductor, is discharging into a constant voltage, the $di/dt$ is known. Since the initial current and the rate of decrease is known, one can determine when the current reaches zero. During the discharge time a voltage is induced into the secondary with a polarity causing $\mathbf{36Q}_2$ to be reverse biased i.e., the dot side of the secondary goes positive. The magnitude of the voltage is large enough to keep $\mathbf{36Q}_2$ off as long as current flows in the primary during $t_{off}$. When the primary current reaches zero, the primary voltage abruptly goes from EP to Vcc (FIG. 37). Correspondingly, the secondary drops from (EP – Vcc/N) to zero. However, $\mathbf{36R}_1$ and $\mathbf{36R}_2$ are selected so that with no voltage across the secondary, $\mathbf{36Q}_2$ is forward biased; thus, a new cycle is begun. The on time is determined from the equation $$t_{on} = L_m\,(N-1)/R_{on}\,N^2 \qquad (1)$$

At the end of $t_{on}$, the magnetizing current is $$ILX = Vcc/L_m\, t_{on} \qquad (2)$$

During $t_{off}$, the magnetizing current decreases at a rate given by $$di_1/dt = Vc/L_m \qquad (3)$$

where $i_1$ is defined as the magnetizing current flowing in the primary and Vc is defined as the voltage across C. Note that C is large so that Vc changes by a very small amount. For practical purposes, Vc will be assumed to be constant, $t_{off}$ can be found from equations (2) and (3) by noting that ILX and $di_1/dt$ are known, and that the off period ends when $i_1 = 0$.

$$t_{off} = \mathrm{ILX}\ L_m/\mathrm{Vc} \qquad (4)$$

From equations (2) and (4) it follows that $$t_{off} = \mathrm{Vcc}\ t_{on}/\mathrm{Vc} \qquad (5)$$

$$\text{or } t_{on}/t_{off} = \mathrm{Vc}/\mathrm{Vcc} \qquad (5a)$$

This says that the shaded areas $A_1$ and $A_2$ in FIG. 37 are equal. This must be so if the circuit is to work properly.

During $t_{off}$, the average current $i_{1AVE}$ entering D is $$i_{1AVE} = \mathrm{ILX}/2 \qquad (6)$$

It is permissible by superposition to assign the entire $i_{1AVE}$ to go into 36C during $t_{off}$ provided a discharge current $i_2$ flows from 36C through $36R_{off}$.

The total charge entering 36C is, during any given cycle, given by $$Q_{in} = i_{1AVE}\ t_{off} \qquad (7)$$

or $$Q_{in} = \mathrm{ILX}/2\ t_{off} \qquad (8)$$

The charge lost from 36C during any cycle is, $$Q_{out} = i_2\ (t_{on} + t_{off}) \qquad (9)$$

or $$Q_{out} = \mathrm{Vc}/R_{off}\ (t_{on} + t_{off}) \qquad (10)$$

In order that equilibrium exist, the incoming charge must equal the outgoing charge, $$Q_{in} = Q_{out} \qquad (11)$$

or $$\mathrm{ILX}/2\ t_{off} = \mathrm{Vc}/R_{off}\ (t_{on} + t_{off}) \qquad (12)$$

However, ILX is given in equation (2) so that, $$\mathrm{Vcc}\ t_{on}/2L_m\ t_{off} = \mathrm{Vc}/R_{off}\ (t_{on} + t_{off}) \qquad (13)$$

Also, Vc can be obtained from equations (5) as, $$\mathrm{Vc} = (\mathrm{Vcc}\ t_{on})/t_{off} \qquad (14)$$

So that, $$\mathrm{Vcc}\ t_{on}\ t_{off}/(2L_m) = (\mathrm{Vcc}\ t_{on})/(R_{off}\ t_{off})\ (t_{on} + t_{off}) \qquad (15)$$

or $$t_{off}/2L_m = (t_{on} + t_{off})/(t_{off}\ R_{off}) \qquad (15a)$$

Solving for $R_{off}$ gives, $$R_{off} = 2L_m/t_{off}\ [1 + t_{on}/t_{off}] \qquad (15b)$$

Notice that $t_{off}$ is independent of Vcc. This means that one will expect good frequency stability with respect to supply voltage changes. Also, notice that $t_{off}$ is a function of $t_{on}$. This means that one should first adjust $R_{on}$ to obtain the proper $t_{on}$ and then adjust $R_{off}$ to obtain the desired $t_{off}$. Also, it should be noted that the Ep, the peak overshoot voltage, is maintained at an absolute minimum.

KEYBOARD ENCODING MATRIX

As mentioned above, information is entered in the calculator by depressing a plurality of keys which are divided into two groups, operand or number entry keys, and operator or data manipulation keys. Each key is associated with an electric switch which is closed when the key is depressed, and the switches are connected in a keyboard encoding matrix which (1) provides a signal indicating that a key is down, and (2) generates a unique five bit code identifying the key.

Figure 38:
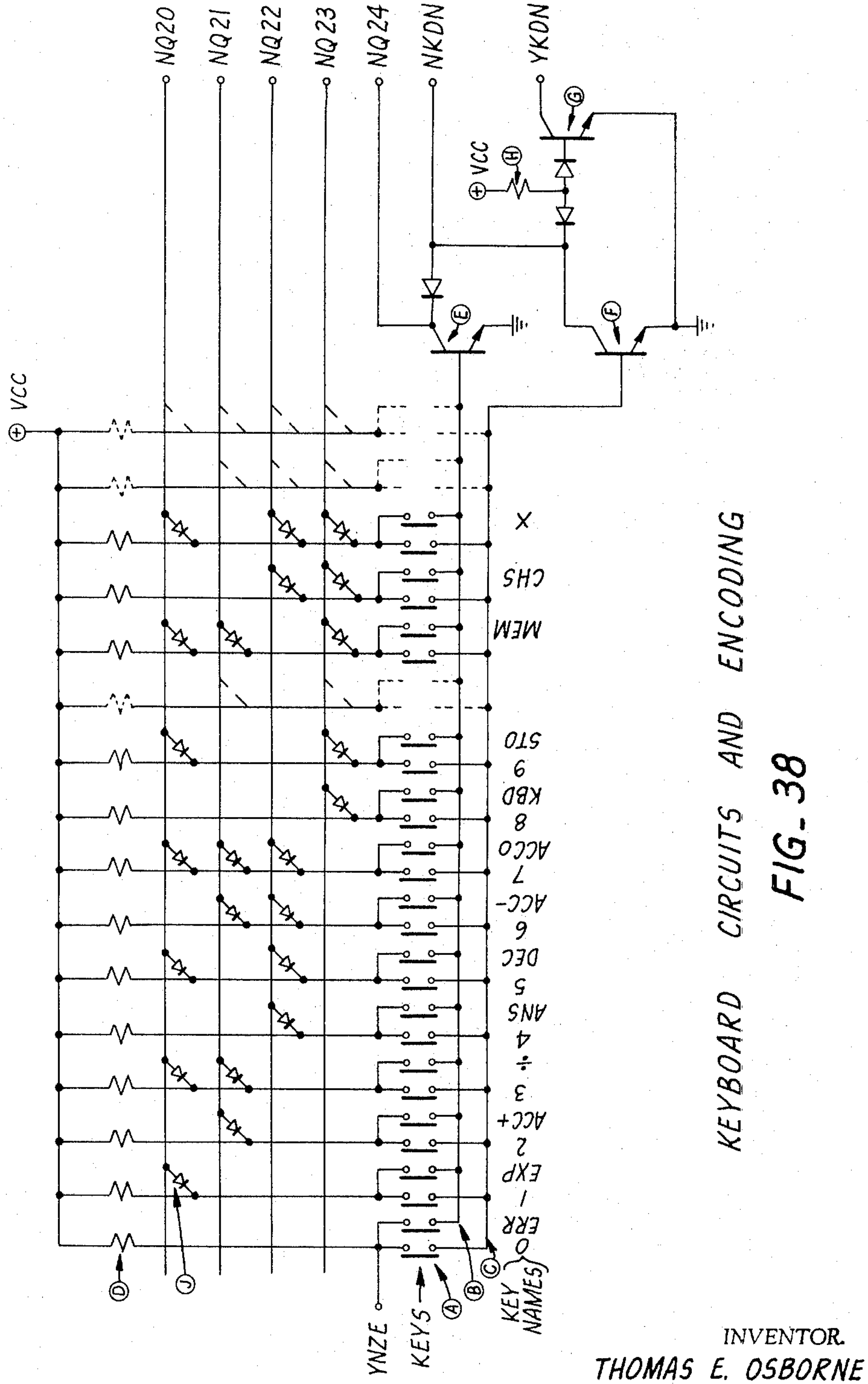
FIG. 38 is a schematic diagram of the keyboard encoder employed in the calculator.

As illustrated in FIG. 38, the keyboard encoding matrix comprises five wires NQ20 – NQ24 on which the five bit code appears and a plurality of transverse wires connected to a plus voltage Vcc with each transverse wire carrying a resistor 38D and connected to one of the operand keys and one of the operator keys. The transverse wires are code connected by diodes 38J to the wires NQ20 –NQ23, and all of the operator keys are connected to the wire NQ24 through transistor 38E. It will be noted that the number of keys is less than the number of possible combinations of the five bit code, and for this reason, six of the five bit code characters are omitted as indicated by the phantom line connections in FIG. 38. The phantom components may be added to the matrix as where further functions and subroutines are added to the calculator for performing roots, exponential functions, and the like.

One side of each of the operator switches is connected, via wire 38B, to the base of transistor 38E, the emitter of which is grounded. The collector of 38E is connected directly to wire NQ24 and through a diode to terminal NKDN.

One side of each of the operand switches is connected, via wire 38C, to the base of transistor 38F whose emitter is grounded. The collector of 38F is directly connected to NKDN and connected through a diode and resistor 38H to +Vcc, and the resistor-diode junction is connected through a second diode to the base of transistor 38G. The emitter of 38G is grounded, and its collector is connected to a terminal YKDN. The plus sides of the zero operand and ERR operator keys are connected to a terminal YNZE.

With no switch 38A closed, signals at NQ20 – NQ24, NKDN and YNZE are not at ground potential. Only the signal at YKDN is at ground potential as a result of the current through 38H which holds transistor 38G on at saturation. When any switch closes, current flows through a source resistor 38D and into the base of either transistor 38E or 38F depending on whether the switch is an operator switch or an operand switch. Whenever either of the transistors 38E or 38F turns on, transistor 38G turns off causing the potential at YKDN to rise and indicate to the control logic that a key is down. At the same time, the signal at NKDN goes to ground through the collector emitter path of the transistor 38E or 38F which is on. The system logic then provides a delay period to eliminate the effect of contact bounce and then looks at NQ20 – NQ24 to determine which key is down. At the end of the delay period, the lines NQ20 – NQ24 form an encoded representation of the switch depressed. The lines representing logical zeros in the code are grounded via the encoding diodes 38J and the base-emitter path of one of the transistors 38E and 38F. The lines representing logical ones are not connected to ground.

TESTER

The calculator described herein is designed for use with a unique tester. The calculator will operate in its intended manner without the tester present. However, the tester can be plugged into the calculator for final check out of newly manufactured calculators and for testing components and subroutines of the calculator during maintenance and repair.

Figure 39:
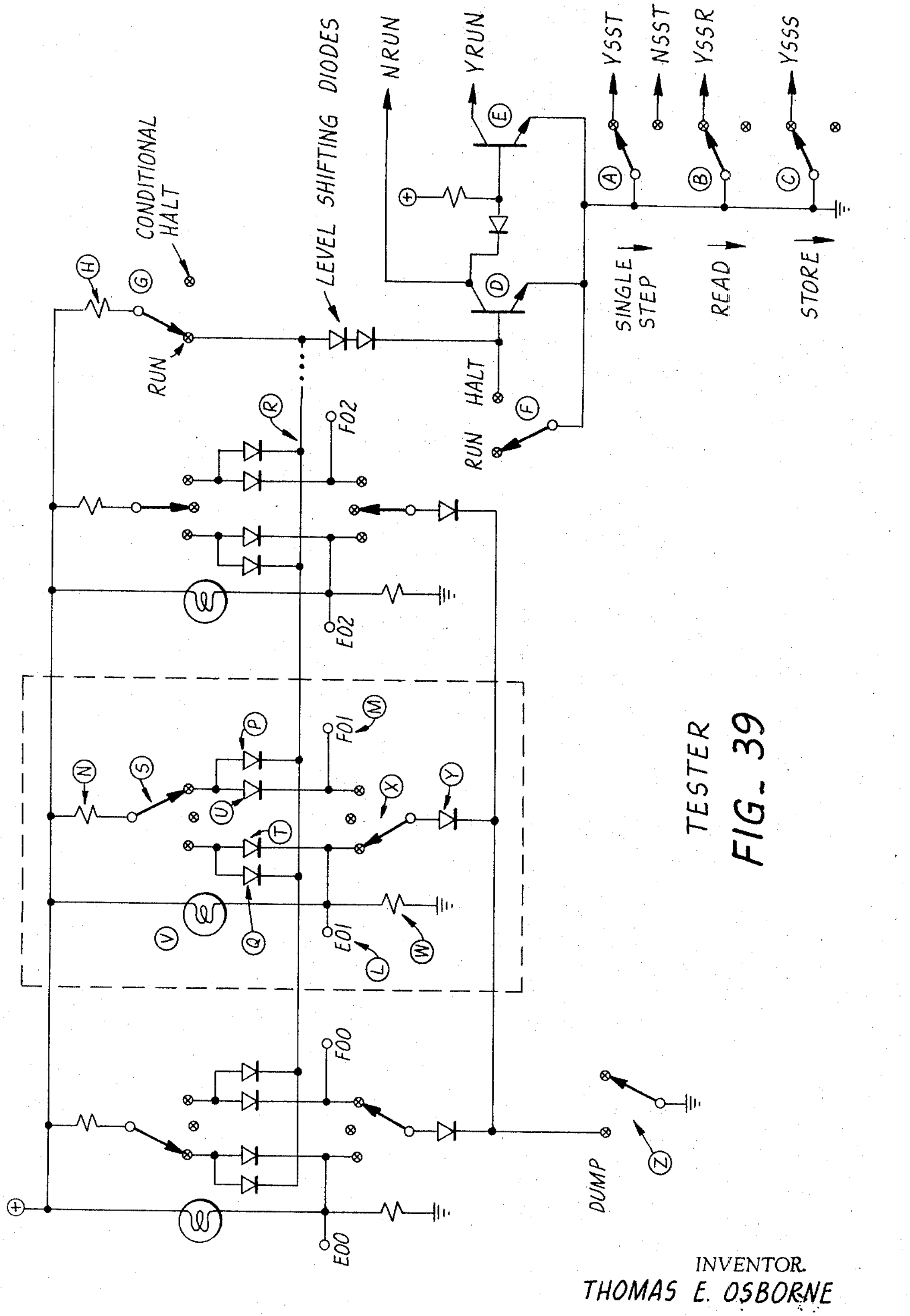
FIG. 39 is a schematic diagram of a removable tester used to test and service the calculator.

The tester has 23 similar components illustrated by the dashed box in FIG. 39 with one component for each of the calculator flip flops except the flip flops F60 – F63. Each of these tester components has two terminals 39L and 39N corresponding to the E and F terminals of the flip flop with which the tester component is to be used. These terminals 39L and 39M are physically connected together in multiterminal plugs which may be plugged into the calculator at 8DD for connection to the E–F terminals of the flip flops. Each of these tester components also has two manually operable switches 39S and 39X which may be manipulated during testing as explained below.

All of the 39S switches may be set to a predetermined condition of the 23 flip flops to cause the calculator to run until the 23 flip flops reach that predetermined condition and then stop. Use of this group of switches permits the testing of sequences of calculator steps since the switches can be set to sto calculator operation at any selected normal condition thereby verifying the fact that the calculator has gone through the steps necessary to reach that condition.

All of the 39X switches can be set to a predetermined condition of the 23 flip flops to force the flip flops into that predetermined condition. The 39X switches may thus be used to set the flip flops in the last condition which they would assume before reaching the condition set on the 39S switches. The 39S and 39X switches may be used in this way to verify the fact that the calculator is performing properly in any desired step of any normal subroutine or operation.

As mentioned above, the tester has a plurality of output terminals NRUN, YRUN, YSST, NSST, YSSR, and YSSS which are connected to the control logic of the calculator 8V at 8CC by a six-terminal plug so that the corresponding qualifier signals will be received by the control logic (see for instance YRUN in FIG. 12). These qualifier signals permit the tester to control the calculator as mentioned below. When the tester is not in use, the tester plug may be replaced by a patch plug in the calculator which constantly supplies the qualifier signals, such as YRUN = 1, indicating no control by the tester.

The tester also contains six manually operable switches for controlling specific calculator functions. The "dump" switch 39Z causes flip flops to change state through the 39X switches. The "halt" switch 39F can be used to stop running operation of calculator steps in connection with single step, read, and store switches 39A, 39B, and 39C respectively, and the "conditional halt" switch causes the calculator to stop when it reaches the flip flop conditions set on the switches 39S. The tester also includes a lamp 39V in each flip flop component of the tester to indicate the instantaneous condition of the flip flop. The detailed operation of the tester will be understood from the following description.

The tester consists of a means for generating two single step qualifiers YSST and NSST from a single step switch 39A; a means for generating a single step read signal YSSR, 39B; and a single step store signal YSSS, 39C. In addition, two qualifiers NRUN and YRUN are formed by transistors 39D and 39E. A switch 39F will cause YRUN to become a logical 0 (zero volts) whenever it is in the halt position, because 39D will be off causing 39E to conduct. The signal YRUN will be a logical one when both 39F and 39G are in the run position since current through 39H will turn 39D on. When 39G is in the conditional half position, current may or may not be on depending upon the input signals 39L and 39M coming from system flip flops. FIG. 39 shows three of the 23 Flip flop outputs connected to the tester (all but F63–F60 are connected in the actual tester). Current will flow into the base of 39D as long as there is a path from one of the conditional halt resistors 39N through a conditional halt diode 39P or 39Q, the conditional halt bus 39R and into 39D. Current may be interrupted in one of two ways. First, it can be interrupted by placing a conditional halt switch 39S in the middle or "don't care" position or, it can be diverted from 39R by the flip flop via diodes 39T or 39U. In the boxed area, current through 39N would not enter 39R as long as F01 = 0 (E01 = 1). Thus, by preselecting the conditional halt switches, and setting 39G to the conditional halt position, signal at YRUN will remain high until the conditions set in the conditional halt switches are met.

The lamp 39V indicates the state of a flip flop connected to it. A bright condition occurs when the E or zero side of the flip flop is zero volts or when the flip flop is in the one condition. Resistor 39W maintains current through the lamp 39V and prevents switching surge currents.

The bottom three position switches 39X cause the conditions set therein to be set into the flip flops by grounding the collectors to which they are connected via diodes 39Y when switch 39Z is placed in the "dump" position. Diodes 39Y isolate the various flip flops from each other. No change will occur in a flip flop when its conditioning switch 39X is in the middle position.

I claim:

1. In an electronic calculator the improved means for algebraic addition of numbers which comprises:

a first register adapted to contain a first algebraic number having sign and number portions;

a second register adapted to contain a second algebraic number having sign and number portions;

complementing means connected to said first register for complementing said sign and number portions of the algebraic number in said first register when said sign portions of the algebraic numbers in said first and second registers are different;

adding means connected to said first and second registers for adding the algebraic numbers in said first and second registers to form a sum;

answer indicating means connected to said adding means, said answer indicating means having overflow cancelling means for indicating as an answer said sum without the most significant digit thereof when said complementing means has operated and said most significant digit is an overflow; and recomplementing means for recomplementing the sign and number portions of said sum when said complementing means has operated and said most significant digit is not an overflow.

2. In an electronic calculator for adding algebraic numbers:

a first register for storing an algebraic number having a sign and a magnitude;

a second register for storing another algebraic number having a sign and a magnitude;

first means responsive to the algebraic numbers stored in the first and second registers, when the signs of these algebraic numbers are alike, for forming the sum of the magnitudes of these algebraic numbers and employing this sum and the sign of the algebraic number stored in the first register as the algebraic sum of the algebraic numbers stored in the first and second registers;

said first means being responsive to the algebraic numbers stored in the first and second registers, when the signs of these algebraic numbers are not alike, for complementing the sign and the magnitude of the algebraic number stored in the first register and forming the sum of the complemented magnitude of the algebraic number stored in the first register and the magnitude of the algebraic number stored in the second register; and second means responsive to the sum of the complemented magnitude of the algebraic number stored in the first register and the magnitude of the algebraic number stored in the second register, when the most significant digit of this sum is a carry, for employing this sum, without the most significant digit thereof, and the complemented sign of the algebraic number stored in the first register as the algebraic sum of the algebraic numbers stored in the first and second registers;

said second means being responsive to the sum of the complemented magnitude of the algebraic number stored in the first register and the magnitude of the algebraic number stored in the second register, when the most significant digit of this sum is not a carry, for complementing this sum and recomplementing the sign of the algebraic number stored in the first register and employing this complemented sum and recomplemented sign as the algebraic sum of the algebraic numbers stored in the first and second registers.

3. In an electronic calculator for adding algebraic numbers:

a first register for storing in base $n$ an algebraic number having a sign and a magnitude;

a second register for storing in base $n$ another algebraic number having a sign and a magnitude;

first means responsive to the algebraic numbers stored in base n in the first and second registers, when the signs of these algebraic numbers are alike, for forming the sum of the magnitudes of these algebraic numbers and employing this sum and the sign of the algebraic number stored in the first register as the algebraic sum of the algebraic numbers stored in the first and second registers;

said first means being responsive to the algebraic numbers stored in base $n$ in the first and second registers, when the signs of these algebraic numbers are not alike, for forming the $n$'s complement of the sign and the magnitude of the algebraic number stored in base $n$ in the first register and forming the sum of the complemented magnitude of the algebraic number stored in the first register and the magnitude of the algebraic number stored in the second register; and second means responsive to the sum of the complemented magnitude of the algebraic number stored in base n in the first register and the mangitude of the algebraic number stored in base n in the second register, when the most significant digit of this sum is a carry, for employing this sum, without the most significant digit thereof, and the complemented sign of the algebraic number stored in the first register as the algebraic sum of the algebraic numbers stored in the first and second registers;

said second means being responsive to the sum of the complemented magnitude of the algebraic number stored in base n in the first register and the magnitude of the algebraic number stored in base $n$ in the second register, when the most significant digit of this sum is not a carry, for forming the $n$'s complement of this sum and the complemented sign of the algebraic number stored in the first register and employing this complemented sum and recomplemented sign as the algebraic sum of the algebraic numbers stored in the first and second registers.

4. An electronic calculator as in claim 3 wherein n is ten.

5. An electronic calculator having a keyboard with a plurality of manually operable keys for entering numbers and arithmetic operators into the calculator, an answer register in which a number is stored and from which it is displayed, a keyboard register in which a number most recently entered by said keyboard is stored and from which it is displayed, a work register in which a number previously entered by said keyboard is stored, zero entry control means connected to said answer register for entering the number zero into said answer register, algebraic addition means for algebraically adding the number in said keyboard register to the number in said answer register, multiplication means for multiplying the number in said work register by the number in said keyboard register, and division means for dividing the number in said work register by the number in said keyboard register, said keys including an accumulate plus key connected to said algebraic addition, multiplication, and division means for causing the number stored in said keyboard register to be algebraically added to the number stored in said answer register and, when entry of the number stored in said keyboard register was sequentially preceded by entry of a multiply or divide arithmetic operator into the calculator, for causing the numbers stored in said keyboard and work registers to be combined in accordance with that multiply or divide arithmetic operator and algebraically added to the number stored in said answer register, and an accumulate zero key connected to said zero entry control, algebraic addition, multiplication, and division means for causing the number zero to be entered into said answer register and, when entry of the number stored in said keyboard register was sequentially preceded by entry of a multiply or divide arithmetic operator into the calculator, for causing the numbers stored in said keyboard and said work registers to be combined in accordance with that multiply or divide arithmetic operator and algebraically added to the number zero then stored in said answer register.

6. An electronic calculator comprising:

a keyboard having a plurality of numeric keys manually operable for initiating entry of electrical signals representing numerical operands into the calculator;

said keyboard also having a plurality of function keys manually operable for initiating entry of electrical signals representing arithmetic operators into the calculator;

electronic storage means coupled to said keyboard for storing electrical signals representing arithmetic operators entered into the calculator and for storing electrical signals representing numerical operands entered into the calculator or previously formed by the calculator;

electronic processing means coupled to said electronic storage means and responsive to entry of an electrical signal representing a multiply or divide arithmetic operator into the calculator for conditioning the calculator to compute the product or quotient of a previously entered or formed electrical signal representing a numerical operand and a subsequently entered electrical signal representing a numerical operand in response to subsequent entry of an electrical signal representing another arithmetic operator;

said electronic processing means being responsive to entry of an electrical signal representing an add or subtract arithmetic operator into the calculator for computing the sum or difference of two previously entered or formed electrical signals representing numerical operands;

said electronic processing means also being responsive to entry of an electrical signal representing one of said arithmetic operators into the calculator, when the sequentially preceding electrical signal representing an arithmetic operator entered into the calculator was a multiply or divide arithmetic operator, for combining two previously entered or formed electrical signals representing numerical operands in accordance with the sequentially preceding electrical signal representing a multiply or divide arithmetic operator and algebraically adding the product or quotient to another previously entered or formed electrical signal representing a numerical operand; and output means coupled to said electronic processing means for providing a visual output indication of the results of calculations performed by the calculator.

7. An electronic calculator as in claim 6 wherein:

said electronic processing means is responsive to entry of an electrical signal representing a multiply arithmetic operator into the calculator for conditioning the calculator to compute the product of a previously entered or formed electrical signal representing a numerical operand and a subsequently entered electrical signal representing a numerical operand in response to entry of another electrical signal representing another arithmetic operator into the calculator;

said processing means is also responsive to entry of an electrical signal representing a divide arithmetic operator into the calculator for conditioning the calculator to compute the quotient of a previously entered or formed electrical signal representing a numerical operand and a subsequently entered electrical signal representing a numerical operand in response to entry of another electrical signal representing another arithmetic operator into the calculator;

said processing means is responsive to entry of an electrical signal representing an add arithmetic operator into the calculator for computing the sum of two previously entered or formed electrical signals representing numerical operands; and said processing means is responsive to entry of an electrical signal representing a subtract arithmetic operator into the calculator for computing the difference of two previously entered or formed electrical signals representing numerical operands.

8. An electronic calculator as in claim 6 wherein electrical signals representing multiply and divide arithmetic operators are entered into the calculator in accordance with algebraic notation as initiated from said keyboard and electrical signals representing add and subtract arithmetic operators are entered into the calculator in accordance with post-fix notation as initiated from said keyboard.

9. An electronic calculator as in claim 6 wherein:

one of said function keys is an accumulate key which is manually operable for initiating entry of an electrical signal representing a first dual function arithmetic operator into the calculator; and said processing means is responsive to entry of an electrical signal representing the first dual function arithmetic operator into the calculator for computing the sum of two previously entered or formed electrical signals representing numerical operands and, when the sequentially preceding electrical signals representing an arithmetic operator entered into the calculator was an electrical signal representing a multiply or divide arithmetic operator, for combining two previously entered or formed electrical signals representing numerical operands in accordance with the sequentially preceding electrical signal representing a multiply or divide arithmetic operator and algebraically adding the product or quotient to another previously entered or formed electrical signal representing a numerical operand.

10. An electronic calculator as in claim 9 wherein:

another of said function keys ia an accumulate key which is manually operable for initiating entry of an electrical signal representing a second dual function arithmetic operator into the calculator; and said processing means is responsive to entry of an electrical signal representing the second dual function arithmetic operator into the calculator for computing the difference of two previously entered or formed electrical signals representing numerical operands and, when the sequentially preceding electrical signal representing an arithmetic operator entered into the calculator was an electrical signal representing a multiply or divide arithmetic operator, for combining two previously entered or formed electrical signals representing numerical operands in accordance with the sequentially preceding electrical signal representing a multiply or divide arithmetic operator and subtracting the product or quotient from another previously entered or formed electrical signal representing a numerical operand.

11. An electronic calculator as in claim 6 wherein:

said electrical signal representing said one of said arithmetic operators is an electrical signal representing an accumulate arithmetic operator; and said electrical processing means is responsive to said electrical signal representing said accumulate arithmetic operator for causing said output means to provide a visual output indication of the result of the calculation performed by the calculator.

12. An electronic calculator comprising:

a keyboard having a plurality of numeric keys manually operable for entering numerical operands into the calculator;

said keyboard also having a plurality of function keys manually operable for entering arithmetic operators into the calculator;

storage means coupled to the keyboard for storing arithmetic operators entered into the calculator from the keyboard and for storing numerical operands entered into the calculator from the keyboard or previously formed by the calculator;

processing means coupled to the storage means, responsive to entry of a multiply or divide arithmetic operator into the calculator from the keyboard in accordance with normal algebraic notation for conditioning the calculator to compute the product or quotient of a previously entered or formed numerical operand and a subsequently entered numerical operand in response to subsequent entry of another arithmetic operator into the calculator, and responsive to entry of said other arithmetic operator into the calculator while the calculator is so conditioned for computing said product or quotient;

said processing means being responsive to entry of a series of numerical operands and associated multiply or divide arithmetic operators into the calculator from the keyboard in accordance with normal algebraic notation for conditioning the calculator to compute the result of that series of numerical operands and associated multiply or divide arithmetic operators in response to subsequent entry of said other arithmetic operator into the calculator, and being responsive to entry of said other arithmetic operator into the calculator while the calculator is so conditioned for computing said result;

said processing means also being responsive to entry of an add or subtract arithmetic operator into the calculator from the keyboard in accordance with post-fix notation for computing the sum or difference of two previously entered or formed numerical operands; and output means coupled to said processing means for providing a visual output indication of the results of calculations performed by the calculator.

* * * * *

UNITED STATES PATENT OFFICE

CERTIFICATE OF CORRECTION

Patent No. 3,825,736 Dated July 23, 1974

Inventor(s) Thomas E. Osborne

It is certified that error appears in the above-identified patent and that said Letters Patent are hereby corrected as shown below:

Column 2, line 3, the comma after "therewith" should read -- ( --; line 4, the colon after "postfixed" should read -- ). --;

Column 4, line 42, "circuit" should read -- schematic --;

Column 12, line 34, "becuase" should read -- because --; line 67, "oera-" should read -- opera- --;

Column 13, line 43, before "WE" insert -- → --;

Column 15, line 59, "B = - -4.2361" should read -- B = -4.2361 --;

Column 18, line 19, "$(WD_9)=1$" should read -- $(WD_9)=0$ --; line 25, "IF" should read -- If --; line 42, "fromed" should read -- formed --; line 54, "&E" should read -- 7E --;

Column 20, in the table headed "INSTRUCTIONS", that portion of instruction 16 reading "(F90)" should read -- (F50) --;

Column 21, in the table headed "INSTRUCTIONS", that portion of instruction 19 reading "IJBJ" should read -- IJBF --;

Column 23, in the equations starting at line 45, the seventh equation should read -- YLSD = F33 · F31 · F30 --;

UNITED STATES PATENT OFFICE

CERTIFICATE OF CORRECTION

Patent No. 3,825,736 Dated July 23, 1974

Inventor(s) Thomas E. Osborne

It is certified that error appears in the above-identified patent and that said Letters Patent are hereby corrected as shown below:

Column 24, line 1, "s0000" should read -- S0000 --; line 43, after "(8F)" insert a period; line 56, "al, state" should read -- a 1 state, --;

Column 29, in the table headed "LOGICAL EQUATIONS - SUBROUTINE NORMALIZE - S0100 - FIG. 17", the penultimate equation in the right column should read -- K51 = G0212 --;

Column 30, in the table headed "LOGICAL EQUATIONS - SUBROUTINE NORMALIZE - S0100 - FIG. 17 - Continued", the penultimate and last equations in the left column should read -- J41 = G2121 -- and -- J41 = G0022 -- respectively;

Column 33, line 47, after "K terminal" insert a comma;

Column 36, line 46, "(CFF)" should read -- CFF --; line 47, "Dg" should read -- $D_9$ --; line 53, "stores" should read -- stored --;

Column 37, line 65, "remians" should read -- remains --; line 66, "beams" should read -- beam --;

Column 39, equation (14), that portion reading "$(Vcc\ t_{on})$" should read -- $Vcc\ t_{on}$ --; equation (15), that portion reading "$(2L_m) = (Vcc\ t_{on})/(R_{off}\ t_{off})$" should read -- $2L_m = Vcc\ t_{on}/R_{off}\ t_{off}$ --; equation (15a), that portion reading "$(t_{on} + t_{off})/(t_{off}\ R_{off})$" should read -- $t_{on} + t_{off}/t_{off}\ R_{off}$ --;

Column 41, line 28, "sto" should read -- stop --;

UNITED STATES PATENT OFFICE
CERTIFICATE OF CORRECTION

Patent No. 3,825,736 Dated July 23, 1974

Inventor(s) Thomas E. Osborne

It is certified that error appears in the above-identified patent and that said Letters Patent are hereby corrected as shown below:

Column 44, line 3, "mangitude" should read -- magnitude --;

Column 46, line 29, "nals" should read -- nal --; line 41, "ia" should read -- is --.

Signed and sealed this 3rd day of June 1975.

(SEAL)
Attest:

RUTH C. MASON
Attesting Officer

C. MARSHALL DANN
Commissioner of Patents
and Trademarks